US012259630B2

(12) United States Patent
Mitioglu et al.

(10) Patent No.: US 12,259,630 B2
(45) Date of Patent: Mar. 25, 2025

(54) SUBSTRATE COMPRISING ELECTRODES AND LIGHT MODULATOR WITH REDUCED DIFFRACTION

(71) Applicant: eLstar Dynamics Patents B.V., Rockanje (NL)

(72) Inventors: Anatolie Mitioglu, Eindhoven (NL); Romaric Mathieu Massard, Eindhoven (NL)

(73) Assignee: eLstar Dynamics Patents B.V., Rockanje (NL)

( * ) Notice: Subject to any disclaimer, the term of this patent is extended or adjusted under 35 U.S.C. 154(b) by 0 days.

(21) Appl. No.: 18/721,468

(22) PCT Filed: Nov. 4, 2022

(86) PCT No.: PCT/EP2022/080773
§ 371 (c)(1),
(2) Date: Jun. 18, 2024

(87) PCT Pub. No.: WO2023/117191
PCT Pub. Date: Jun. 29, 2023

(65) Prior Publication Data
US 2024/0419045 A1    Dec. 19, 2024

(30) Foreign Application Priority Data

Dec. 24, 2021 (EP) .................................... 21217725
Apr. 25, 2022 (EP) .................................... 22169702
Jul. 14, 2022 (EP) .................................... 22184984

(51) Int. Cl.
*G02F 1/1676* (2019.01)
*G02F 1/167* (2019.01)
*G02F 1/16755* (2019.01)

(52) U.S. Cl.
CPC ............ *G02F 1/1676* (2019.01); *G02F 1/167* (2013.01); *G02F 1/16755* (2019.01); *G02F 2201/124* (2013.01); *G02F 2203/12* (2013.01)

(58) Field of Classification Search
CPC .................................................... G02F 1/1676
See application file for complete search history.

(56) References Cited

U.S. PATENT DOCUMENTS 4,680,103 A   7/1987  Beilin Solomon I. et al.
5,161,048 A   11/1992 Rukavina
(Continued)

FOREIGN PATENT DOCUMENTS

CN   101002129 A    7/2007
CN   101675379      3/2010
(Continued)

OTHER PUBLICATIONS

Partial European Search Report from European application No. 23217588, Jun. 17, 2024, 10 pgs.
(Continued)

*Primary Examiner* — Joseph P Martinez
(74) *Attorney, Agent, or Firm* — Crowell & Moring LLP

(57) ABSTRACT

Substrate are disclosed for use in a light modulator. The substrate may comprise at least one driving electrodes applied to the substrate. The driving electrode is arranged in a pattern across the substrate. The pattern of multiple driving electrodes across the substrate comprises multiple repeated building blocks. Electrodes in the building blocks forming the at least one driving electrode.

24 Claims, 30 Drawing Sheets

(56) References Cited

U.S. PATENT DOCUMENTS

| | | |
|---|---|---|
| 6,618,109 B2 | 9/2003 | Hidehira et al. |
| 6,631,022 B1 | 10/2003 | Kihira |
| 7,177,002 B2 | 2/2007 | Matsumoto et al. |
| 7,362,400 B2 | 4/2008 | Itou et al. |
| 8,018,430 B2 | 9/2011 | Choi et al. |
| 8,054,535 B2 | 11/2011 | Sikharulidze et al. |
| 8,384,659 B2 | 2/2013 | Yeo et al. |
| 8,446,663 B2 | 5/2013 | Kim et al. |
| 8,514,481 B2 | 8/2013 | Yeo et al. |
| 8,520,286 B2 | 8/2013 | Clapp et al. |
| 9,013,780 B2 | 4/2015 | Henzen et al. |
| 9,075,281 B2 | 7/2015 | Kato et al. |
| 9,176,347 B2 | 11/2015 | Peng et al. |
| 9,201,282 B2 | 12/2015 | Henzen |
| 10,921,678 B2 | 2/2021 | van de Kamer |
| 11,095,040 B2 | 8/2021 | Sonoda |
| 11,099,451 B1 * | 8/2021 | Massard ............... G02F 1/167 |
| 2004/0145696 A1 | 7/2004 | Que et al. |
| 2005/0185104 A1 | 8/2005 | Weisbuch et al. |
| 2005/0213191 A1 | 9/2005 | Whiteside |
| 2007/0046621 A1 | 3/2007 | Suwabe et al. |
| 2007/0291808 A1 | 12/2007 | Ledentsov |
| 2009/0040192 A1 | 2/2009 | Haga |
| 2009/0321265 A1 | 12/2009 | Stancovski |
| 2010/0321346 A1 | 12/2010 | Chae et al. |
| 2011/0290649 A1 | 1/2011 | Hamada |
| 2011/0249933 A1 | 10/2011 | Nair |
| 2011/0261432 A1 | 10/2011 | Yamazaki |
| 2011/0304529 A1 | 12/2011 | Yeo et al. |
| 2012/0024375 A1 | 2/2012 | Mader |
| 2012/0087389 A1 | 4/2012 | Howe |
| 2012/0090976 A1 | 4/2012 | Kobayashi et al. |
| 2013/0016420 A1 | 1/2013 | Yeo et al. |
| 2014/0061049 A1 | 3/2014 | Lo |
| 2014/0104155 A1 | 4/2014 | Long |
| 2014/0160412 A1 | 6/2014 | Peng et al. |
| 2015/0268593 A1 | 9/2015 | Sasaki et al. |
| 2016/0004368 A1 | 1/2016 | Kurasawa |
| 2016/0071465 A1 | 3/2016 | Hung et al. |
| 2016/0161780 A1 | 6/2016 | Van Oosten et al. |
| 2016/0187755 A1 | 6/2016 | Kasegawa |
| 2017/0061895 A1 | 3/2017 | Paolini, Jr. et al. |
| 2017/0107753 A1 | 4/2017 | Koga et al. |
| 2018/0116712 A1 | 5/2018 | Dong et al. |
| 2018/0239211 A1 | 8/2018 | Teranishi et al. |
| 2018/0247598 A1 | 8/2018 | Sainis |
| 2019/0302564 A1 | 10/2019 | van de Kamer |
| 2019/0324343 A1 | 10/2019 | Atkinson et al. |
| 2020/0066924 A1 | 2/2020 | Tombs |
| 2020/0249538 A1 | 8/2020 | Massard |
| 2020/0320921 A1 | 10/2020 | Lin et al. |
| 2020/0347666 A1 | 11/2020 | Kim et al. |
| 2021/0055621 A1 | 2/2021 | Massard |
| 2021/0141259 A1 | 5/2021 | Yoshino |
| 2021/0181594 A1 | 6/2021 | Jain et al. |
| 2021/0373392 A1 | 12/2021 | Nie et al. |

FOREIGN PATENT DOCUMENTS

| | | |
|---|---|---|
| CN | 102597864 A | 7/2012 |
| CN | 102668015 A | 9/2012 |
| CN | 102725683 A | 10/2012 |
| CN | 110612477 | 12/2019 |
| CN | 112 162 419 A | 1/2021 |
| CN | 113534507 | 10/2021 |
| CN | 113 655 557 A | 11/2021 |
| CN | 113677548 A | 11/2021 |
| CN | 114609840 | 6/2022 |
| CN | 115 857 211 A | 3/2023 |
| EP | 2 555 049 A2 | 2/2013 |
| EP | 3 381 081 B1 | 4/2021 |
| EP | 4 288 833 B1 | 3/2024 |
| EP | 4 390 522 A1 | 6/2024 |
| FR | 2842916 A1 | 1/2004 |
| JP | S49 29995 A | 3/1974 |
| JP | 11021149 A | 1/1999 |
| JP | 2008-209953 A | 9/2008 |
| JP | 2012-063701 A | 3/2012 |
| KR | 101 067 174 B1 | 9/2011 |
| KR | 20140099421 | 8/2014 |
| TW | 201740609 A | 11/2017 |
| TW | 202219615 A | 5/2022 |
| TW | 202225790 A | 7/2022 |
| WO | WO 2002/08826 A1 | 1/2002 |
| WO | WO 2003/100758 A1 | 12/2003 |
| WO | WO 2004/008423 A1 | 1/2004 |
| WO | WO 2004/012000 A1 | 2/2004 |
| WO | WO 2008/012934 A1 | 1/2008 |
| WO | WO 2011/012499 A1 | 2/2011 |
| WO | WO 2014/191233 A1 | 12/2014 |
| WO | WO 2014/209119 A2 | 12/2014 |
| WO | WO 2017/026480 A1 | 2/2017 |
| WO | WO 2017/192881 A1 | 11/2017 |
| WO | WO 2018/204582 A1 | 11/2018 |
| WO | WO 2020/161005 A1 | 8/2020 |
| WO | WO 2021/138344 A1 | 7/2021 |
| WO | WO 2021/228907 A1 | 11/2021 |
| WO | WO 2022/053423 A1 | 3/2022 |
| WO | WO 2022/246430 A1 | 11/2022 |
| WO | WO 2023/117191 A1 | 6/2023 |
| WO | WO 2024/002660 A1 | 1/2024 |
| WO | WO 2024/033009 A1 | 2/2024 |

OTHER PUBLICATIONS

Chinese Search Report and Office Action from Chinese application No. 2022800340665, Jul. 30, 2024, 5 pgs.

Abdelraouf et al. "Recent Advances in Tunable Metasurfaces: Materials, Design and Applications," ACS Nano, vol. 16, No. 9 (2022) pp. 13339-13369.

Aieta et al. "Supplementary Materials for Multiwavelength Achromatic Metasurfaces by Dispersive Phase Compensation," Science, vol. 347, No. 6228, (2015) pp. 1342-1345.

C. Qiu et al., "Transparent Ferroelectric Crystals with Ultrahigh Piezoelectricity," *Nature*, 577 (2020) pp. 350-367.

California et al. "Silver grid electrodes for faster switching ITO free electrochromic devices," Solar Energy Materials & Solar Cells, vol. 153 (2016), pp. 61-67.

Chen et al. "Flat optics with dispersion-engineered metasurfaces," Nature Reviews Materials, vol. 5 (2020), pp. 604-620.

Final Office Action from U.S. Appl. No. 17/087,063, dated Jun. 1, 2023, pp. 1-26.

Final Office Action from U.S. Appl. No. 17/383,831, dated Feb. 28, 2023, pp. 1-16.

Office Action from U.S. Appl. No. 17/383,831, dated Oct. 3, 2022, pp. 1-24.

Office Action from U.S. Appl. No. 17/398,239, dated Feb. 28, 2023, pp. 1-26.

Devlin et al. "High efficiency dielectric metasurfaces at visible wavelengths," eprint arXiv:1603.02735 (2016) pp. 1-18.

Extended European Search Report from European Application No. 22215020.3-1207, May 30, 2023, 9 pp.

Fan, "Freeform Metasurface Design Based on Topology Optimization," MRS Bulletin, vol. 45, (2020), pp. 196-201.

Final Office Action, issued in U.S. Appl. No. 16/834,588, dated Oct. 15, 2020, pp. 1-33, U.S. Patent and Trademark Office, Alexandria, VA.

Hu et al. "Efficient full-path optical calculation of scalar and vector diffraction using the Bluestein method," Light: Science & Applications, vol. 9, issue 119 (2020) pp. 1-11.

International Preliminary Report on Patentability from International Application No. PCT/EP2022/080773, Jan. 3, 2024, 22 pp.

International Search Report and Written Opinion for PCT/EP2020/052379 mailed Mar. 25, 2020.

International Search Report and Written Opinion from International Application No. PCT/EP2022/080773, May 11, 2023, 30 pp.

International Search Report and Written Opinion from International Application No. PCT/EP2021/071346, Nov. 3, 2021, 15 pp.

(56) References Cited

OTHER PUBLICATIONS

International Search Report and Written Opinion from International Application No. PCT/EP2023/065535, Sep. 1, 2023, 15 pp.
International Search Report and Written Opinion from International Application No. PCT/EP2022/056315, Jun. 7, 2022, 15 pp.
Kim et al. "Non-uniform sampling and wide range angular spectrum method," J. Opt. vol. 16 (2014) pp. 125710-1 to 125710-9.
Leutenegger et al. "Fast focus field calculations," Optics Express, vol. 14, No. 23 (2006), pp. 11277-11290.
Li et al. "Large-area metasurface on CMOS-compatible fabrication platform: driving flat optics from lab to fab," Nanophotonics, vol. 9, issue 10 (2020) pp. 3071-3087.
Maniscalco et al., "Thin film thickness measurements using Scanning White Light Interferometry," Thin Solid Films, 550 (2014) pp. 10-16.
Murray et al. "Numerical comparison of grid pattern diffraction effects through measurement and modeling with OptiScan software," Proc. of SPIE, vol. 8016 (2011) pp. 1-15.
Nie et al. Broadband Light Bending with Plasmonic Nanoantennas, Science, vol. 335 (2016), pp. 427-428.
Nockert, "AI for Game Programming 2: Maze Generation (A3.6)," (Jan. 8, 2020) pp. 1-12.
Non-Final Office Action, issued in U.S. Appl. No. 16/778,002, dated June 19, 2020, pp. 1-20, U.S. Patent and Trademark Office, Alexandria, VA.
Non-Final Office Action, issued in U.S. Appl. No. 16/834,588, dated Aug. 3, 2020, pp. 1-43, U.S. Patent and Trademark Office, Alexandria, VA.
Non-Final Office Action, issued in U.S. Appl. No. 16/983,729, dated Apr. 26, 2021, pp. 1-20, U.S. Patent and Trademark Office, Alexandria, VA.
Non-Final Office Action, issued in U.S. Appl. No. 17/087,063, dated Sep. 14, 2022, pp. 1-31, U.S. Patent and Trademark Office, Alexandria, VA.
Notice of Allowance, issued in U.S. Appl. No. 16/778,002, dated August 3, 2020, pp. 1-9, U.S. Patent and Trademark Office, Alexandria, VA.
Notice of Allowance, issued in U.S. Appl. No. 16/834,588, dated Dec. 14, 2020, pp. 1-10, U.S. Patent and Trademark Office, Alexandria, VA.
Notice of Allowance, issued in U.S. Appl. No. 16/944,918, dated May 15, 2021, pp. 1-10, U.S. Patent and Trademark Office, Alexandria, VA.
Notice of Reasons for Refusal and English translation from JP2021-545949, dated Sep. 12, 2023, pp. 1-11.
Partial European Search Report from European application No. 23205397.5-1020, Mar. 22, 2024, 16 pp.
Skyum, "A Sweepline Algorithm for Generalized, Delaunay Triangulations," DAIMI Report Series, vol. 20, issue 373 (1991) pp. 1-21.
Tao et al. "Reversible Metal Electrodeposition Devices: An Emerging Approach to Effective Light Modulation and Thermal Management," Adv. Optical Mater. vol. 9 (2021) pp. 2001847-1 to 2001847-15.
Toskov et al. "Modeling and fabrication of Pt micro-heaters built on alumina Substrate," Proceedings of the 36th International Spring Seminar on Electronics Technology (2013), pp. 1-7.
Turing, "The Chemical Basis of Morphogenesis," Philosophical Transactions of the Royal Society of London. Series B, Biological Sciences, vol. 237, No. 641 (1952), pp. 37-72.
Yonghe et al. "A Simple Sweep-line Delaunay Triangulation Algorithm," Journal of Algorithms and Ogtimization, vol. 1, Iss. 1 (2013) pp. 30-38.
Extended European Search Report from European application No. 24166202.2, Oct. 10, 2024, 31 pgs.
Office Action issue in Chinese Patent Application No. 202280053722.6 dated Oct. 10, 2024, w/English translation, 10 pages.
Office Action issue in Korean Patent Application No. 10-2024-7024654 dated Sep. 27, 2024, w/English translation, 15 pages.
Extended European Search Report from European Application No. 24197047.4, Dec. 5, 2024, 22 pp.
Extended European Search Report from European Application No. 24186948.6, Dec. 17, 2024, 8 pp.
Chinese Office Action and English Translation from CN 2022800852983, Nov. 15, 2024, 6 pp.
International Search Report (PCT/ISA/210) issued in PCT Application No. PCT/EP2023/069486, Oct. 26, 2023, 37 pp.
Extended European Search Report from EP 24177302, Dec. 23, 2024, 19 pp.
International Preliminary Report on Patentability from PCT/EP2023/065535, Oct. 15, 2024, 15 pp.

\* cited by examiner

| 160 | 160 | 160 | 160 | 162 |
|---|---|---|---|---|
| 161 | 160 | 160 | 160 | 160 |

*Fig. 1g*

| 171 | 172 | 171 | 172 |
|---|---|---|---|
| 172 | 171 | 172 | 171 |

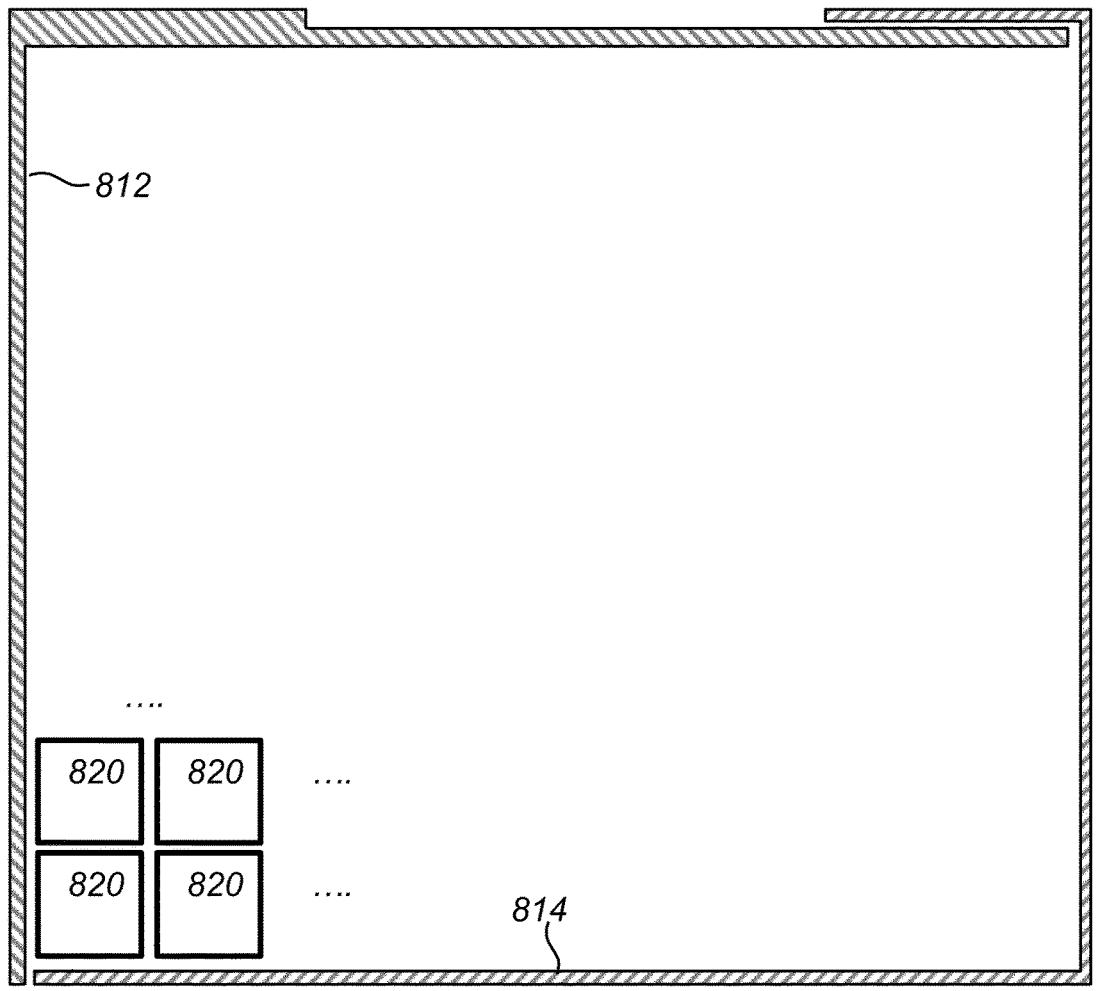
Fig. 10b.1

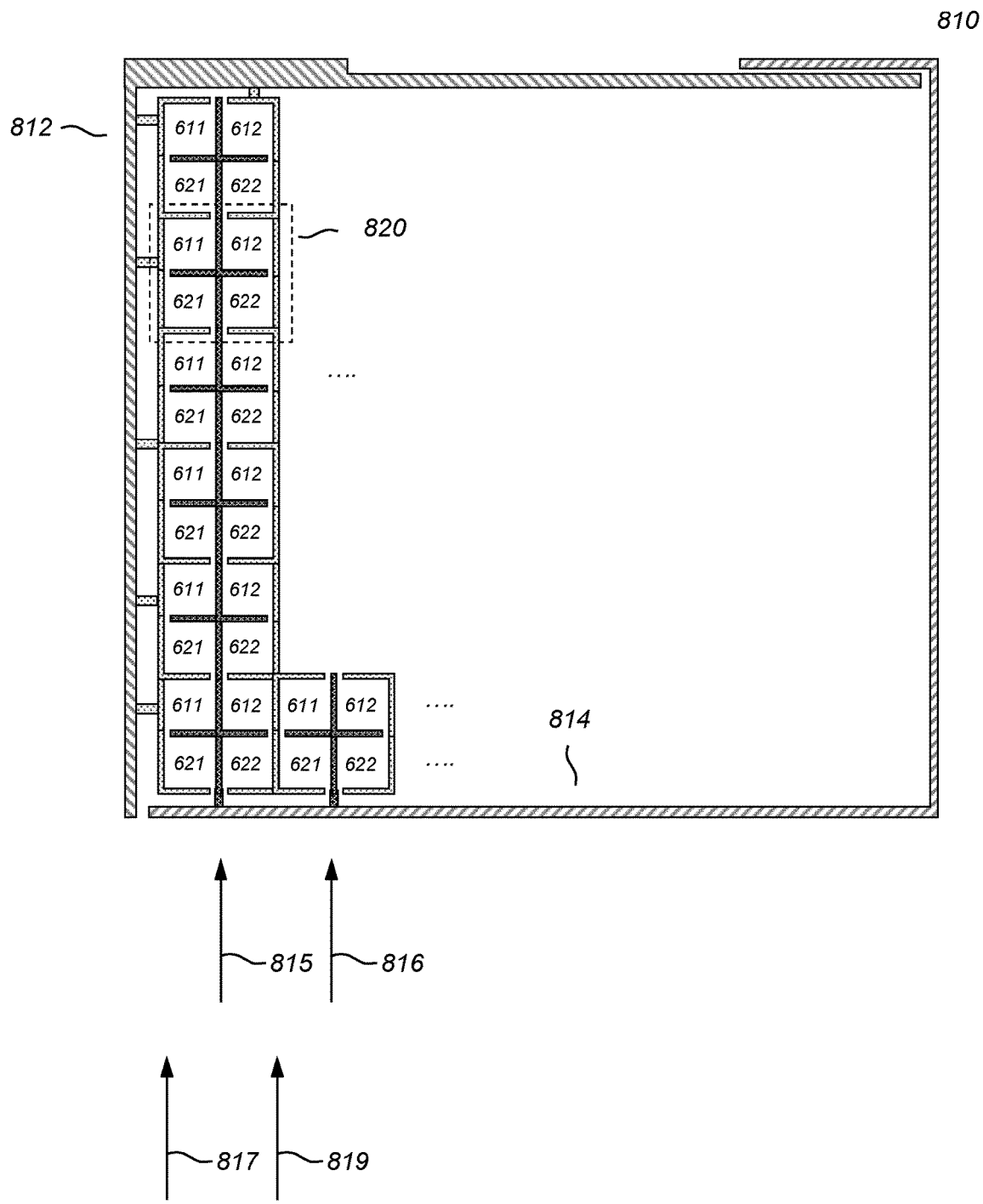
Fig. 10b.2

Fig. 14a                                                              Fig. 14b

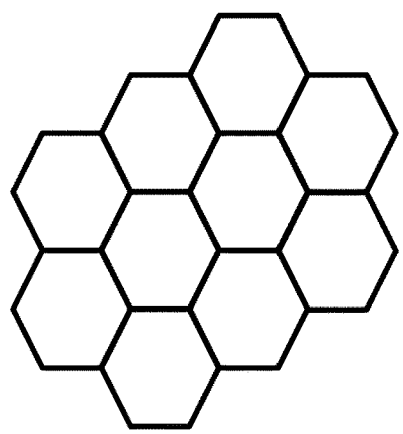
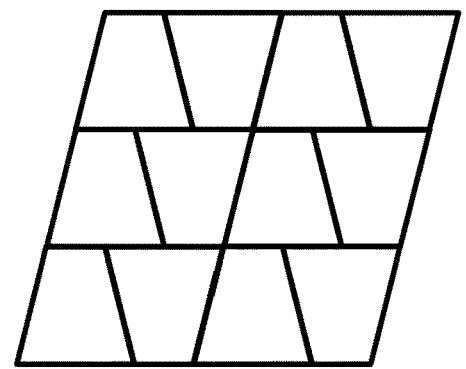
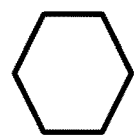
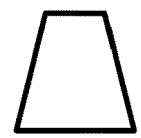
Fig. 14d
Fig. 14e
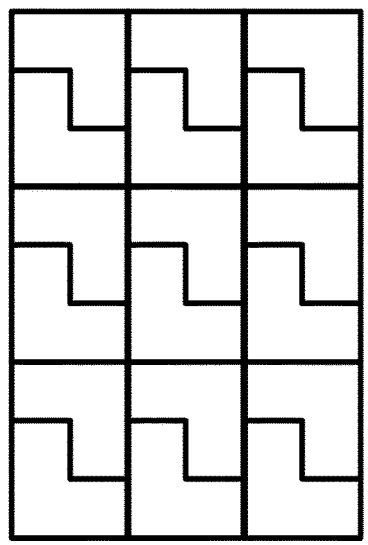
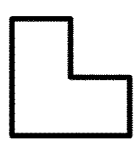
Fig. 14f

SUBSTRATE COMPRISING ELECTRODES AND LIGHT MODULATOR WITH REDUCED DIFFRACTION

RELATED APPLICATIONS

The present patent document is the national stage of International Application No. PCT/EP2022/080773, which was filed on Nov. 4, 2022, and which claims the benefit of priority to EP patent application Ser. No. 21217725.7, which was filed Dec. 24, 2021, to EP patent application Ser. No. 22169702.2, which was filed Apr. 25, 2022, and to EP patent application Ser. No. 22184984.7, which was filed Jul. 14, 2022. The aforementioned applications are hereby incorporated by reference in their entirety.

FIELD

The presently disclosed subject matter relates to a light modulator, a substrate, a light modulator method and a computer readable medium.

BACKGROUND

Optically active glazing is known in the art. Typically, an optically active glazing system comprises two parallel plates, made from a transparent dielectric material such as glass or a plastic material. The internal volume defined between the plates may be subdivided into a plurality of small independent volumes or individual cells that are filled with a dielectric fluid. The fluid contains a suspension of particles of a dielectric, charged or chargeable material. The facing faces of the two plates carry electrodes facing each other. The electrodes are connected to an electrical power supply associated with a control means.

The electrodes of each plate are formed by combs that are interleaved into one another in pairs. The electrodes of two interleaved combs are capable of taking up electrical voltages of polarities that are identical or opposite. With a suitable voltage on the electrodes the particles can be concentrated at different locations between the electrodes to give the system either a transparent or an opaque appearance.

There are various drawbacks associated with the known system. When the known glazing is in its transparent configuration, the electrodes that are applied to the plates cause a diffraction effect. A diffraction effect is undesirable for glazing. In some circumstances the presence of a diffraction effect can also be detrimental to safety. For example, if the optically active glazing is applied in a vehicle, such as a car, the presence of diffraction can be confusing or distracting for the operator of the vehicle.

SUMMARY

It would be advantageous to provide improved substrates provided with electrodes, and a light modulator comprising such improved substrates, that addresses these and other problems. The inventors found that the electrode design in the known system leads to diffraction. Addressing this concern leads to substrates that can be applied with less diffraction.

A substrate for use in an optical modulator may comprise multiple interdigitated driving electrodes applied to the substrate, each of the multiple driving electrodes being arranged in a pattern across the substrate, the multiple interdigitated driving electrodes being arranged alternatingly with respect to each other on the substrate. The driving electrodes are electrically isolated from each other so that a voltage on the driving electrodes can be independently controlled.

When such a substrate is used in a light modulator, varying voltages applied to the electrodes may cause an electrophoretic movement of particles in an optical layer between two such substrates. The movement in turn causes modulation of light shining through the substrates. At least two such substrates with each at least two driving electrodes are typically used, but further substrates and/or driving electrodes may be used. The light modulator is preferably electrophoretic, but could be dielectrophoretic. Substrates according to an embodiment may be employed in other technologies as well, e.g., OLED or electrowetting. A substrate according to an embodiment may be combined with another substrate according to an embodiment, but this is not necessary; One or both of the substrates may be transparent. In a glazing application typically both substrates are transparent.

Optically active glazing, in particular so-called smart glazing is an important application of a light modulator, e.g., of embodiments of substrates on which multiple interdigitated electrodes are applied. Typically, all substrates in the light modulator are transparent; this is especially so in glazing applications. In an embodiment, one or more substrates may be translucent. In an embodiment, one substrate may be opaque, while an opposite substrate is transparent or translucent. Such a light modulator would change the appearance of impinging light. The substrates may be reflective.

An important issue for applications such as glazing is diffraction. Preferably diffraction is reduced to a small number. Diffraction can be computed in a number called the pixelated noise metric, which is the ratio of the maximum intensity among all the non-zero order peaks and the maximum intensity of the zero-order peak from the magnitude spectrum. See for example, the paper Murray, Ian B., Densmore, V., Bora, V., Pieratt, W. M., Hibbard, D. L., and Milster T. D. "Numerical comparison of grid pattern diffraction effects through measurement and modeling with OptiScan software." Proc. SPIE 8016, Window and Dome Technologies and Materials XII, 80160U (2011), which is included herein by reference. With conventional patterning of the electrode lines it proved difficult to reduce the pixelated diffraction value further. However, the inventors found ways to overcome this obstacle and produce designs that broke the existing barrier. In embodiments, the calculated pixelated noise metric of the driving electrode pattern of the substrate is below 6.05%, or below 5% or below 4%. In particular, the pixelated noise metric of a building block may be below these thresholds.

In an embodiment, the pattern of the driving electrodes if formed by multiple repeated building blocks. A building block comprises interdigitated electrodes. By repeating the building blocks next to each other the electrodes on the building block are formed into the driving electrodes. For example, the building block may be fused into the pattern in a mask lay outing tool, before depositing the entire pattern on the substrate. Building blocks may be partially overlapping. For example, if an electrode line of a first building block coincides with an electrode line of a neighboring building block, which both belong to the same driving electrode, then these electrode lines of the two building blocks may be fused. In an embodiment, a building block is surrounded by driving busses, which are advantageously merged with busses for the same driving electrodes of neighboring building blocks.

In an embodiment, a driving bus is arranged at a side of the substrate for each driving electrode to drive the driving electrode. The driving bus may also connect otherwise isolated electrodes into the driving electrode. The driving busses in turn may be connected to a controller.

The driving busses may be placed only at the sides of the substrate, but may also stretch across the substrate, e.g., between building blocks or as part of building blocks. For example, multiple straight driving busses may stretch across the building block, arms may extend from the driving busses to further connect electrodes into the driving electrodes. Preferably, it is avoided that two driving buses stretch across the substrate next to each other, as so a narrow furrow would be formed that may have a negative effect on diffraction. If two driving electrodes are used then the driving busses advantageously alternate between the building blocks.

In an embodiment, the building block may comprise multiple interdigitated electrodes extending in at least 2 directions across the building block. The inventors found that using electrodes of relatively long length relative to the size of the building block is advantageous to reduce diffraction. For example, for at least one electrode in the multiple interdigitated electrodes in the building block a maximal length between any two points on said electrode measured along said electrode in the building block is at least 2 times the length of the diagonal of the building block unit.

In an embodiment, the building block may comprise multiple branching nodes where the electrode branches. For example, at least three electrode lines may be connected to a branching node. Introducing clusters of branching nodes increases the local variability of the electrode and increases electrode length compared to a building block diagonal. For example, a cluster of branching nodes may comprise at least a first branching node, the first node being directly connected through an electrode line to a second branching node and to a third branching node. In an embodiment, the cluster may be larger, for example, the first branching node being directly connected to two further branching nodes who are in turn directly connected to four branching nodes.

The cluster of nodes together with the electrode lines that connect them may form a tree. More generally, the driving electrode may be a tree.

Such clusters of branching nodes may be introduced in an electrode pattern manually, though the inventors have found algorithms which can produce patterns with high number of branching nodes. For example, a driving electrode may be found by computing a spanning tree of a Voronoi pattern. A complementary electrode pattern may be formed by placing edges that run across the edges removed from the Voronoi pattern. Instead of a Voronoi pattern, other tessellations may be used. For example, a regular tessellation may be used, possibly using one or multiple polygon shapes. The tessellation may be randomized by randomly shifting edges of the tessellation. A spanning tree of the randomized tessellation may be used as an electrode; the complementary electrode May be formed from the dual graph.

The building blocks may be repeated across the substrate by copying and translating the block without mirroring or rotation. However, in an embodiment, an isometry is applied to the building block, e.g., a mirroring, rotation and/or point reflection. Although one could use multiple building blocks as well, using isometries has the advantage that placement of the building blocks can be improved without having to optimize multiple blocks. For example, if driving busses across the substrate are used, e.g., between building blocks, then isometries can be used to avoid driving buses being placed on the substrate next to each other. For example, one may mirror an entire row or column of building blocks over its longitudinal direction to form a next row or column of building blocks, and so on. Mirroring a building blocks like that has the advantage that driving busses can be merged between different building blocks, thus avoiding furrows between them. Mirroring a building blocks has the advantage that a symmetric electrode design for the substrate may be established, which is advantageous in manufacturing a light modulator.

In an embodiment, the tiles are arranged in a checkerboard, wherein individual tiles may be mirrored or point reflected. In an embodiment, the tiles are not in a checkerboard, but the edges of the tiles are parallel or orthogonal to each other.

A substrate according to an embodiment may be used in a light modulator, also known as an optical modulator. For example, two such substrates may be arranged opposite to each other, so that charged particles suspended in a fluid between the substrates can be moved by applying voltages to the electrodes. Typically, the electrode designs for the bottom and top substrates are identical, but this is not necessary. Likewise, the two designs are typically aligned with each other, but this also is not necessary. The particles may absorb or reflect light. Reflection may be specular or diffusive, or in between. Particles may emit light, e.g., having phosphorescence or fluorescence.

A light modulator provides a panel of which transparency or reflectivity can be modified. In an embodiment, color or color intensity, etc., may be changed. A light modulator may be used as cover, e.g., a cover of a container, e.g., a closet, cabinet, and the like. A light modulator is also referred to, depending on the specific application, as ambient light modulator, dynamic light modulator, light modulator, color modulator, IR modulator, UV modulator, IR active filter, UV active filter, or dynamic color filter.

An especially advantageous application is in optically active glazing, which is also referred to in the field as smart glazing, smart windows, controllable glazing, optical panel, electronic signage, dynamic light panel, dynamic color panel, active color panel, active light panel, active light surface, active color surface, dynamic light surface, or dynamic color surface.

In an embodiment, a controller is configured to apply an electric potential to the electrodes on the substrates of a light modulator to obtain an electro-magnetic field between the electrodes. The electro-magnetic field provides electrophoretic movement of the particles towards or from an electrode. As the particles change position, the optical properties of the panel changes, e.g., its transparency or reflectivity. If the particles are colored then also the color of the panel may change. By changing the pairs of electrodes between which a field is established the particles can be moved into a desired direction. The inventors found that control of a light modulator need not be restricted to solely changing between which electrodes a field is applied, but can also comprise changing the maximum amplitude. Note that, advantageously, alternating current is used. For example, by driving with a lower maximum amplitude the rate of change in the light modulator is changed. This is advantageous, for example, when driving towards a desired target transparency or reflectivity, the maximum amplitude may be reduced to avoid overshoot. Maximum amplitude may also or instead be increased when starting driving towards a target transparency or reflectivity. For example, the controller may be configured to obtain one of multiple levels of transparency or reflectivity in the light modulator by using an alternating current or voltage of one of multiple maximum amplitudes. The relationship may be indicated by an algorithm, etc. The relationship between levels of transparency or reflectivity and maximum amplitudes can be governed by a look-up table, e.g., indicating a sequence of maximum amplitudes to drive toward a transparency or reflectivity. Note that alternating voltage is also possible.

Varying the maximum amplitude of the driving signal in addition to changing the electrodes between which a signal is applied may also be used to improve balanced driving. For example, the power, e.g., maximum amplitude, applied on some electrodes may be different from that applied on other electrodes. For example, the controller may be configured to apply electric potential differences between subsequent electrodes on the same substrate and at the same time to apply electric potential differences between opposite electrodes on opposite substrates.

In embodiments at least one of two substrates is according to an embodiment. The other substrate may have one or more or no electrodes. In an embodiment, the superimposition of the electrodes on the substrate satisfy a bound on the ratio between electrode lengths in a building block and its diameter, or a bound on the pixelated noise ratio, e.g., as such bounds are indicated herein. Instead of diameter one can generally use other measures for the size of the building block. For example, in case of a rectangular building block, one may use an average of the building block sides, such as an harmonic average of the building block sides.

In embodiments there are at least two electrodes on each substrate, but there may be more than two electrodes. For example, at least three electrodes may be applied to at least one of the first substrate and the second substrate. For example, in an embodiment two electrodes may be applied to a first substrate and three electrodes to a second substrate. Typically, opposing substrate are mirrored so that electrode lines oppose each other; This is not necessary and different effects are possible when the electrodes are not so arranged.

A further aspect of the invention is a building comprising a light modulator according to an embodiment. A further aspect of the invention is a car comprising a light modulator according to an embodiment. For example, the car and/or building may comprise the light modulator and a controller configured for controlling transparency or reflectivity of the light modulator by controlling voltage on electrodes of the light modulator, the controller being electrically connected or connectable to the light modulator.

A light modulator is an electronic device, which may be driven by a power source, e.g., under control of a controller. For example, the controller may instruct the power source to apply a particular waveform to particular electrodes to achieve various transparency or reflectivity effects or the lack thereof.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a building block, FIG. 1b schematically shows an example of an embodiment of a substrate, FIG. 1c schematically shows an example of an embodiment of a substrate, FIG. 1d schematically shows an example of an embodiment of a substrate, FIG. 1e schematically shows an example of an embodiment of a building block, FIG. 1f schematically shows an example of an embodiment of a building block, FIG. 1g schematically shows an example of an embodiment of a substrate, FIG. 1h schematically shows an example of an embodiment of a substrate, FIG. 2a schematically shows an example of an embodiment of an electrode, FIG. 2b schematically shows an example of an embodiment of an electrode, FIG. 2c schematically shows an example of an embodiment of an electrode, FIG. 3 schematically shows an example of an embodiment of a substrate, FIGS. 4a-4i schematically show an example of an embodiment of a substrate, FIGS. 5a and 5b schematically show an example of an embodiment of a substrate, FIG. 6a schematically shows an example of an embodiment of a building block, FIG. 6b schematically shows an example of an embodiment of a substrate, FIG. 6c schematically shows an example of an embodiment of a substrate, FIG. 6d schematically shows an example of an embodiment of a substrate, FIG. 7a schematically shows an example of an embodiment of a light modulator, FIG. 7b schematically shows an example of an embodiment of a light modulator, FIG. 7c schematically shows an example of an embodiment of a car, FIGS. 8a-8c schematically show an embodiment of a light modulator, FIG. 9a schematically shows a computer readable medium having a writable part comprising a computer program according to an embodiment, FIG. 9b schematically shows a representation of a processor system according to an embodiment, FIGS. 10a-d schematically show aspects of an embodiment of a light modulator, FIG. 11 schematically shows a cross-section of an embodiment of a light modulator, FIG. 12*a* schematically shows an embodiment of a light modulator, FIG. 12*b*-12*c* schematically show an embodiment of a light modulator, FIG. 13*a* schematically shows an example of an embodiment of a building block, FIG. 13*b* schematically shows an example of an embodiment of a substrate, FIGS. 14*a*-14*h* schematically show embodiments of a substrate.

LIST OF REFERENCE NUMERALS

Figure 1A:
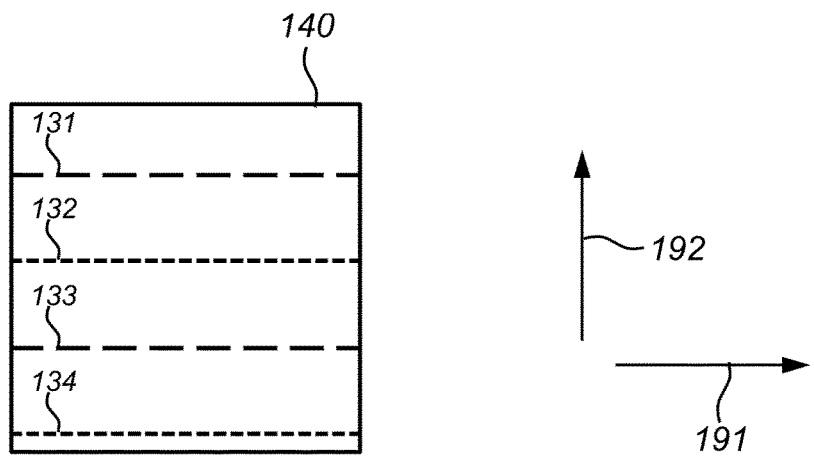

The following list of references and abbreviations is provided for facilitating the interpretation of the drawings and shall not be construed as limiting the claims.

10 a light modulator
11 a first substrate
12 a second substrate
13, 13a, 13b electrodes
14, 14a, 14b electrodes
15 a fluid
16 a controller
30 particles
20 a car
21 a light modulator
40 a light modulator
41 a first substrate
42 a second substrate
43 a third substrate
46 a controller
100-102 a substrate
111-114 a main line
121-124 a main line
131-134 interdigitated electrodes
140 a building block
141-144 a building block
110, 120 a driving bus
110', 120' a driving bus
119, 129 a connecting zone
151-157 a point on a side of a building block
160, a building block
161, 162 a partial building block
171, 172 a building block
191, 192 a direction
201-207 a node
210-218 a node
α1-α7 an angle
221-222 an electrode line
180 a substrate
181 a point on the substrate
182 a first nearest distance
183 a second nearest distance
188 a first driving electrode
189 a second driving electrode
601 a building block
602-604 a substrate
640 a furrow
611-622 a building block
651-662 a building block
720 first electrode
730 second electrode
740 edge seal
750 spacer
760 semiconductor ink
772, 774 substrate
812 first driving bus
814 second driving bus
820 a building block
902-906 driving bus part
912 driving electrode
1000, 1001 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them. Further, the subject matter that is presently disclosed is not limited to the embodiments only, but also includes every other combination of features described herein or recited in mutually different dependent claims.

Substrate are disclosed, e.g., for use in a light modulator. The substrate may comprise multiple interdigitated driving electrodes applied to the substrate, each of the multiple driving electrodes being arranged in a pattern across the substrate, the multiple interdigitated driving electrodes being arranged alternatingly with respect to each other on the substrate. The pattern of multiple driving electrodes across the substrate comprises multiple repeated building blocks.

Figure 1B:
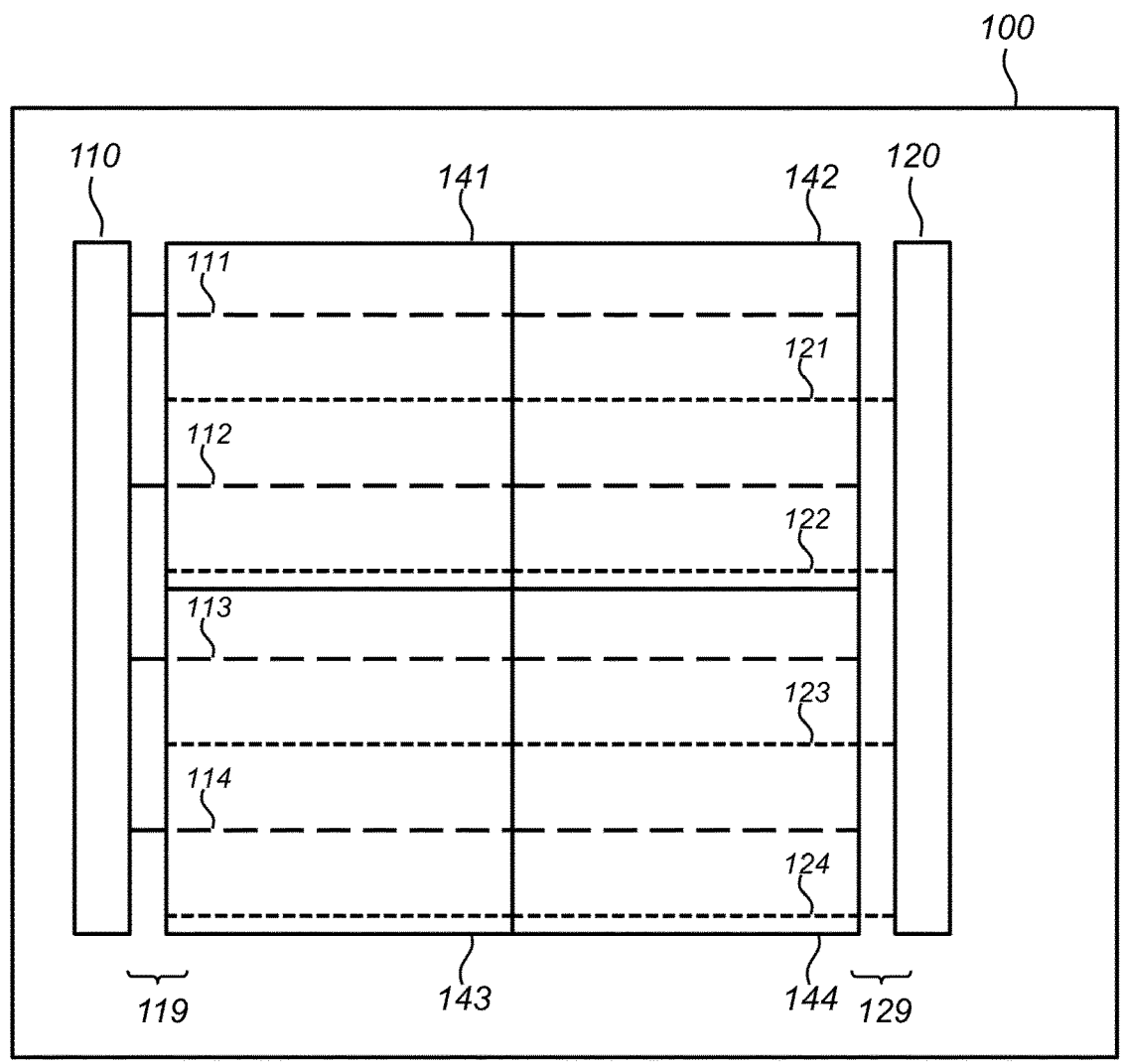

FIG. 1*b* schematically shows an example of an embodiment of a substrate. The substrate is in particular useful for use in light modulator, e.g., of a kind described herein. Across the substrate multiple interdigitated driving electrodes are applied to the substrate.

The motivating example use of the substrate is in an electrophoretic light modulator. Typically, an electrophoretic light modulator comprising at least two substrates, each having at least two driving electrodes; this is not necessary though, for example, an electrophoretic light modulator may comprise a single substrate with 2 electrodes and an opposite substrate with 1 electrode. In any case, preferably, at least one of the substrates in the light modulator is according to an embodiment.

An embodiment of a light modulator comprises a first substrate according to an embodiment and a second substrate. The first and second substrates are arranged with inner sides opposite to each other. At least one driving electrode is applied to the inner side of the first substrate. An optical layer is arranged between the first and second substrates. A controller is configured to apply an electric potential to the at least one driving electrode causing modulation of the optical properties of the light modulator. One or both of the first and second substrates are transparent and/or translucent.

There are many different kinds of light modulators that use at least one driving electrode applied to a substrate. As light is transmitted through the substrate, interference is a general problem in the field of light modulators. The optical layer and controller may be arranged to modulate optical properties using effects that depend on the potential on the driving electrode; examples including the dielectrophoretic effect and the electrophoretic effect. For example, optical modulation may comprise the modulation of particles arranged in the optical layer. The number of driving electrodes may range from one on a single substrate, to multiple driving electrodes on one or both substrates.

The optical layer arranged between the first and second substrates may comprise particles, e.g., suspended in a fluid. The controller may be configured to apply an electric potential to the driving electrodes causing the particles to move thus modulating the optical properties of the light modulator.

In an embodiment, the particles comprise electrically charged or chargeable particles, and the controller is configured to apply an electric potential to the driving electrode to obtain an electro-magnetic field providing electrophoretic movement of the particles. In an embodiment, the electro-magnetic field is arranged between at least two driving electrodes arranged on the same substrate or arranged on different substrates.

In an embodiment, the particles comprise dielectric particles, and the controller is configured to apply an electric potential to the driving electrode to apply an electric field gradient to the particles enabling the particles to be moved under the action of dielectrophoretic forces.

The controller may apply an electric signal to one or more of the driving electrodes. Embodiments that control dielectrophoretic forces may use a signal that comprises a DC signal and/or an AC signal. Embodiments that control electrophoretic forces, may use a signal that comprises a DC signal and/or an AC signal.

Below a number of known light modulators are reviewed, showing some of the options in technology and electrodes.

U.S. Pat. No. 10,921,678 with title 'Electrophoretic device', included herein by reference shows an electrophoretic device having only one patterned electrode on one of two substrates. For example, the one substrate with an electrode according to U.S. Pat. No. 10,921,678 may be replaced with a substrate according to an embodiment comprising one single electrode. U.S. Pat. No. 8,054,535B2 (included herein by reference) and U.S. Pat. No. 8,384,659B2 (included herein by reference) show alternative example of electrophoretic light modulators in one of two substrates have two patterned electrodes.

Patterned electrodes are also used in dielectrophoretic light modulators. For example, US patent application US2005185104A1 (included herein by reference) and US20180239211A1 (included herein by reference) show a dielectrophoretic light modulators having a substrate with a patterned electrode. Any of the these cited electrophoretic or dielectrophoretic light modulators may be adapted by patterning an electrode on a substrate according to an embodiment.

In an embodiment, a light modulator comprises a first substrate and a second substrate. At least one of the first and second substrate may be according to an embodiment. For example, the first and second substrates may be arranged with inner sides opposite to each other. Using a substrate according to an embodiment has, e.g., the effect of reducing optical interference. An optical layer is arranged between the first and second substrates. The driving electrode is arranged to modulate an electrical field in the optical layer. The optical layer comprises a fluid comprising particles, wherein the particles are electrically charged or chargeable. The particles may be moved under control of the electrical field. For example, a controller may be configured to apply an electric potential to the driving electrode to obtain an electro-magnetic field at the driving electrode providing electrophoretic movement of the particles towards or from one of the at least one driving electrode causing modulation of the optical properties of the light modulator.

The paper "Reversible Metal Electrodeposition Devices: An Emerging Approach to Effective Light Modulation and Thermal Management", included by reference, also shows a substrate on which a patterned electrode is applied. The patterned electrode may advantageously be arranged according to an embodiment, e.g., to reduce interference.

An embodiment of a substrate may be used in an electrochromic device (ECD). An electrochromic device (ECD) controls optical properties such as optical transmission, absorption, reflectance and/or emittance in a continual but reversible manner on application of voltage (electrochromism). This property enables an electrochromic device to be used for applications like smart glass, electrochromic mirrors, and electrochromic display devices.

An electrochromic device is described, e.g., in the paper "Silver grid electrodes for faster switching ITO free electrochromic devices" by António Califórnia et al., included herein by reference. The paper describes the preparation of an electrochromic device, in this case one which is ITO free.

An electrochromic device uses electrically conductive electrodes applied on a substrate. The cited paper uses silver grids, made using silver ink, as electrically conductive electrodes. An electrochromic device may comprise an electrochromic material. The cited paper uses poly(3,4-ethylenedioxythiophene) polystyrene sulfonate (PEDOT:PSS). In an electrochromic device, at least one driving electrode, e.g., the electrically conductive electrode, is applied to a substrate. The driving electrode being arranged in a pattern across the substrate. The cited paper discloses two different grid patterns a regular hive and a regular ladder design. See table 1 and FIG. 3 of the cited paper.

Electrodes may be applied to a substrate by screen-printing on a substrate, in the case of the cited paper, polyethylene terephthalate (PET). The electrodes are typically an electrically conductive material, e.g., a metal or metal oxide. In the cited paper, silver ink was used to screen print the grids on PET using a RokuPrint RP 2.2 equipment and a 180 wired mesh. The samples were allowed to dry in an oven at 130° C. during 15 min. On top of these silver grids, one or two layers of PEDOT:PSS SV3 were posteriorly printed by screen printing.

Because of the combination of a regular pattern, e.g., the hive or ladder pattern in the cited paper, and light passing through, the electrochromic device is subject to interference. One way to avoid interference is to use a pattern according to an embodiment, e.g., one in which the electrode is long compared to other repeating elements, e.g., a building block.

For example, the metal grid used in the cited paper may be replaced by a driving electrode applied to the substrate, the driving electrode being arranged in a pattern across the substrate, the pattern of the driving electrode across the substrate comprising multiple repeated building blocks, the building block comprising one or more electrodes extending in at least 2 directions across the building block, the electrodes in the building blocks forming the at least one driving electrode, for at least one electrode in the electrodes in the building block a maximal length between any two points on said electrode measured along said electrode in the building block is at least 2 times the length of the diagonal of the building block unit. Instead of requiring a minimal length of the electrodes, the pattern may use other features reducing interference, e.g., a high degree of branching, e.g., branching of an electrode into two or more paths, which branching repeats multiple times, e.g., at least 2, 3, 4 times, or more, leading to a bifurcation of an initial electrode into at least 4, 8, 16, or more electrodes.

Another example of an electrochromic device is given in U.S. Pat. No. 5,161,048, with title "Electrochromic window with metal grid counter electrode and acidic polyelectrolyte", included herein by reference. For example, an electrochromic device, may comprise a transparent electrochromic film and an ion-conductive layer disposed between a pair of electrodes. The metal grid electrode is issued for the electrodes. FIG. 1 of the patent shows a metal grid according to the cited patent. To form the counter electrode, a metal grid is disposed adjacent to the second glass substrate.

For example, in an embodiment of an electrochromic device, the electrochromic device may comprise a transparent substrate, an electroconductive electrode member, a transparent electrochromic film in contact with said electroconductive electrode member, an ion-conductive polymer in contact with said electrochromic film; and a patterned conductive electrode in contact with said ion-conductive polymer. The patterned conductive electrode may be according to an embodiment.

A substrate according to an embodiment can be beneficially applied in a number of other technologies. For example, the light modulator may be dielectrophoretic light modulator, e.g., as shown in US20050185104 A1, included herein by reference. A substrate as in an embodiment may also be used in other electrowetting and OLED applications.

In OLED and electrowetting one needs electrodes on only one of the substrates. The substrate with electrodes may be according to an embodiment.

In an application of the light modulator for glazing both substrates are typically transparent. In other application, e.g., in television, e-readers, etc., only one substrate may be transparent.

Shown in FIG. 1b are two driving electrodes on the same surface. The two driving electrodes are indicated in FIG. 1b in two different dashing styles. There could be more than two electrodes on the same side of the substrate, e.g., to facilitate more fine-grained control of voltage differences across the substrate. The driving electrodes are applied to a same side of the substrate. Applying electrodes to a substrate may be done lithographically, e.g., using a mask representing the electrodes pattern. Electrodes may also be applied by embedding them in the substrate.

A driving electrode is electrically connected, e.g., has same electric potential everywhere. A driving electrode may comprise driving busses and main lines. At least, the main lines are interdigitated with main lines of a further driving electrode. Typically, the driving electrodes extend in a substantially straight line across the substrate, while the main lines are convoluted.

In an embodiment, the two substrates of an optical modular each have two electrodes arranged at its inner surface. Though, as mentioned, multiple electrodes on one or both substrates is not needed. For example, an embodiment of a light modulator comprises a first substrate and a second substrate. For example, the first substrate may comprise one driving electrode, the second substrate may not comprise driving electrodes. For example, the first substrate may comprise two driving electrodes, the second substrate may comprise one driving electrode. For example, the first substrate may comprise two driving electrodes, the second substrate may comprise two driving electrodes. For example, the first substrate may comprise more than two driving electrodes, the second substrate may comprise two or more driving electrodes.

Light modulators, wherein each substrate comprises two driving electrodes are used as a motivating example, though. Designs of substrates featuring two driving electrodes may be adapted to have a single driving electrode, e.g., by connecting the two driving electrodes, or by removing one of the driving electrodes. Adapting a substrate in such a manner may make it suitable for use in different technologies.

Each of the multiple driving electrodes are arranged in a pattern across the substrate. The multiple driving electrodes are arranged alternatingly with respect to each other on the substrate. Typically, a driving electrode comprises multiple main lines, that each stretch across the substrate. The main lines of the driving electrodes alternate, e.g., interdigitate. For example, in FIG. 1b the first driving electrode comprises main lines 111-114, and the second driving electrode comprises main lines 121-124. The driving electrodes are each driven by its driving bus. FIG. 1b shows two driving buses: driving bus 110 and driving bus 120. The driving electrodes also serve to connect the main lines together. For example, in FIG. 1b, the driving bus 110 drives and connects main lines 111-114; and the driving bus 120 drives and connects main lines 121-124. There can be more main lines than the four shown in this example. The use of main lines is advantageous as it reduces the length of the electrodes, but it is not necessary. A design using only one main line per driving electrode is not impossible, though having multiple is advantageous.

The multiple of main lines of the first and second electrode are arranged alternatingly with respect to each other on the substrate.

A motivating application for a substrate such as substrate 100 is in smart glazing, e.g., a light modulator, which may be applied in domestic housing, offices, green houses, cars, and the like. The level of transparency or reflectivity of the smart glazing can be adapted electrically. For example, in smart glazing two substrates such as substrate 100 would be stacked so that the sides on which the two electrodes are applied face each other. A fluid with particles is enclosed between the two substrates. Smart-glazing embodiments are further discussed below. In an embodiment, electrodes, e.g., two or more electrodes are applied to one surface of each substrate. There could also be one, two or more electrodes on the other surface of substrate 100, e.g., to facilitate stacking of three or more substrates.

Some embodiments below show examples of modulating a transparency or reflectivity level. Light modulators may be adapted for other optical effects. For example, if desired, embodiments could be modified to different levels of translucency instead of different levels of transparency. If desired, the type of particle that is used in an embodiment can be varied, e.g., to particles that differ in which wavelengths they absorb or reflect, and how specular of diffuse the reflection is. For example, in an embodiment, a light modulator can modulate different levels of reflection. Particles can also emit light. Stacking multiple optical layers further increases the possibilities.

Having two sets of alternating main lines is sufficient to provide electrically adaptable glazing; due to the alternating two sets the electric field at any part of the substrate can be controlled as two opposite electrodes border the part from two opposing sides.

Interestingly, the pattern in which the driving electrodes stretch across the substrate is created by multiple repeated building blocks. Shown in FIG. 1b, the driving electrodes on substrate 100 shows four blocks: blocks 141, 142, 143 and 144 which are all substantially the same. The number of building blocks may be larger than four. The building blocks repeat in both directions across the substrate, e.g., a first direction 191, e.g., an x-direction, shown horizontally in the figure, and a second direction 192, e.g., a y-direction, shown vertically in the figure.

For example, FIG. 1a schematically shows an example of an embodiment of a building block 140. Building block 140 comprises multiple interdigitated electrodes extending in at least 2 directions across the building block. Shown in FIG. 1a are four electrodes: electrode 131-134. When the building blocks are repeated across a substrate in two directions, the electrodes in the building block will form the driving electrodes, e.g., form the multiple main lines of the driving electrodes. Note that the building blocks are typically connected in a substrate-electrode design tool. Typically, a building block comprise more than four electrode lines. For example, in a range of embodiments between 8 and 12 main lines are used. The number of electrode lines can be much higher though. For example, a building block may comprise many short electrode lines near the edges that connect to lines of other building blocks when the block is repeated. Taking such short offshoots into account, the number of lines could go up to, say, 50. Clearly, when using larger building blocks, the number of electrode lines may go up as well. In an embodiment, the number of electrode lines in a building block is between 8 and 50, or between 8 and 25, etc.

The driving electrodes that are formed by repeating building blocks are connected to the driving busses. Typically, electrode lines in a building block are connected to electrode lines in neighboring blocks by mering corresponding electrode lines; this is not necessary though, between repeated building blocks connection zones can be inserted that connect corresponding electrode lines.

This step can connect up multiple of the main lines together thus forming a single driving electrode. FIG. 1b shows two connecting zones 119 and 129 in which the main lines belonging to the same driving electrode are connected to driving bus 110 and driving bus 120 respectively.

The electrodes that are shown in FIG. 1a are alternately dashed in the same dashing style of FIG. 1b. Indeed, it happens to be the case in this example, that a particular electrode of the building block of FIG. 1a will always end up in the first driving electrode or in the second electrode, e.g., as indicated in this case by the dashing style.

This is however not necessarily the case. An electrode in a building block may end up as part of the first driving electrode or as part of the second driving electrode. This can change, e.g., as a result of the parity of the number of electrodes in the building block, the pattern in which the building blocks are repeated, etc.

For example, a particular pattern of repeated building blocks may be used for a light modulator with two driving electrodes, in which one might assign alternating main lines to the two driving electrodes. However, the same pattern of repeated building blocks may be used for a light modulator with three driving electrodes, in which one might assign every next set of three main lines to the three driving electrodes.

Furthermore, the building block shown in FIG. 1a is square, but this is also not needed. For example, a building block may be rectangular. In an embodiment, building block shape(s) could form a so-called tessellation. For example, a building block may be a triangle, a hexagon or even a combination of plane-filling shapes.

As said, FIGS. 1a and 1b are schematic. This is especially the case for the depiction of the electrodes. An electrode as shown in FIG. 1a is straight, and its length equals the length of a side of the building block. However, in an embodiment, an electrode on the building block is more convoluted as for at least one electrode in the multiple interdigitated electrodes in the building block a maximal length between any two points on said electrode measured along said electrode in the building block is at least 2 times the length of the diagonal of the building block unit.

For example, if one were to take the electrodes of FIG. 1a as they are schematically depicted, then the longest possible length along the same electrode is the length of a side of the building block. The ratio between longest length and diagonal in FIG. 1a (as schematically depicted) would then be $1/\sqrt{2} \approx 0.71$. However, in an embodiment, this ratio would be much larger, e.g., at least 2. If this value is large, it forces the electrode to follow a more convoluted path, which reduces diffraction. By using building blocks, said convolution is distributed across the substrate. In an embodiment, the ratio between longest length may be even larger than 2. For example, said ratio may be at least 3, at least 4, or at least 5, etc. This is a useful design criterion since, if a long path is forced to meander across the building block, because it is longer than would fit without such meandering, then the angles in that path naturally distribute and diffraction is reduced, even in the presence of shorter paths in the same building block. This criterion could be enforced more strictly by computing a number of the longest paths, say the top-k longest paths in a building block, where the paths are electrically unconnected. For example, k may be 2 or more, 3 or more, 5 or more etc. For example, one may require that the top-k longest paths are each longer than a multiple of a size of the building block, e.g., the diameter, say that they are each 2 times as long or more, 2.5 times as long or more, etc. This stricter rule is not required though to improve designs.

Typically, more than one electrode line in the building block satisfies this condition. For example, in an embodiment, a building block comprises multiple electrode lines that are not electrically connected within the building block, a longest path on each of the multiple electrodes is longer than twice the diagonal length of the building block. The number of electrodes in that multiple could be, at least 2, at least 4, at least 10, etc.

By adapting the shape of the electrodes undesirable diffraction effects can be altered. Decreasing the diffraction effect is especially important for transparent substrates, since for, e.g., a diffusive reflective display, such as might be applied in an e-reader, the effect will be much less pronounced. However, specular reflective displays, such as dimmable mirrors, will be affected by the diffraction effect. The inventors found that the optical diffraction in light modulators may be decreased by orienting the line shapes of the electrodes in multiple different angles, spreading the diffraction in space and therefore decreasing the intensity of the most intense diffraction spots. For example, for a dimmable mirror reducing diffraction is important.

In an embodiment, a dimmable mirror comprises a light modulator according to an embodiment. For example, the dimmable mirror comprises a transparent substrate, an optical layer, and a reflective substrate. One or both of the substrates is according to an embodiment. The dimmable mirror may be electrophoretic. Typically, each substrate has two electrodes, but this is not necessary.

Figure 1C:
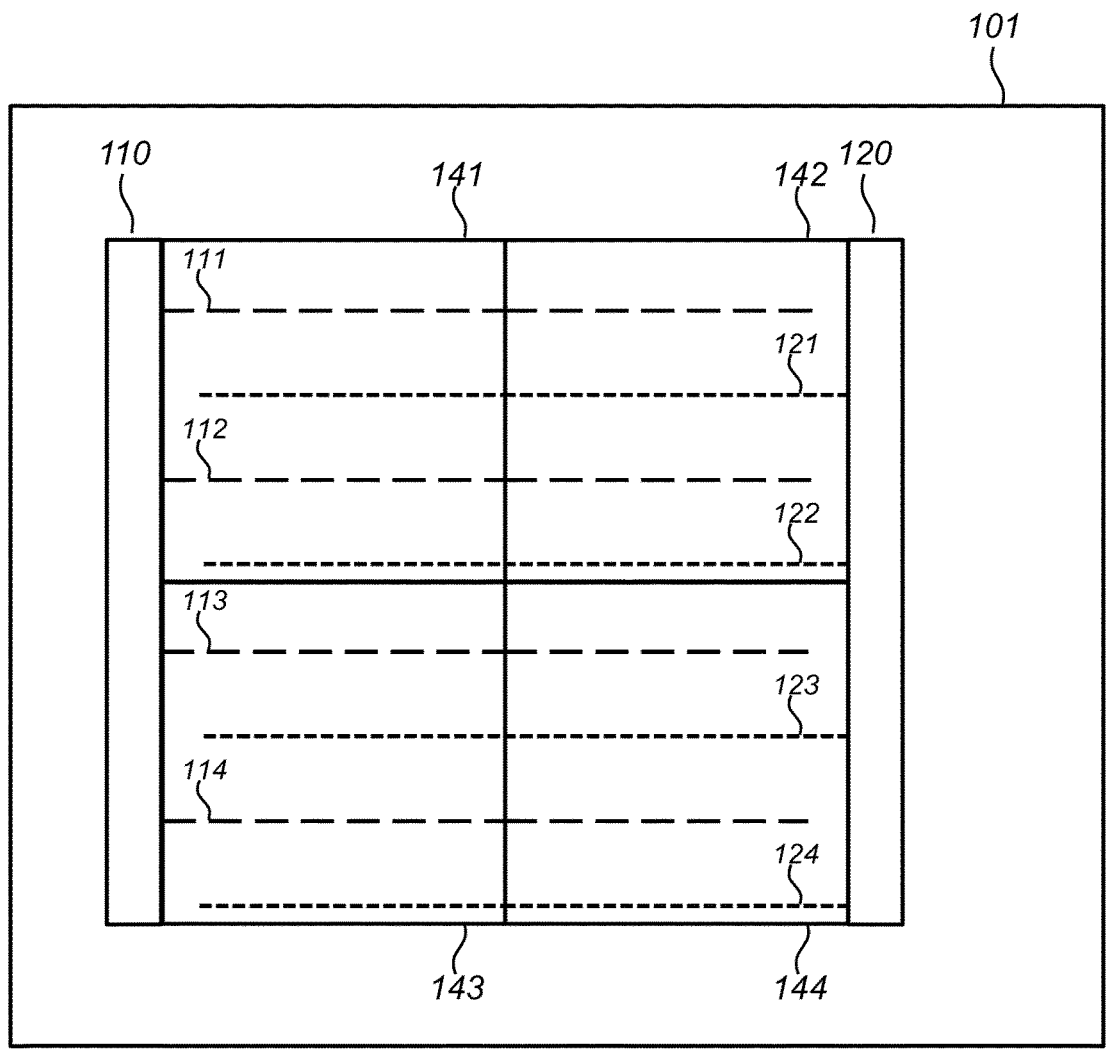

FIG. 1c schematically shows an example of an embodiment of a substrate 101. Substrate 101 is similar to that of substrate 100, except for how the main lines are connected that formed from the electrodes on the building blocks to the driving buses. In FIG. 1a, a connection zone is inserted between the repeated building blocks and the driving buses 110 and 120. In the connection zone, the main lines belonging to the same driving electrode are connected to the same driving bus. In FIG. 1c, the driving bus are directly adjacent to the building blocks. To avoid that a driving bus would connect to main line of a different driving electrode, some of the building blocks are modified.

For example, building block 141 may be a copy of building block 140, but the electrode 134 is shortened so that the main line 122 of which line 134 is a part does not connect to bus 110. In FIG. 1c the building blocks are substantially the same except that a disconnect is introduced in some electrodes of building blocks next to the driving bus to avoid connecting a main line with the driving bus. Although all building blocks shown in FIG. 1c are modified in this way, in an embodiment the majority of building blocks would not be modified, e.g., the building blocks that are not adjacent to driving busses 110, 120.

Figure 1D:
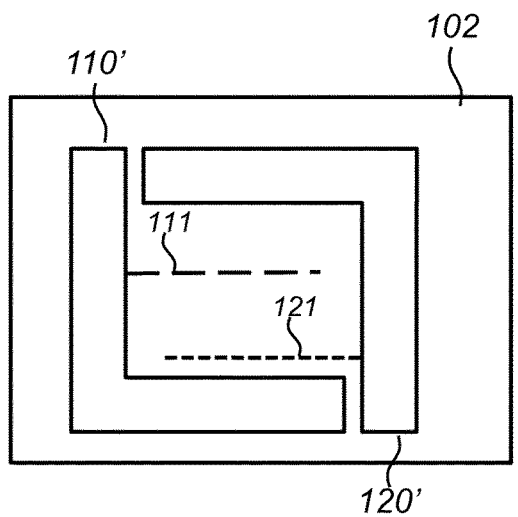

FIG. 1d schematically shows an example of an embodiment of a substrate 102.

In an embodiment, the electrodes in a building block each connect the same opposite sides of the building block. This has the consequence that the main lines that are formed by the electrodes on the building block connect opposite sides of the substrate. In such a situation having only two driving buses, e.g., each extending along an opposite side of the substrate, is sufficient to connect and drive the driving electrodes.

It is however not required for the electrodes in a building block to connect opposite sides of the building block. Although typically all electrodes in a building block will connect two sides of the building block, it is not required that these two sides are opposite. The reasons for this, is that an electrode may be continued by a next building block. In such a situation most main lines will still connect the same two opposite sides, but at the edge of the substrate this may not happen, as there are no further building blocks there to carry the electrode forward. To allow for more intricate electrode designs on the building blocks, the main line may be connected to a driving bus from two sides, e.g., two sides of the substrate that are adjacent to the same corner of the substrate.

Shown in FIG. 1d, is a driving bus 110' extending along two sides of the substrate and a driving bus 120' extending along the other two sides of the substrate.

An advantage of this configuration is that the driving buses can be made in the same plane. This is not necessary though. A driving bus could connect from three or all four sides if desired, e.g., to further increase design freedom for the building blocks. Various examples are given herein.

Note that driving electrodes, e.g., driving busses, and/or main lines are allowed to overlap. This is possible, e.g., by causing a part of dielectric material between the electrodes. For example, such overlapping electrodes could be partly or fully in different planes of the substrate.

For example, in an embodiment one might depose the first driving electrode. Then locally depose a dielectric, and finally depose a second driving electrode. The dielectric is arranged to cover at least the points where the first and second electrode cross. A via could be used to the lower first driving electrode, e.g., to connect to it. The deposing of the driving electrodes may include the deposing of the driving busses.

Figure 1E:
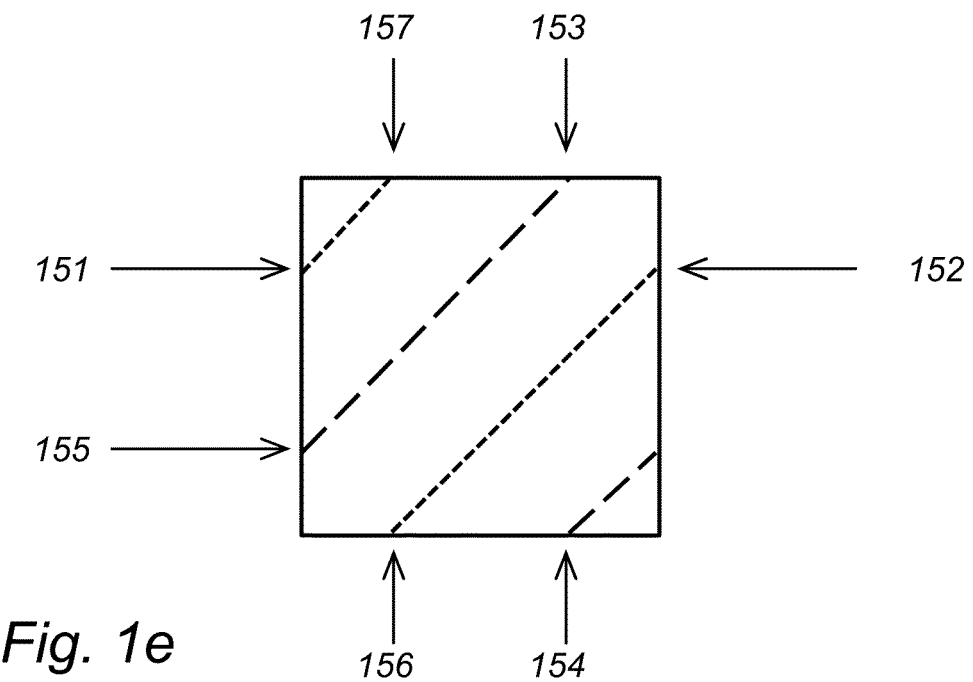

FIG. 1e schematically shows an example of an embodiment of a building block. Schematically indicated in FIG. 1e are two electrodes. In an actual implementation, the tracks of the shown electrodes would typically be much more convoluted.

The building block of FIG. 1e shows four electrode lines that are each connected to at least two sides of the building block. In this case the electrode lines do not directly connect opposite sides of the building block. Connecting opposite sides of the building block is not required, since a driving electrode needs only to be driven from one side. However, to cover the substrate it is convenient if at least one or more of the electrodes reach the opposite side from where they are driven. This is not necessary; one could have main lines electrodes reaching only part of the substrate and drive them from two sides.

FIG. 1e shows that the main-electrode in which in a particular electrode line of a building block is incorporated can still reach across the substrate even though the electrode line does not connect opposite sides. For example, the electrode line starting at 151 on the left side connects to the non-opposite upper side of the building block at 157. If the same building block were repeated atop the shown building block, the main line that this line forms is continued at point 154 of the repeated building block, which then reaches the opposite side of the repeated building block at 152. Similarly, at 155 on the left side of the building block an electrode line starts that will be part of a second driving electrode. This electrode line connects to the upper side at 153, and is continued in the repeated block at 154. Accordingly, an electrode line that starts at the left side of a building block may not connect to the opposite side of that building block, it might however progress that distance in the x-direction and reach a right side of a building block, but a different one, e.g., the building block above or below the shown building block. The same is also possible, vice versa, for the y direction. In an embodiment, a main line connects sides of the substrate that are opposite in a first direction 191, e.g., x-direction, while running through multiple blocks in the first direction 191, e.g., x-direction, and at least two, or more, blocks in a section direction, e.g., in the y-direction. Typically, the first direction 191 and second direction 192 are orthogonal; this is not strictly necessary, the two directions could be skewed with respect to each other.

Figure 1F:
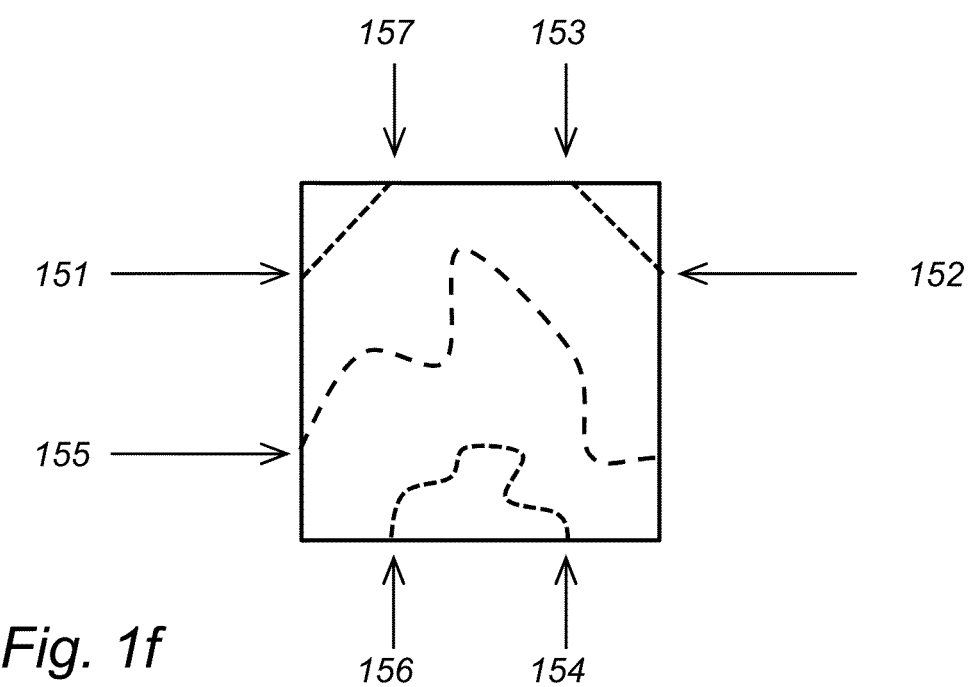

FIG. 1f shows that two electrode lines in a building block need not be connected in the building block, yet they can still be connected in the substrate through a connection in a neighboring building block. For example, consider the electrode starting at the left side, at point 151. The electrode runs off at the top side of the building block. Unlike the example, in FIG. 1e, the main line in which the electrode line starting at 151 is incorporated does connect to the opposite site of the building block shown in FIG. 1f.

The electrode line starting on the left side of the building block at 151 connects to the upper side of the building block at 157. If the same building block is repeated at top of the shown building block, then the electrode line will connect at the bottom side at point 156, connect to the same side at a point at the bottom side at point 154. Returning to the building block shown in FIG. 1f, the electrode line continues in its upper side at point 153, and connects at point 152 to the right side, that is, the side opposite of the side of point 151.

In an embodiment, a driving electrode, e.g., a main line of the driving electrode, connects a first point on a first side of a first building block, to a second point on the opposite sides of the same building block, between the first point and second point, the main line crossing at least as second building block next to the first building block.

In this example, the longest path between two points on the same electrode line is formed by the path beginning at 155. According to an embodiment, the length of the longest path is a multiple of a size of the building block, e.g., a side, or a diagonal; for example, the longest path may be at least twice the length of the diagonal. In this example, there is only one path of that length, but there may be multiple such long path.

An alternative requirement may be to take into account paths that extend through neighboring building blocks. For example, the longest path starting at a side, e.g., the left side, and connecting to the opposite side of the same building block may be a multiple of the diagonal of the building block; this path may run through neighboring building blocks. Using this definition a somewhat higher threshold could be used, e.g., two, but higher is also possible, e.g., three.

In an embodiment, an electrode line on a building block connects two points on the same side.

In an embodiment, an electrode line on a building block connects two points on different, non-opposite sides of the building block.

Also shown in FIG. 1*f* is an electrode line that connects two opposite sides of the building block. In an embodiment, all electrode lines on a building block connect opposite sides of the building block. Though, as shown, this is not necessary. Typically, the driving bus is straight, while the main-lines are convoluted.

FIG. 1*g* schematically shows an example of an embodiment of a substrate. Shown in FIG. 1*g* is a variant way of tiling the substrate with building blocks. In FIG. 1*g* building blocks are staggered. For example, in a first direction 191, e.g., in an x-direction, building blocks 160 are aligned in a row. At the top of a building block, the building blocks are also aligned in a row, but the building blocks are at an offset to the row below. The offset shown in half a block, but this could also be another fraction of the building block width, e.g., ⅓ of a building block width.

If a rectangular substrate is desired, a partial building block can be added to a row, to fill the substrate. Shown in FIG. 1*g* are two half-width building blocks: building block 161 and building block 162. Building blocks 161 and 162 can be identical to half of the substrate 160, but more typically, they are designed to connect the driving electrodes and the coverage of the substrate. As shown, each row has a partial building block, e.g., building block 161 in odd rows, and building block 162 in even rows. However, one could have a staggered design, but have both partial building blocks at the start and end of, say, even, rows, and only use full building blocks at the alternating, say, odd, rows.

Other tessellations, e.g., substrate filling tilings, can be used to create electrode patterns. For example, in an embodiment, the building block is a parallelogram, rhombus or the like. In an embodiment, the building blocks may be aligned in rows, where in an odd row the blocks are mirrored, e.g., flipped; sometimes referred to as a glide reflection symmetry. In addition to mirroring, a building block may also be point reflected, or inverted.

FIG. 1*h* schematically shows an example of an embodiment of a substrate. Like in FIG. 1*b* or in FIG. 1*c*, a building block is repeated across the substrate in at least two directions. However, in FIG. 1*h*, multiple different building blocks are used; FIG. 1*h* shows two building blocks 171 and 172. Both block 171 and 172 repeat in two directions, e.g., a first direction 191 and a second direction 192. In FIG. 1*h*, a building block 171 is not directly adjacent to a building block 171, e.g., the two building blocks form a checkerboard filling. This is not necessary though, for example, a first building block could connect at two opposite sides to a copy of the first building block, but connect to a second building block at the other two opposite sides. There may be more than two different building blocks.

Using different tiles, e.g., alternating adjacently in different directions, increases design flexibility, which may be used, e.g., to ensure continuity of supply to the tiles within the interior of the substrate, while at the edges of the substrate a connection to the controller(s) can be made.

Note, that in an electrode scheme a tile may be powered by an adjacent tile. For example, in a checkerboard stitching of building blocks, one building block can power a next one. This may also comprise different tile layouts. For example, vertically adjacent and/or horizontally adjacent tiles may be different. In an embodiment, part of the checkerboard is repeated, while part comprise different tile. For example, consider 5 adjacent tiles, e.g., center, left, right, above, and below; such tiles may be different or repeated, but preferably are configured to connect electrode lines, either to an electrode line in an adjacent tile and/or to an overall driving bus.

Figure 2A:
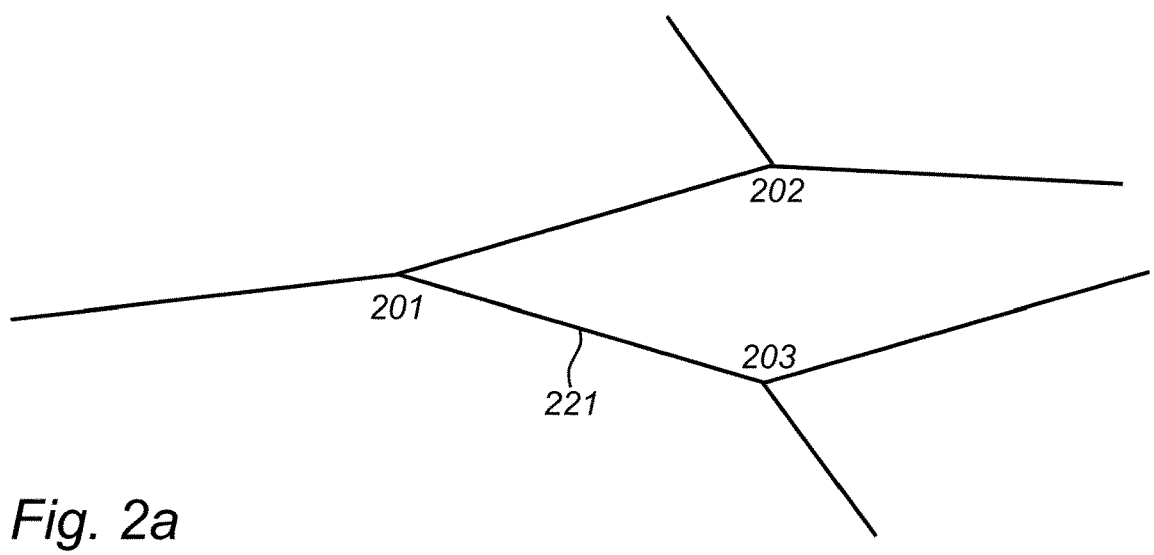

FIG. 2*a* schematically shows an example of an embodiment of an electrode; in a substrate the electrode is part of a single driving electrode. For example, the electrode shown in FIG. 2*a* could be part of an electrode line in a single building block. The shown electrode could also be formed from multiple building blocks that are next to each other. For example, the clusters shown in FIG. 2*a* or 2*b* could be part of the main lines 111-114, 121-124, or electrode lines 131-134.

The electrode comprises multiple nodes where the electrode branches. Shown are branching nodes 201, 202 and 203. The nodes are electrically and directly connected through electrode lines. One such electrode lines between branching node 201 and branching node 203 is shown with a reference numeral 221.

It was found that having multiple branching nodes in an electrode is beneficial for increasing the ratio between electrode length and building block diagonal, which in turn is beneficial for decreasing diffraction. Having clusters of branching nodes causes the electrodes to make a larger variety of angles, which contributes to reducing diffraction.

In an embodiment, a main line, or even a driving electrode forms a tree, e.g., an undirected and non-cyclic graph. Preferably, the tree comprises many branching nodes. Branching nodes have the advantage that they allow the introduction of angles between the electrode lines. For example, FIG. 1*a* shows a branching node 201 that is directly connect to two further branching nodes: node 202 and node 203. At all three nodes 201-203 the electrode branches.

Figure 2B:
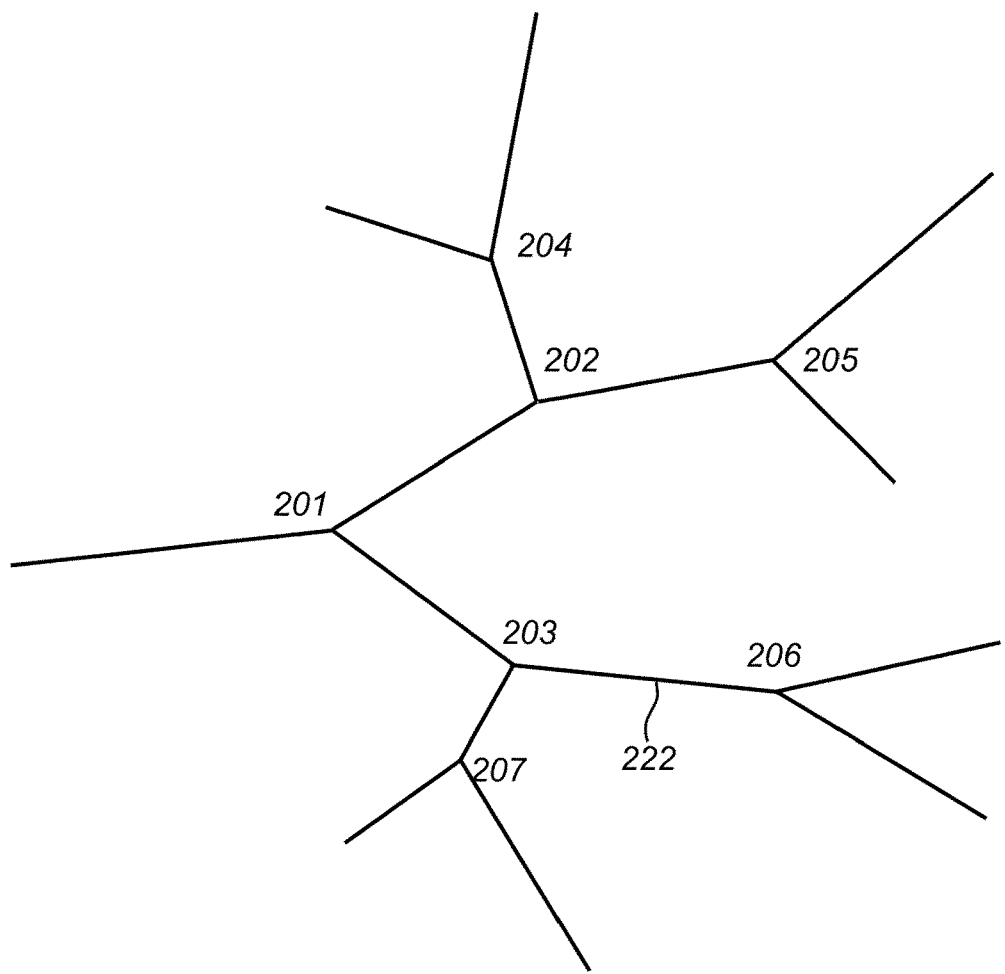

FIG. 2*b* schematically shows an example of an embodiment of an electrode. This example elaborates the example of FIG. 2*a*. Shown are 7 branching nodes of an electrode. Branching node 201 is directly connected to branching node 202 and branching node 203. Branching nodes 202 and 203 are also connected to two further branching nodes each. Branching node 202 is connected to branching node 204 and branching node 205. Branching node 203 is connected to branching nodes 206 and 207. The direct connection between branching nodes 203 and 206 is indicated with reference numeral 222.

The branching patterns of FIG. 2*a* or of FIG. 2*b* increase the ratio between electrode length and building block diameter or diagonal. These branching patterns also increase the variety in directions of the electrode lines, and reduce long stretches of parallel electrode lines. Such improvements are also of value without the contribution to the ratio. For example, in an embodiment a substrate for use in a light modulator is provided, wherein, the substrate comprise multiple interdigitated driving electrodes (111-114,121-124) applied to the substrate, each of the multiple driving electrodes being arranged in a pattern across the substrate, the multiple interdigitated driving electrodes being arranged alternatingly with respect to each other on the substrate, wherein an electrode on the substrate comprises multiple nodes where the electrode branches, the nodes being electrically connected through electrode lines, the multiple nodes and connecting electrode lines forming a tree, the electrode comprising at least a first node (201) where the electrode branches into at least three electrode lines, the first node (201) being directly connected through an electrode line to a second node (202) and to a third node (203), the electrode branching into at least three electrode lines at the second node and at the third node.

Figure 2C:
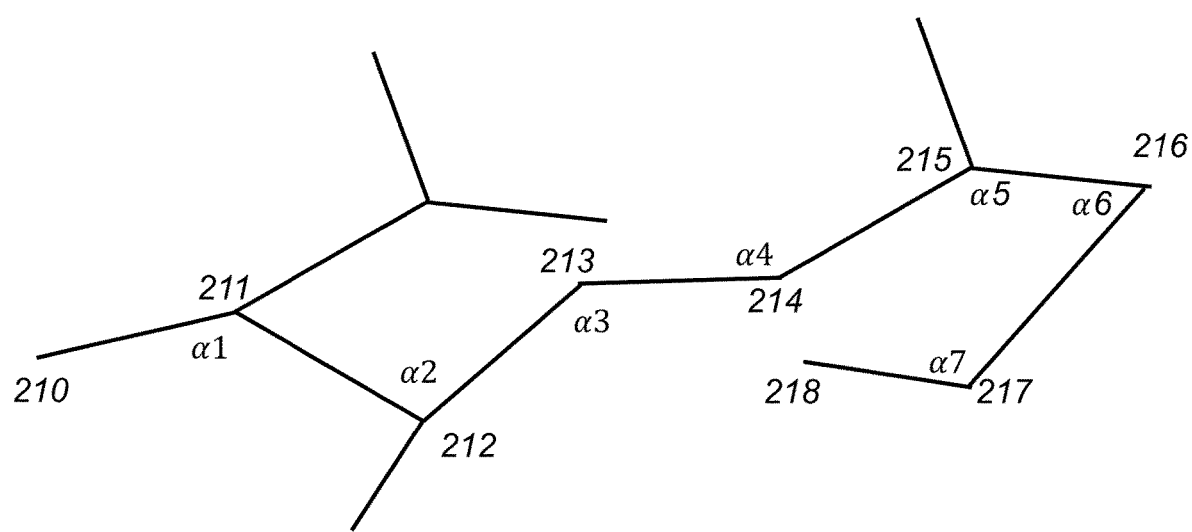

FIG. 2*c* schematically shows an example of an embodiment of an electrode; in a substrate the electrode is part of a single driving electrode. For example, the electrode shown in FIG. 2*c* could be part of an electrode line in a single building block. The shown electrode could also be formed from multiple building blocks that are next to each other.

Shown are 8 nodes: nodes 210-218 directly connected with electrode lines. FIG. 2*c* does not show branching for all of these nodes. In fact, not all nodes need to be branching nodes. For example, a node may connect two electrode lines at an angle.

For example, the path from 210 to 218 may be the maximal length path between any two points on the electrode, e.g., from points 210 to 218. Along the path from node 210 to node 218, subsequent electrode lines make an angle. These angles are denoted as $\alpha 1$ up to $\alpha 7$. For example, $\alpha 1$ is the angle between the electrode line from node 210 to 211 and the electrode line from node 211 to node 212.

To reduce diffraction, it is preferred that the angles in the design are non-uniform. For example, the angles along a path, e.g., a longest path may be chosen randomly, or may be chosen to sample the range of possible angles in the range from 0 to 360 degrees uniformly. For example, in an embodiment, angles are chosen such that for from at least every block of 30 degrees, an angle is chosen. For example, an angle may be chosen from each of the ranges 1-30, 31-60, . . . 331-360. Long paths have an impact on diffraction; having many angles in a long path makes the path less uniform and may thus reduce diffraction. The measurement may also be done by first reducing all angles modulo 180.

Instead of restricting to angles along a path, one may include all angles at nodes in a building block. For example, a node connecting n electrode lines, defines n−1 angles between consecutive electrode lines. Also for these angles, it is preferred that they are uniform, and represent the full range of angles. For example, they may be randomly selected, or selected to sample the full range of angles, e.g., from 0-180 degrees.

The nodes are preferably chosen to cover the building block, and thus the substrate. For example, the nodes may be selected randomly across the building block.

Note that electrode lines between nodes may be straight or curved. Having straight lines makes computations on the design easier, though curved designs provide more flexibility which can be used to combat diffraction. For a curved design such as FIG. 3 below, one might restrict consideration of angles to the branching nodes. In an embodiment, the substrate is curved, the multiple repeated building blocks comprising at least two different shapes.

Figure 3:
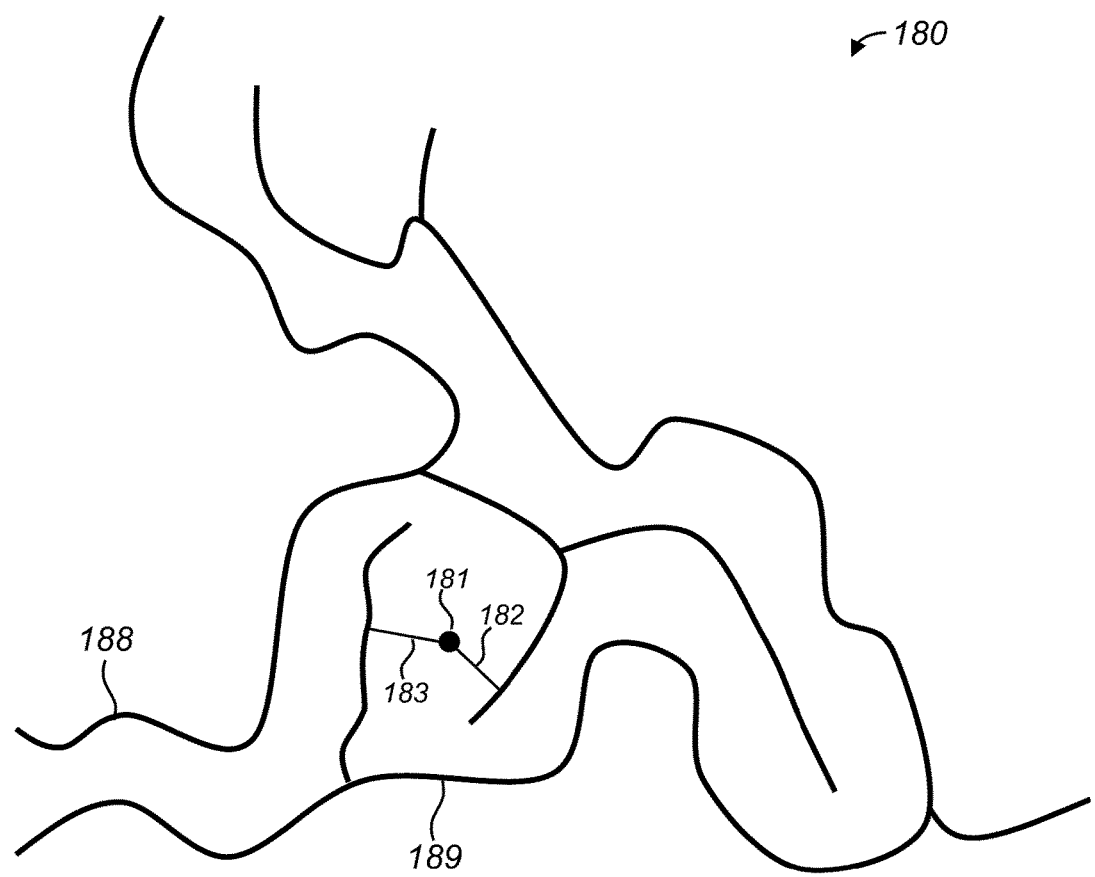

FIG. 3 schematically shows an example of an embodiment of a substrate 180. Shown is a detail of two driving electrodes: electrode 188 and electrode 189. The shown detail may for example, be part of a building block. The detail may also form because two building blocks that are aligned next to each other.

FIG. 3 shows an example of electrodes that comprise curved electrode lines. The considerations below also apply to design using straight-lined electrode lines.

Shown in FIG. 3 is a point 181 on the substrate, which does not lie on an electrode. At such a point control of the electric field is desired, so that electrophoretic movement of particles in an optical layer adjacent to substrate 180 can be controlled. Point 181 is indicated as a small disc for clarity.

For a point such as point 181 the distances to the nearest two electrodes can be computed. The nearest distance between an electrode and a point 181 may be considered to be the smallest distance between any point on the electrode and point 181. For example, for point 181 and electrode 189, the nearest distance is obtained at 183. For example, for point 181 and electrode 188, the nearest distance is obtained at 182. Distances are computed as Euclidean distances.

For example, desirable objectives when an electrode pattern are the following.

From any point in the substrate, e.g., point 181, a nearest distance to the first and to the second driving electrode should both be below a threshold. For example, distance 183 and distance 182 should both be below a threshold. Such a threshold preferably holds across the entire substrate, e.g., across the entire part where particle movement is to be controlled. Having limits on the distance a point can be removed from an electrode put limits on the attenuation of the electric field at the point from that electrode. Values for the threshold depend on the strength of the electric fields, on the desired uniformity of the optical effect, the speed and uniformity of transitioning between different optical states, etc. As an example, one could set the threshold on 50 micrometer.

Another way to limit the divergence of electrodes from each other, is to limit the sum of the nearest distance to the first and to the second driving electrode, e.g., to require that these should be below a first threshold. For example, that the sum of distance 182 and 183 are below a first threshold. If two electrodes diverge too much from each other a slow region between them might exist where neither electrode has much influence, e.g., both electric fields are too attenuated. A suitable threshold again depends on the particular application, but as an example one can take 100 micrometer as the first threshold.

At the same time one may also wish to avoid the electrodes from coming too close to each other. For example, if the electrodes on a substrate are too close to each other, the chance of accidental short circuits increases. For example, one may require that the sum of distance 182 and distance 183 is at least a second threshold. Suitable values for the second threshold depend on the application. As an example, one could take the second threshold as 10 micrometer.

Upper and lower bounds for the distance between electrodes can be computed for any point on the substrate and suitable bounds can be set for them as indicated. To simplify computation, one could require that a distance from a point on a first driving electrode to a point on a second driving electrode is at least a second threshold. For example, this distance may be taken as 10 micrometer as well.

For electrode patterns in which the electrode lines are lines, computations can be further simplified, by restricting the computations to nodes, including end-points of electrode lines.

In an embodiment, a horizontal size, e.g., in a first direction 191, e.g., an x-direction, of the building block is at least 10 times the sum of an electrode line width and an electrode distance, also referred to as the line gap. For example, the electrode distance may be taken as the sum of the maximum nearest distances to the two nearest electrodes, e.g., the sum of distance 183 and distance 182. The electrode line width and the electrode distance depend on the application. As an example, the electrode line width may be taken to be 5 micrometer. The electrode line width may be 1 micrometer, or 10 micrometer, or in between, etc. Other values are possible. For the vertical size of the building block, e.g., in a second direction 192, e.g., y direction the same lower bound as for the x-direction could be taken. For example, a building block is rectangular, or square, with dimensions of its sides being at least 500 micrometer, e.g., at least 1000 micrometer, etc.

In an embodiment, the electrode line width is not constant when measured along an electrode line. For example, electrode line width may be measured orthogonal to a side of the electrode line. Constant electrode line width have the drawback that the interline distances also tend to be (more) constant, which in turn contributed to diffraction. In practical designs the width of an electrode is typically kept below a maximum. As an example value, one might take the maximum as the maximum interline distance of the electrodes, so that electrode lines are nowhere thicker than the space between the electrodes.

The line gap, e.g., the distance between electrodes, need not be constant. It is possibly to have a low-diffraction design with substantially constant line gap, e.g., in a spiraling design, such as the spiral design of FIG. 5b, but in a more randomized design, e.g., a Waal design the line gap is typically not constant but allowed to vary, e.g., within a range.

Having building blocks too small may lead to diffraction due to the repetition of the similar building block. Having building blocks too large may lead to problems with optimization and evaluation within production. As an example the sides of the building block may be 0.5 mm, 1 mm, 1 cm and 10 cm, but may run up to say, 100 cm, or higher. For example, one or both sides of a building block may be between 0.5 mm and 10 cm.

In an embodiment, the building block is square, though rectangular is possible. In an embodiment, the building block sides have the same ratio as the substrate. In an embodiment, the building block is not square, but may be any plane filling shape or shapes. For the diameter, e.g., the largest distance between two points of the building block, the same lower bound as for the x-direction could be taken.

The electrode pattern may be optimized for various constraints. For example, the length of the electrodes is preferably short to keep electrical resistance low. In an embodiment, for a point on the substrate the length of the nearest two electrodes up to that point is approximately equal, e.g., having a ratio within a threshold of 1.

Of particular importance is optical diffraction, which is preferably below a threshold. Further information on diffraction for various example designs is given herein.

Optical Diffraction

To estimate optical diffraction the following method has been used
  1. Preparing the design pictures:
    Crop to 1024×1024 microns (unit cell size);
    Normalize pixel values to 255 (black=0; white=255);
  2. Use the Bluestein method [1, 2] to calculate the magnitude & angle, without scaling;

Because light diffraction can be formulated as Fourier transforms, a conventional method is to use the fast Fourier transform (FFT) algorithm. However, the use of the FFT requires a fixed sampling relation between the discretization of the input field and that of the output field. The Bluestein method is efficient and flexible in choosing the sampling grid and it uses chirp z-transform (CZT) algorithm instead of the FFT algorithm.

3. Find the maximum intensity of the zero-order (main) peak ($I_{main}$) from the Magnitude Spectrum;
  4. Ignore the pixels with signal from the $I_{main}$ peak in the Magnitude Spectrum;
  5. Find the maximum intensity among all the other higher-order peaks ($I_{higher}$);
  6. The resulting diffraction metric value is computed as in Ref. [3]:

Pixelated noise metric (%)=$I_{higher}/I_{main}$

Experiments confirmed that the computed pixelated noise metric conforms to apparent actual diffraction in a test setup.

Multiple designs have been used to test the noise metric parameter. Table 1 summarizes these tests. In column 1 are listed an informal design name. Column 2 indicates the figure number in which the design is illustrated. Columns 7 and 8 present the estimated intensity values for the zero- and higher-order peaks from the Magnitude Spectrum. Column 9 depicts the resulting pixelated metric values for all design in %. The lower this value is, the better is the diffraction level of the corresponding design.

Column 3 gives the longest length of an electrode in the building block. Columns 4 and 5 give the building block width (x-direction) and height (y-direction). Column 6 gives the ratio between longest electrode length in a building block and diameter length.

The references referred to above are the following. They are included by reference.
[1] Leutenegger, M., Rao, R., Leitgeb, R. A. & Lasser, T. Fast focus field calculations. Opt. Express 14, 11277-11291 (2006)
[2] Hu, Y. et al. Efficient full-path optical calculation of scalar and vector diffraction using the Bluestein method. Light Sci. Appl. 9, 1-11 (2020)
[3] Murray, Ian B., Densmore, V., Bora, V., Pieratt, W. M., Hibbard, D. L., and Milster T. D. Numerical comparison of grid pattern diffraction effects through measurement and modeling with OptiScan software. Proc. SPIE 8016, Window and Dome Technologies and Materials XII, 80160U (2011)

Accordingly, pixelated noise metric may be computed as follows First a black and white design picture is generated to specific dimensions where electrodes lines are black and substrate background is white. The results herein are computed using a regular 8-bit byte to represent one pixel. In this case, 255 was used to represent white, and 0 to represent black. The Bluestein method is then used to calculate the magnitude and angle for the chirp z-transform (CZT) without scaling. The Bluestein method is a Fourier like transform but gives computational properties. Finally, the pixelated noise metric may be computed as the ratio between the higher peak value and the main peak value. The main peak value is determined as the maximum intensity within the magnitude spectrum of the chirp z-transform (CZT) of the design picture, while the higher peak value is determined as the second maximum intensity within the magnitude spectrum chirp z-transform (CZT) excluding the main peak.

location where two electrode lines cross a dielectric material may be arranged between the electrodes. For example, such an insulator may be deposited at the crossing location. For example, a first driving electrode is in a first plane of the substrate and a second driving electrode is in a second plane of the substrate.

Figure 6A:
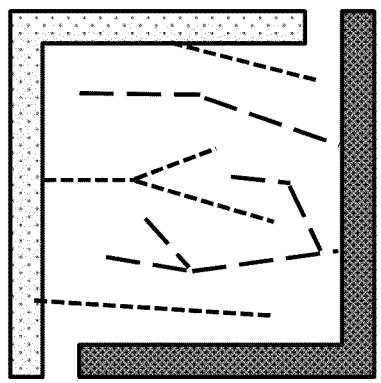

FIG. 6a schematically shows an example of an embodiment of a building block 601. FIG. 1d shows L-shaped driving busses for a substrate, building block 601 is similar in that respect except that driving busses are applied to

TABLE 1

| Design | Figure | Longest length | Building Block Width | Building Block Height | Ratio | $I_{main}$ | $I_{higher}$ | Pixelated noise metric (%) |
|---|---|---|---|---|---|---|---|---|
| Chevron | 4a | 91300.00 | 89000.00 | 40820.00 | 0.93 | 209960.38 | 30874.24 | 14.70 |
| Etna | 4b | 86000.00 | 86000.00 | 60.00 | 1.00 | 217770.00 | 41131.17 | 18.89 |
| VarCircle | 4c | 79271.65 | 72885.00 | 86388.00 | 0.70 | 229803.56 | 22989.78 | 10.00 |
| VarOctogon | 4d | 69759.71 | 72885.00 | 86388.00 | 0.62 | 207953.75 | 28287.31 | 13.60 |
| Rhine1 | 4e | 1060.28 | 1006.00 | 190.00 | 1.04 | 217091.66 | 13310.93 | 6.13 |
| Rhine123C | 4f | 10383.00 | 8023.00 | 8118.00 | 0.91 | 229482.56 | 18654.32 | 8.13 |
| Rhine2 | 4g | 1400.84 | 1011.00 | 165.00 | 1.37 | 215831.36 | 18122.47 | 8.40 |
| Diamond | 4h | 165215.00 | 72933.00 | 86523.00 | 1.46 | 181870.78 | 38646.39 | 21.25 |
| WavyChevron | 4i | 124956.00 | 88400.00 | 40817.00 | 1.28 | 209595.31 | 14557.26 | 6.95 |
| Waal | 5a | 37753.00 | 4962.00 | 4538.00 | 5.61 | 213538.59 | 6700.79 | 3.14 |
| Spiral | 5b | 62128.00 | 2446.00 | 2306.00 | 18.48 | 223799.86 | 13459.40 | 6.01 |

Figure 4A:
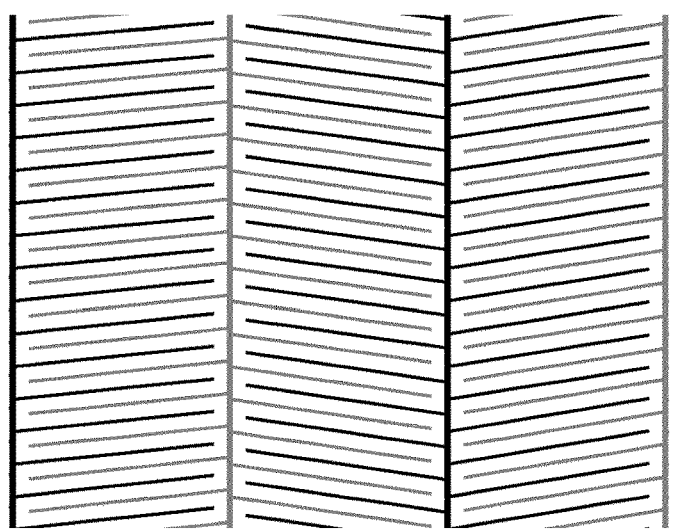
Figure 4B:
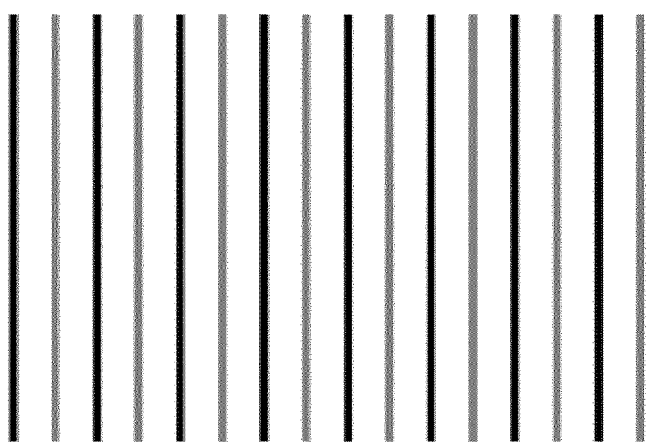
Figure 4C:
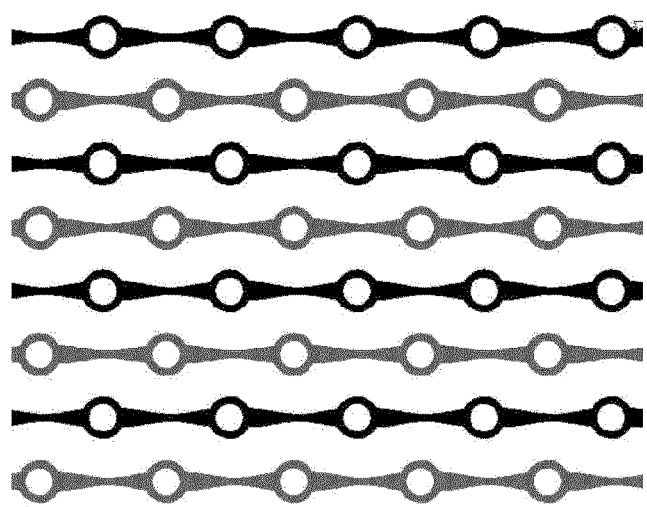
Figure 4D:
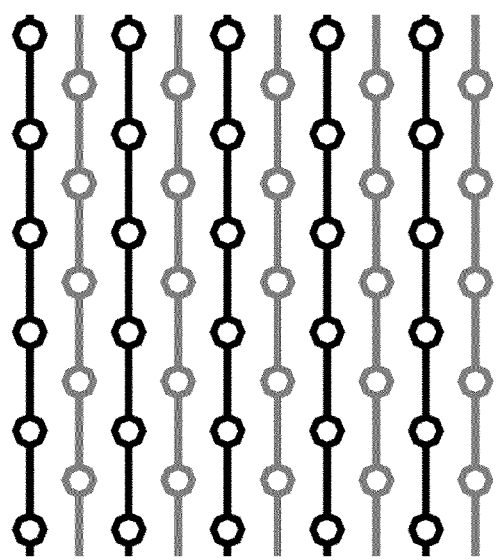
Figure 4E:
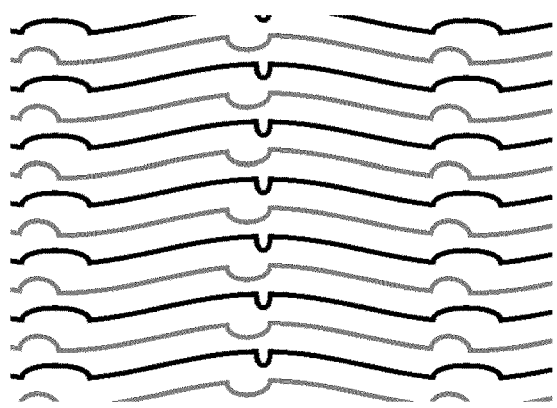
Figure 4F:
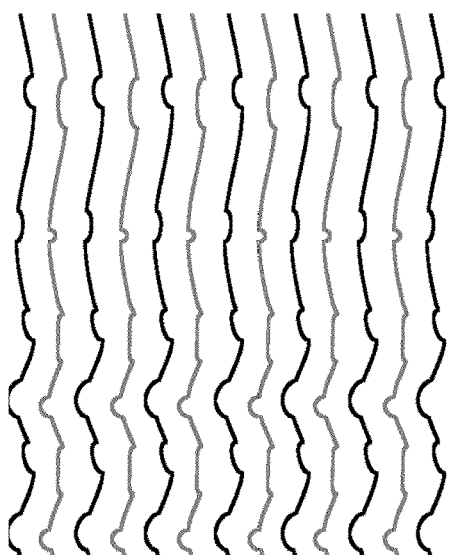
Figure 4G:
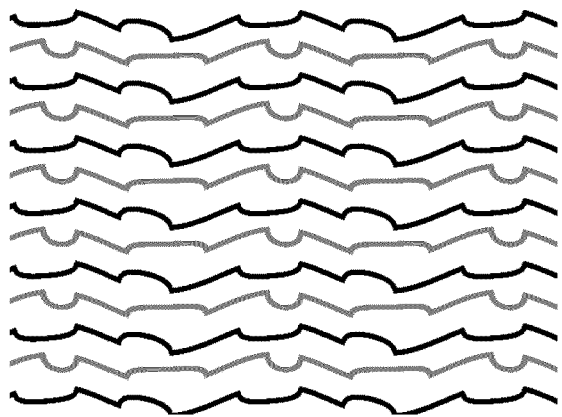
Figure 4H:
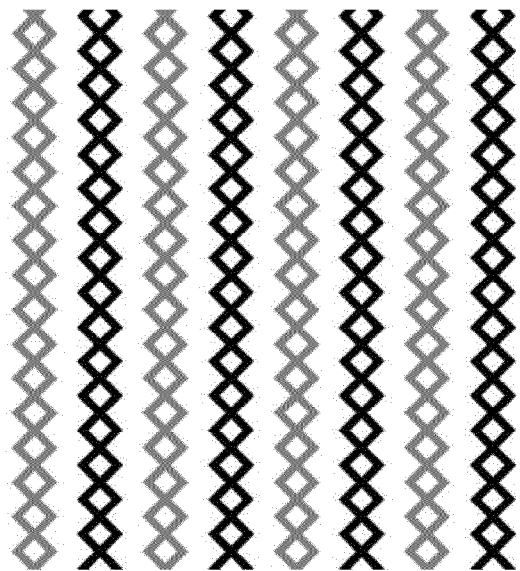
Figure 4I:
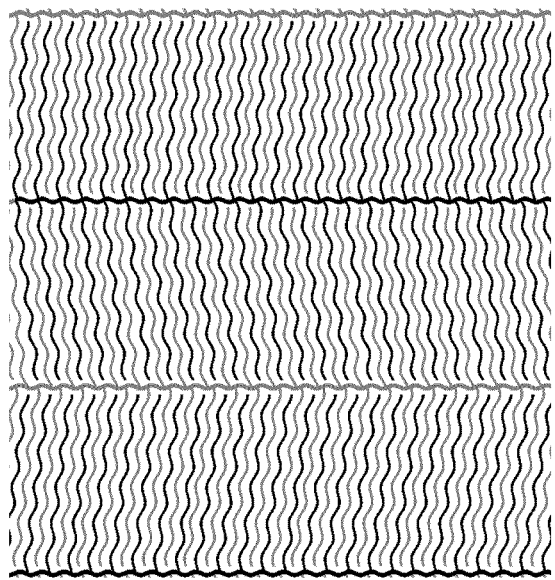
Figure 5A:
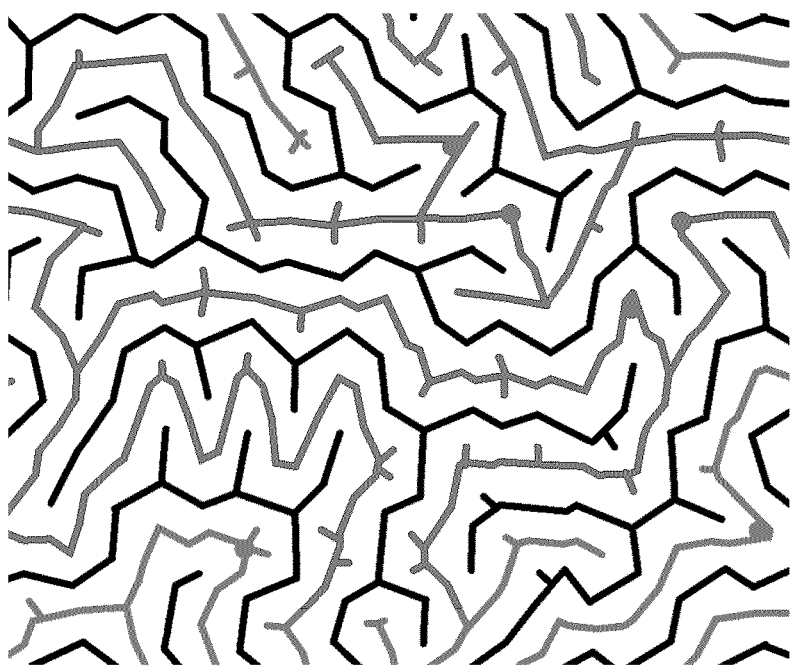
Figure 5B:
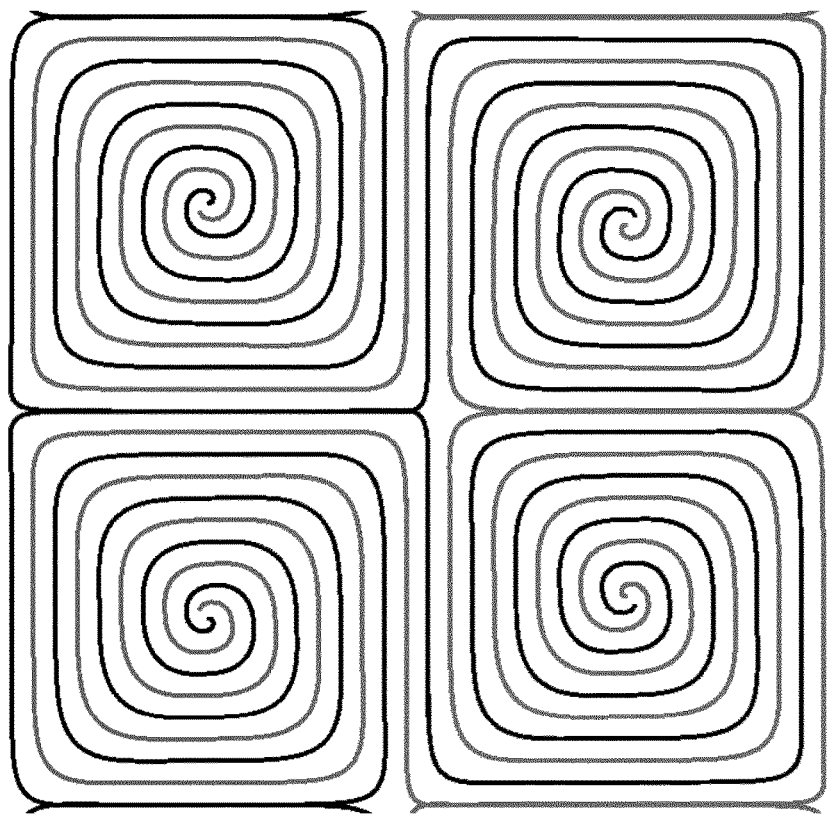

FIGS. 4a-4i schematically show examples of substrates with low ratio. FIGS. 5a and 5b schematically show an example of an embodiment of a substrate with high ratio. Note that high ratio designs have low diffraction. Ratio is computed as the quotient of the longest length and the length of the diagonal of rectangle having the dimension indicated in column 4 and column 5. Column 9 is computed as the quotient of column 8 and column 7. Column 3, Column 4, and Column 5 are in micrometer.

In the past, with experimental designs, it showed hard to get a low pixelated noise metric. However, with designs according to an embodiment it turned out to be possible to get lower pixelated noise metrics.

In an embodiment, the ratio is at least 2, at least 3, at least 5, or at least 10. In an embodiment, the Pixelated noise metric is below 6.10, below 6.07, below 6.05, below 6, below 5, or below 4. In an embodiment, the ratio is at least 2, and the pixelated noise metric is below 6.07. In an embodiment, the ratio is at least 3, and the pixelated noise metric is below 6.07. In an embodiment, the ratio is at least 10, and the pixelated noise metric is below 4. Designs with high ratio can be generated quickly, and can therefore easily be tested and selected for any other requirement.

FIGS. 5a and 5b show designs with two driving electrodes on the surface of the substrate. Either design could be modified to have only a single driving electrodes on the surface of the substrate, e.g., by removing one of the two driving electrodes. For example, such a modified design could be used in a light modulator that uses a substrate with a single electrode.

The design shown in FIGS. 4a-4i, and 5a-5b can be realized in a single plane, without having crossing electrodes. In particular if these designs are connected to two driving buses, no crossing electrodes are needed. When more than two driving electrodes are used, or if more complicated electrode patterns are used, then crossing of the electrodes may be used, or may even become necessary. Such crossings are possible however for example, at the building blocks, which are repeated across the substrate. This brings additional advantages.

Shown in FIG. 6a are a driving bus for each of the two driving electrodes. Schematically, a configuration of the driving electrodes has been indicated in the interior of building block 601. The two driving busses have been patterned to indicate that they drive a different driving electrode. Each of the two driving buses has two arms; the two arms extending along two sides of the building block, which two sides meet at a corner of the building block. In this example, the building block is square although this is not necessary. One of the two arms extends along the entire length of the side, while the other is shortened to avoid electrical contact with the other driving bus. For example, the gap that is left between the two driving busses could be of a similar size as between the driving electrodes, e.g., 50 micrometer. Note that the driving electrodes are connected in part through the driving bus. Some part of the driving electrode connecting to a driving bus in the x-direction, while others connect to a side in the y-direction.

The building block 601 that is so formed can be repeated across the substrate in various ways.

Figure 6B:
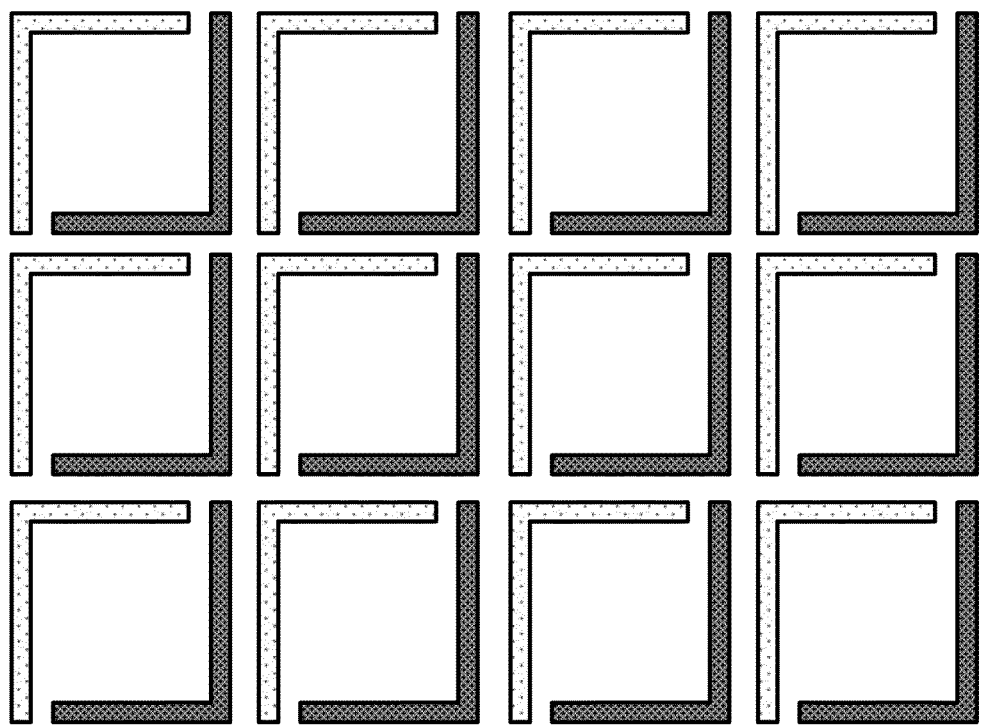

FIG. 6b schematically shows an example of an embodiment of a substrate 602. In FIG. 6b the building block of FIG. 6a has been copied multiple times. To obtain substrate 602, the building block is copied by repeated translation in x-direction and y-direction. Each of the building blocks shown in FIG. 6b can be obtained by a direct translation of any other building blocks.

A disadvantage with this configuration is that the driving bus of different driving electrodes end up facing each other. To avoid a short circuit, a small amount of space has been left, e.g., a comparable width as between driving electrodes, e.g., 50 micrometer. Not shown in FIG. 6b, but the various parts of the translated driving busses, need to be connected to together, e.g., with electrode lines.

For example, indicated at arrow 640, a vertical furrow is formed; that is, two electrode lines that extend in parallel close to each other. Similar furrows exist in the horizontal direction. Such furrows have been found to have a detrimental effect on diffraction. If the building block has low diffraction, then the design may still be better than patterns using less good building blocks, but it would be desirable to avoid these furrows.

Figure 6C:
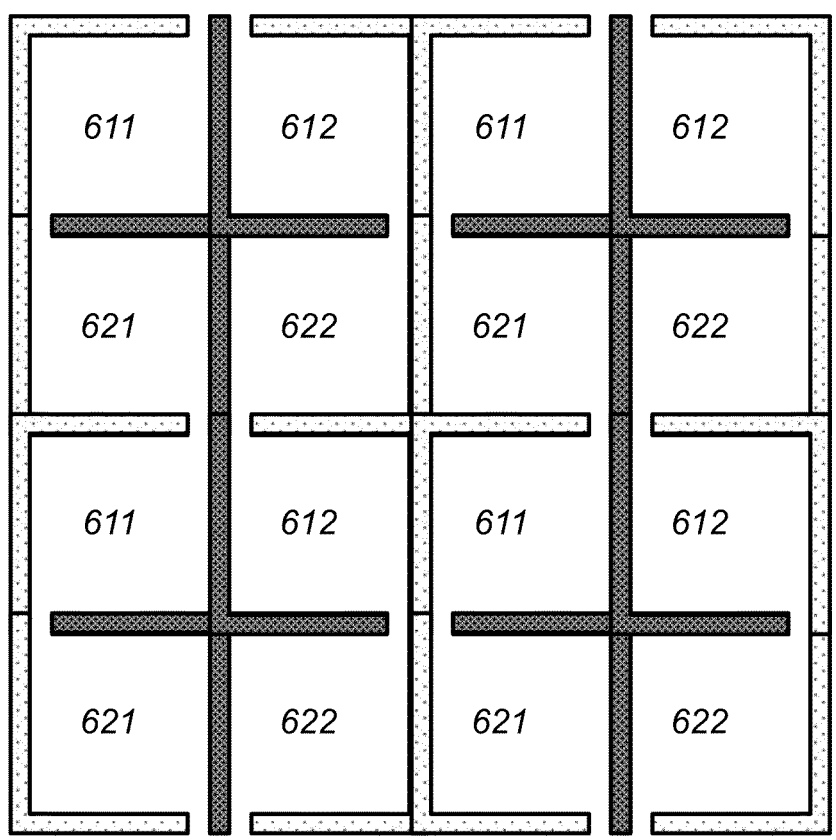

FIG. 6c schematically shows an example of an embodiment of a substrate 603. In substrate 603 the building block is repeated across the substrate, but it is arranged to avoid furrows as in FIG. 6b. In this embodiment, building blocks are translated and mirrored, in this case in two directions.

Building block 611 has been mirrored in the y-direction to form building block 621. Building block 621 has been arranged directly at the bottom of building block 611. Building block 611 has been mirrored in the x-direction to form building block 612. Building block 612 has been arranged directly at the right of building block 611. Building block 611 has been mirrored in the x-direction as well as in the y-direction to form building block 622. For example, the mirroring may have as mirroring axis a side of the building block.

By mirroring the building block it is ensured that driving busses of the same driving electrode end up next to each other on the substrate. By merging these driving busses a furrow is avoided, and diffraction is reduced.

In an embodiment, at least the driving electrodes on the substrate have mirror symmetry; in an embodiment the driving electrodes and driving busses have mirror symmetry. For example, the substrate is symmetric over an x-axis and/or over a y-axis. This is an important advantage in manufacturing, as this allows the top and bottom substrate to be equal. Eliminating the need to produce separate substrates for the top and bottom of a light modulator, also eliminates the need to keep track of separate type substrates. Moreover, having symmetry in the substrates allows a broken top substrate to be replaced by a bottom substrate and vice versa—as they are the same. A straight line, e.g., a driving bus along the mirror symmetry axis is helpful as the design can be mirrored around it. Using building blocks in mirrored and unmirrored form helps to make mirror symmetric design.

This is particularly advantageous in manufacturing with photolithography steps for patterning electrodes as the same substrate patterning can be used for both substrates of the light modulator limiting production costs. Presence of straight bus bars attached on the building blocks or part of each building blocks facilitates this effect. Having a symmetrical design in one direction to use same electrode pattern for all substrates is possible without a straight bus bars, for example, by local modification of the electrode design at the edge of symmetry line. In an embodiment, the driving electrodes pattern have at least 1 symmetry in 1 direction, e.g., using tiling building blocks with mirroring and/or rotation enable electrode pattern design across the substrate.

Figure 6D:
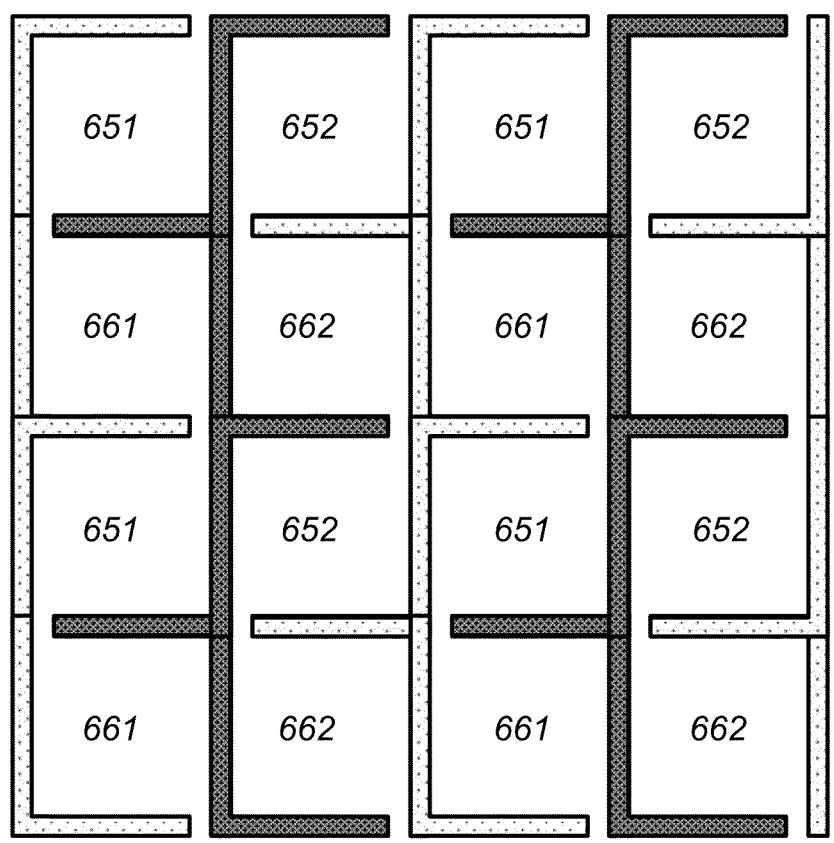

FIG. 6d schematically shows an example of an embodiment of a substrate 604. In substrate 604 the building block is repeated across the substrate, but it is arranged to avoid furrows as in FIG. 6b. In this embodiment, building blocks are translated, mirrored, and rotated over 180 degrees.

Building block 651 has been mirrored in the y-direction to form building block 661. Building block 661 has been arranged directly at the bottom of building block 651. Building block 651 has been point reflected, e.g., rotated over 180 degree, to form building block 652. Building block 652 has been arranged directly at the right of building block 651. Building block 651 has been mirrored in the x-direction to form building block 662.

Note that the odd columns of substrate 604 are the same as those of substrate 603. The even columns of substrate 604 are the same as those of substrate 603, except they are translated in the y-direction over a building block.

By mirroring the building block it is ensured that driving busses of the same driving electrode end up next to each other on the substrate. By merging these driving busses a furrow is avoided, and diffraction is reduced.

An advantage of the patterns of FIGS. 6c and 6d is that both reduce diffraction. A disadvantage of the pattern of FIG. 6c is that the connecting points one of the driving electrodes at the top and bottom of the substrate is much smaller than those of the other electrode. This is not necessarily a problem, as such electrical connection can readily be made, however this issue has been avoided in FIG. 6d where both electrodes are easily connectable and the top and bottom of substrate 604. Note that the driving bus at the far right of substrate 604 could be extended at the top and/or bottom towards the right if so desired.

Another way to obtain the pattern of driving busses of FIG. 6d is to translate building block 651 one block to the right and invert its electrodes, e.g., a driving bus that previously drove a first electrode now drives a second electrode and vice versa. The next row starting with block 661 may be obtained by mirroring row 651. This pattern of transformation would give the same pattern for the driving busses, but when applied to the main-lines, it would make a difference. When a pattern of main-lines is inverted rather than point reflected it will probably look quite different.

It should be noted, though, that the pattern of the driving electrodes could follow the same pattern of mirroring and translating as the driving busses, but that this is not necessary. The driving electrodes could follow a different pattern, e.g., translation as in FIG. 6b, or the like. That would mean that the driving busses could look like in FIG. 6c or 6d, say, but that the main-lines are identical from block to block.

An advantage of driving busses that stretch out across the substrate is that the length along a driving electrode to a point on the substrate is shorter. Moreover, lengths are more uniform, that is, there is less difference between the length of the first electrode near a point and the second electrode near a point.

Driving busses are not necessary. One or more or all of the driving electrodes on a substrate may be provided with power from another source than a driving bus applied on the same side of the substrate. For example, a driving electrode may be connected through a via from one surface of the substrate, e.g., the inner surface, a second surface of the substrate, e.g., the outer surface. The via can be connected at the outer surface to a power source, e.g., the same or a similar power source as may be used for a driving bus. For example, a driving bus may be applied on the outer surface from an edge of the substrate to the via; other configuration are possible. The connection to the power source may be through a controller.

For example, a driving electrode may be isolated from the edges of the substrate; for example, the isolated driving electrode may be hemmed in from all sides by other driving electrodes. Using isolated electrodes significantly eases the design of patterns, as it is no longer needed to ensure that each driving electrode can reach a driving bus. For example, an isolated driving electrode may be connected from the inner side to the outer side using a via; the via may be connected to the controller.

A via may also be used to connect one part of a driving electrode to another part of the same driving electrode. For example, the driving electrode may comprise two parts, which are isolated from each other, e.g., they may be isolated from each other because of another driving electrode running between them. Connecting the two parts over the inner surface may cause an electrical short. In an embodiment, the two parts, or multiple parts, are each connected with a via from the inner side to the outer side. At the outer side the vias are electrically connected to each other; thus forming the driving electrode from its parts.

Returning to FIG. 5a. Electrode designs of this kind can be constructed from tessellations. A particular useful source of electrode designs are Delaunay Triangulations and their corresponding Voronoi duals. These triangulations are a straightforward way to quickly generate large numbers of tessellations, e.g., in order to optimize designs. Other plane fillings can be used however instead, e.g., randomization of regular tilings, or even, aperiodic tilings, such as Penrose tilings.

We refer to Yonghe, L. et al. (2013). "A Simple Sweep-line Delaunay Triangulation Algorithm". In: Journal of Algorithms and Optimization (JAO) 1.1, pp. 30-38. The paper is included by reference.

For example, one could follow the algorithm below. The embodiment is described for covering a substrate, but it could just as well be used to cover a building block.

I: Generation Points Distribution Semi-Randomized in a Specific Area.

Obtain a first set of points covering the substrate. For example, to obtain semi-randomized distribution of points across the substrate, one could do the following.

Step 1—All points initially distributed equally spaced in the area.

Step 2—Then for each point, create a small random variation of the x, y coordinates. For example, one could take the random variation range between the equally spaced point set to not larger than 30% of the initial distance between the points. Another way to obtain such a pattern is to draw the points from a suitable distribution.

II: Calculate a First Network and a Second Network

Step 3—Compute a triangulation. For example, the points may be triangulated wherein each point is connected to 6 neighboring points: except possibly on the edges and corners of the substrate. It was found that Delaunay triangulation performed well for this step. A Delaunay triangulation is an example of a tiling.

A Voronoi pattern, or Voronoi-like pattern is then computed from the triangulation, e.g., as follows:

Step 4—Create a second set of points corresponding to the center of the triangles.

Step 5—Optionally, for each triangle center point, create a small random variation of the x, y coordinates. For example, random variation may be similar as for the first set of points, e.g., variation is not larger than 30% of the initial distance between the points.

Step 6—Connect the second set of points together, across the boundaries of the triangles; for example, compute a dual graph for the triangulation. For example, a center point is connected to its direct neighbors.

If the tiling used is a Delaunay triangulation, and the optional shifting of the second set of point is skipped, then the second network that is thus obtained is a Voronoi network. If a different type of tiling or triangulation is used, or if the center points are shifted, the resulting grid of polygons will not exactly be a Voronoi network; though it will be alike such a network and will be suitable for use in a light modulator.

III: Creation of First and Second Electrode Pattern

At this point two networks have been created, a second network, the Voronoi-like pattern of polygons, and the first network, e.g., the Delaunay triangulation. The two patterns are each other's dual, or nearly so, depending on randomization.

From the second network, e.g., the Voronoi network, the pattern for the second electrode can be obtained by breaking selected edges, e.g., walls of the Voronoi polygons. From the first network, e.g., the triangulation, the electrode for the first electrode can be obtained.

Step 7—Delete edges in the 2nd network (e.g., the Voronoi-like network) until the network is reduced to a tree. This can be done by a path-finding search algorithm, on the first network, e.g., the triangulation, starting from a point in the first set of point, e.g., a center in a Voronoi polygon. The path finding algorithm attempts to find a path to each node of the first network. Such an algorithm is also known as finding a spanning tree in a graph.

Such a search algorithm could be a depth-first search or a breadth-first search. Breadth-first searching provides long but quite straight patterns, while depth-first search provides short not straight patterns. Best results were obtained by following a mix between the "depth first search" algorithm and "breadth-first search" algorithm. For example, depth first search step or a breadth-first search step may be chosen by a probability distribution, e.g., depend on the depth of the search. A suitable distribution is a Gamma distribution.

When an edge in the first network is included in the spanning tree, the dual edge in the second network, that crosses the added edge in the first network is removed. The resulting spanning tree of the first network may thus give rise to a tree or forest in the second network, e.g., the Voronoi network. If the second network is not reduced to a tree or forest fully, this can be accomplished by removing additional edges in the second network.

In this way two trees are produced that cover the substrate and that are interdigitated as needed for a light modulator. The pattern of FIG. 5a was obtained using the above algorithm.

Once suitable graphs are obtained, they can be converted into actual electrode designs by issuing every path segment a thickness. As an example, a thickness of 10 micrometers may be used. For example, a mask layout tool may be used.

Further adaptations that may be made to the design include:

Screening the design unit to eliminate shortcuts between electrode1 and electrode2. Due to the increased thickness, shortcuts may have been introduced. These can be avoided by repeating the process, moving the edges, or moving nodes and repeated the generation process.

Driving busses may be added.

Unifying the second electrode. It may happen that the second electrode is a forest rather than a tree. This can be resolved by adding edges, typically by connecting to driving busses, thus unifying the forest back into a tree.

Correcting points coordinates in an electrode to maintain a minimum line gap between electrodes, say of 20 μm, and/or to maintain an average line gap, say of 50 μm, between the electrodes.

Shift electrodes to allow stitching the design and ensure continuity of the electrodes from 1 unit to another, especially if covering driving busses are not used.

Shift electrodes to reduce light diffraction, refraction, scattering, or Moiré.

Improve or optimize the randomization of short segments orientations to reduce light diffraction, refraction, scattering and Moiré effects. This enables low disturbance of seeing through the display.

Further randomization can be done by converting the straight segments between the points to a curved shape segments. For example, splines may be used between points.

It was found the further optimizing a design can advantageously be done in a number of optimization loops. For example, after generation of a first electrode segments and second electrode segments, e.g., using the procedure above based on tessellations, or a procedure based on Turing patterns, or the like, the segments may be converted to paths giving them a width. For example, a segment may represent the center line of a polygon of a specific width. This procedure will work most of the time, but may give unwanted effects so that further optimization is possible.

For example (A), it may be verified that the first path does not touch the second path. If this condition is violated, the paths of one of them, or both of them, say the first path may be modified so that the first path no longer touches the second path.

For example (B), it may be verified that all first paths are connected in a single first electrode. If the condition is violated paths may be created and/or deleted to connect all first paths into a first electrode.

For example (C), it may be verified that all second paths are connected in a single second electrode. If the condition is violated paths may be created and/or deleted to connect all first paths into a first electrode.

Parts B and C may be repeated in a loop until both electrodes are fully connected. Note that the addition of driving busses to the design, e.g., as described herein may help the unification of the electrodes. If needed, part A may be repeated in this loop as well.

Once the first and second electrode are fully connected and do not short-circuit, a next loop of optimization may be done.

For example (D), it may be verified that the distance between the first and second electrode is always in a predetermined range. If this condition is violated the paths of the first and/or second electrode may be modified to keep the distance in the range.

Part D may be repeated until no points are found where the electrodes are too close or too far apart.

These optimizations may be done in a computer implemented method of optimizing an electrode pattern. Additional or alternative optimizations may be added as suggested herein, e.g., above. For example, the design may be iterated for optical performance, for lengths ratios and the like. Because of the low costs of generating an initial pattern of first and second paths, e.g., using tessellations or the like, the optimization process has the option of terminating the optimization if insufficient progress is made, and start from a new pattern. In an embodiment, the path are not themselves modified but the first set of points and second set of points are modified, and the generation is repeated from that point onwards.

Electrodes obtained through this procedure have a high number of branching nodes, and typically have many different angles. These factors are beneficial for low diffraction. For example, an advantageous substrate for use in a light modulator comprises multiple interdigitated driving electrodes applied to the substrate, each of the multiple driving electrodes being arranged in a pattern across the substrate, the multiple interdigitated driving electrodes being arranged alternatingly with respect to each other on the substrate, wherein at least one of the first and second driving electrode is a spanning tree of a tessellation.

A computer-implemented method for obtaining a first electrode design and a second electrode design for use in a substrate of a light modulator, wherein the first and second electrode both cover the substrate to effect configurable electric fields in the light modulator, the method comprising
- obtaining a tessellation (100) of the substrate, the tessellation comprising multiple cells (101;102;103) that cover the substrate without overlapping,
- obtaining a center point (111) in each cell of the tessellation,
- computing a spanning tree (FIG. 1*c*) on the center points, wherein an edge in the spanning tree represents two neighboring cells of the tessellation,
- deriving the first electrode design (121) from the spanning tree,
- deriving the second electrode design (122) from the tessellation, said deriving comprising removing parts of the tessellation where an edge of the spanning tree crosses a boundary of a cell of the tessellation.

Several variant embodiments are envisioned. For example, in an embodiment as above, one may add any of the following variants.

1. Tessellation
   a. Wherein the tessellation is aperiodic, and/or randomized,
   b. Wherein the tessellation is a Voronoi diagram and/or a perturbed Voronoi diagram
   c. Wherein an initial set of randomized points is selected covering the substrate, a triangulation of the set of points is computed, and the tessellation is obtained as the dual of the triangulation.
      i. The Triangulation may be a Delaunay triangulation
      ii. The set of points may be obtained by perturbing of uniform set of points, of drawing from a distribution, e.g., the Poisson distribution
      iii. The dual may be computed from selected points in the triangles, such as circumcenters.
   d. Wherein a largest diameter of each cell is less than a threshold, e.g., 50 μm.
2. Spanning Tree
   a. The spanning tree computation iteratively builds the spanning tree by selecting a cell from the tessellation that is visited by the partial spanning tree but has unvisited neighbors, the spanning tree is extended by visiting one of the unvisited neighbors.
      i. Selection of the visited cell may be a combination of depth first and breath first, e.g., a gamma distribution.
3. Correct Electrodes
   a. Unify electrodes
      i. Determine components and join them up
         1. For example, through a connecting subplane, or by assigning a separate subplane for each electrode and connecting in the subplane. Components can be joined as well along the sides of the plane or by tiling the design, or by driving busses between building blocks.
         2. Selecting two neighboring components and connect them by reinserting the removed part of the tessellation, removing the corresponding edge of the spanning tree, and/or vice versa.

b. Break circular parts of the second electrode
c. Fix shortcuts between first and second electrodes resulting from giving width to an electrode by moving parts of the first and/or second electrode
d. Verify and fix optical properties
   i. from any point in the plane distance to the first and to the second electrode should both be below threshold (e.g., 50 um), or their sum should be below a threshold (50 um).
   ii. Distance from a point on the first electrode to the second electrode should be at least a second threshold (20 um), and vice versa.
4. Optimal Modulator,
   a. A light modulator as in the usual claim, wherein the first and second electrode design is according to a design method as in any one of the preceding claims.

It should be stressed that the above methods are not the only ways to obtain designs with low pixelated noise metric or with a high ratio between electrode length and diagonal. For example, instead of using Voronoi networks, a network based on Turing patterns may be used; see, e.g., the paper "The chemical basis of morphogenesis" by Alan Mathison Turing, included herein by reference.

The design of FIG. 5b was not obtained from a tessellation but nevertheless gives good values. For example, in a design according to FIG. 5b comprises a spiral. In the spiral, a first electrode line and a second electrode line belonging to the first driving electrode and the second driving electrode respectively are spiral on the substrate. Even though in the area between spirals some electro lines are more or less parallel, the pattern as whole gives good values. The pattern may be even further improved by waving the lines making up the spiral, especially in the other few turns, say turns 1-3 of the spiral. Such a waving could be as shown in FIG. 4e or FIG. 4f, e.g., by adding protrusions to the electrode lines disturbing the pattern. For example, all lines in the spiral may be wavy, with an amplitude of the waviness, e.g., of the protrusions declining towards the center of the spiral.

Two substrates according to an embodiment may be combined to form a light modulator. The light modulator is particularly suited to glazing. An exemplary embodiment of a light modulator is shown below.

Figure 7A:
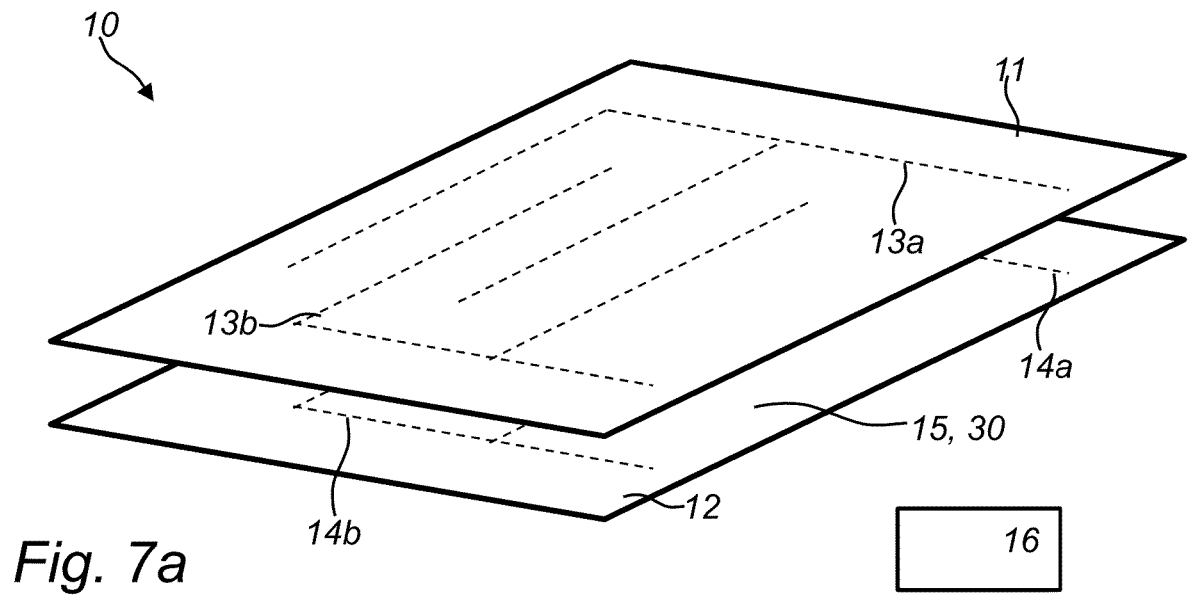

FIG. 7a schematically shows an embodiment of a light modulator 10, which may be applied in smart glazing.

Reference is made to patent application PCT/EP2020/052379, which is included herein by reference; this application comprises advantageous designs for light modulator, which may be further improved, e.g., by including electrodes, building blocks, and/or substrates as explained herein.

Light modulator 10 can be switched electronically between a transparent state and a non-transparent state and vice versa, or between a reflective state and a non-reflective state and vice versa. Light modulator 10 comprises a first substrate 11 and a second substrate 12 arranged opposite to each other. On an inner-side of first substrate 11 at least two electrodes are applied: shown are electrodes 13a, 13b. These at least two electrodes are together referred to as electrodes 13. On an inner-side of second substrate 12 at least two electrodes are applied: shown are electrodes 14a, 14b. These at least two electrodes are together referred to as electrodes 14.

A fluid 15 is provided in between said substrate. The fluid comprises particles 30, e.g., nanoparticles and/or microparticles, wherein the particles are electrically charged or chargeable. For example, particles may carry a charge on their surface intrinsically. For example, the particle may be surrounded by a charged molecule.

The electrodes are arranged for driving particles 30 to move towards or away from electrodes, depending on the electric field applied. The optical properties, in particular the transparency or reflectivity of the light modulator depends on the location of particles 30 in the fluid. For example, a connection may be provided for applying an electro-magnetic field to the electrodes.

At least one, but preferably both electrodes 13 and 14 are according to an embodiment, though they are shown schematically in the figures.

In an embodiment, at least one of the electrode pattern on the first substrate and the electrode pattern on the second substrate have a low calculated pixelated noise metric which contributes to diffraction. Interestingly, the electrode patterns on the substrates might not satisfy the bound on their pixelated noise metric individually, but their combination might, that is their superimposition. As this is the pattern that would be visible when looking through the light modulator, a low pixelated noise metric in the superimposition would also contribute to low diffraction. Suitable bounds for the patterns on the first and/or second substrate or for the superimposition include: below 6.05%, or 5%, or 4%

In an example, substrate 11 and substrate 12 may be optically transparent outside of the electrodes, typically >95% transparent at relevant wavelengths, such as >99% transparent. Taking electrodes into account, transparency can be much lower, e.g., 70%. The term "optical" may relate to wavelengths visible to a human eye (about 380 nm-about 750 nm), where applicable, and may relate to a broader range of wavelengths, including infrared (about 750 nm-1 μm) and ultraviolet (about 10 nm-380 nm), and sub-selections thereof, where applicable. In an exemplary embodiment of the light modulator a substrate material is selected from glass, and polymer.

In another example, one substrate, such as a bottom substrate 12, may be reflective or partially reflective, while the top substrate 11 is transparent. The optical properties, in particular the reflectivity of the light modulator depends on the location of particles 30 in the fluid. When the panel is in the open state (vertical drive), the particles will mostly be located between opposite electrodes of the two substrates, such that incident light can pass through the transparent top substrate and the optical layer relatively unhindered, and is reflected or partially reflected on the bottom substrate.

The distance between the first and second substrate is typically smaller than 30 μm, such as 15 μm. In an exemplary embodiment of the light modulator a distance between the first and second substrate is smaller than 500 μm, preferably smaller than 200 μm, preferably less than 100 μm, even more preferably less than 50 μm, such as less than 30 μm.

In an example the modulator may be provided in a flexible polymer, and the remainder of the device may be provided in glass. The glass may be rigid glass or flexible glass. If required, a protection layer may be provided on the substrate. If more than one color is provided, more than one layer of flexible polymer may be provided. The polymer may be polyethylene naphthalate (PEN), polyethylene terephthalate (PET) (optionally having a SiN layer), polyethylene (PE), etc. In a further example the device may be provided in at least one flexible polymer. As such the modulator may be attached to any surface, such as by using an adhesive.

Particles 30 may be adapted to absorb light and therewith preventing certain wavelengths from passing through. Particles 30 may reflect light; for example the reflecting may be specular, diffusive, or in between. A particle may absorb some wavelengths, and reflect others. Particles may also or instead emit light, e.g., using phosphorescence, fluorescence, or the like. Even the fluid may emit light, which emittance is modulated by changing the location of particles.

In an exemplary embodiment of the light modulator a size of the nanoparticles is from 20-1000 nm, preferably 20-300 nm, more preferably smaller than 200 nm. In an exemplary embodiment of the light modulator the nanoparticles/microparticles may comprise a coating on a pigment, and preferably comprising a core. In an exemplary embodiment of the light modulator the coating of the particles is made from a material selected from conducting and semi-conducting materials.

In an exemplary embodiment of the light modulator the particles are adapted to absorb light with a wavelength of 10 nm-1 mm, such as 400-800 nm, 700 nm-1 µm, and 10-400 nm, and/or are adapted to absorb a part of the light with a wavelength-range falling within 10 nm-1 mm (filter), and combinations thereof.

In an exemplary embodiment of the light modulator the particles are electrically charged or chargeable. For example, a charge on the particles may be 0.1e to 10e per particle ($5*10^{-7}$-0.1 C/m2).

In an exemplary embodiment of the light modulator the fluid is present in an amount of 1-1000 g/m2, preferably 2-75 g/m2, more preferably 20-50 g/m2, such as 30-40 g/m2. It is a big advantage that with the present layout much less fluid, and likewise particles, can be used.

In an exemplary embodiment of the light modulator the particles are present in an amount of 0.01-70 g/m², preferably 0.02-10 g/m², such as 0.1-3 g/m².

In an exemplary embodiment of the light modulator the particles have a color selected from cyan, magenta, and yellow, and from black and white, and combinations thereof.

In an exemplary embodiment of the light modulator the fluid comprises one or more of a surfactant, an emulsifier, a polar compound, and a compound capable of forming a hydrogen bond.

Fluid 15 may be an apolar fluid with a dielectric constant less than 15. In an exemplary embodiment of the light modulator the fluid has a relative permittivity εr of less than 100, preferably less than 10, such as less than 5. In an exemplary embodiment of the light modulator, fluid 15 has a dynamic viscosity of above 10 mPa·s.

Electrodes 13a, 13b and electrodes 14a, 14b are in fluidic contact with the fluid. The fluid may be in direct contact the electrodes, or indirectly, e.g., the fluid may contact a second medium with the electrode, such as through a porous layer. In an embodiment, the electrodes cover about 1-30% of the substrate surface. In an embodiment, the electrodes comprise an electrically conducting material with a resistivity of less than 100 nΩm (at 273K; for comparison typically used ITO has 105 nΩm), which is similar to an electrical conductivity >$1*10^7$ S/m at 20° C.). In an embodiment of the light modulator electrodes comprise copper, silver, gold, aluminum, graphene, titanium, indium, and combinations thereof, preferably copper. The electrodes may be in the form of microwires embedded in a polymer-based substrate; for example, copper microwires.

A connection for applying an electro-magnetic field to the electrodes, wherein the applied electro-magnetic field to the electrodes provides movement of the nano- and microparticles from a first electrode to a second electrode and vice versa. A connection for applying an electro-magnetic field to the electrodes may be provided. For example, in an exemplary embodiment of the light modulator an electrical current is between −100-+100 µA, preferably −30-+30 µA, more preferably −25-+25 µA. For example, a power provider may be in electrical connection with the at least two electrodes. The power provider may be adapted to provide a waveform power. At least one of amplitude, frequency, and phase may be adaptable to provide different states in the light modulator. For example, the aspects of the power may be adapted by a controller.

Light modulator 10 may comprise one or more segments, a segment being a single optically switchable entity, which may vary in size. The substrates enclose a volume, which may be a segment, at least partly.

The present device may comprise a driver circuit for changing appearance of (individual) segments by applying an electro-magnetic field. As such also the appearance of the light modulator, or one or more parts thereof, may be changed. For example, a segment may have an area of at least 1 mm². The present design allows for stacking to allow for more colors; e.g., for full color applications a stack of two or three modulators could provide most or all colors, respectively.

Having one or more segments allows the light modulator to be controlled locally; this is advantageous for some applications, but not necessary. For smart glazing a light modulator may be used with or without segments. For example, applied in smart glazing, transparency or reflectivity may be controlled locally, e.g., to block a sun-patch without reducing transparency or reflectivity in the whole window. Segments may be relatively large, e.g., having a diameter of at least 1 mm, or at least 1 cm, etc.

In an exemplary embodiment of the light modulator substrates (11,12) are aligned, and/or electrodes (13,14) are aligned. For example, electrodes 13a, 13b and electrodes 14a, 14b may be aligned to be opposite each other. In aligned substrates, electrodes on different substrates fall behind each other when viewed in a direction orthogonal to the substrates. When the light modulator is disassembled, and the substrates are both arranged with electrodes face-up, then the electrode patterns are each other's mirror image.

Aligning substrates may increase the maximum transparency or reflectivity of the light modulator, on the other hand, when selecting a light modulator for more criteria than the range of transparency or reflectivity, etc., it may be better not to align or not fully align the two substrates. Light modulators can be stacked. For example, two stacked light modulators can be made from three substrates, wherein the middles one has electrodes on both its surfaces. In an embodiment of the light modulator optionally at least one substrate 11,12 of a first light modulator is the same as a substrate 11,12 of at least one second light modulator. For stacked modulators, alignment may also increase maximum transparency or reflectivity, but is may be detrimental to other considerations, e.g., diffractions.

Figure 7B:
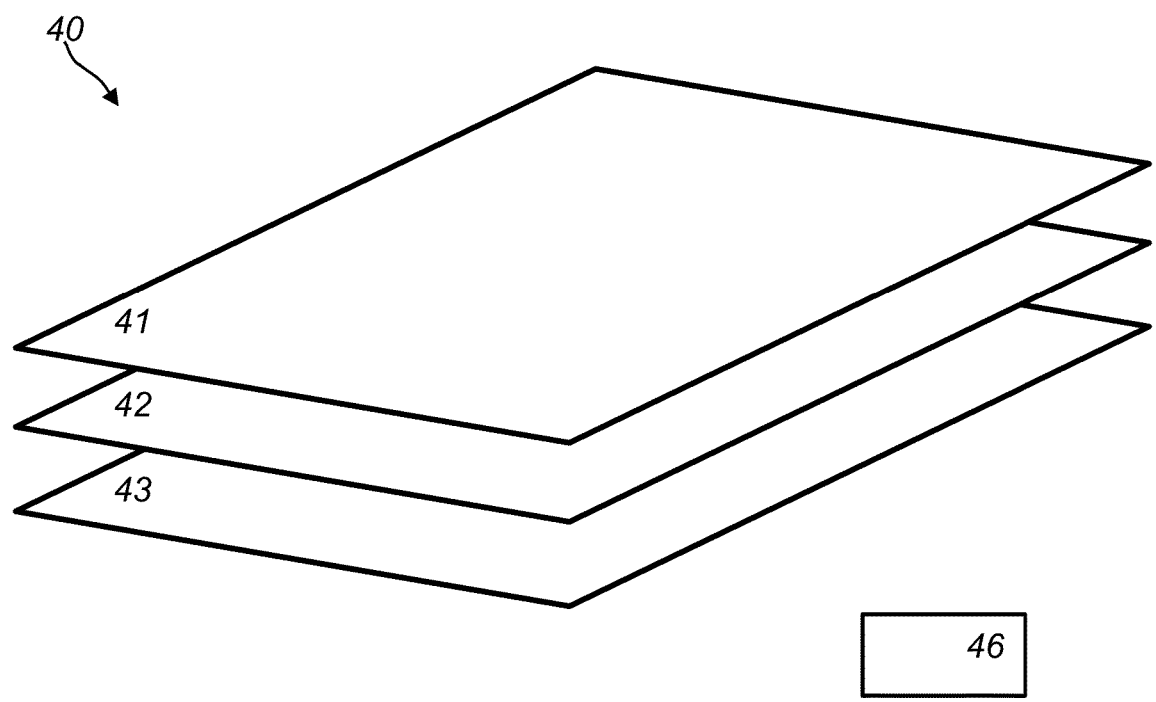

FIG. 7b schematically shows an example of an embodiment of a light modulator 40. Light modulator 40 is similar to light modulator 10, except that it comprises multiple optical layers; in the example as shown two optical layers. There may be more than two optical layers. Each optical layer is arranged between two substrates. Light modulator 40 can be regarded as a stack of two-substrate light modulators as in FIG. 7a. As shown, light modulator 40 comprises three substrates: first substrate 41, second substrate 42 and third substrate 43. Between substrates 41 and 42 is an optical layer, and between substrates 42 and 43 is an optical layer. The optical layers may be similar to those in light modulator 10. A controller 46 is configured to control electrical current on the electrodes of the substrates. For example, in FIG. 7b, controller 46 may be electrically connected to at least 4 times 2 equals 8 electrodes.

Interestingly, the particles in the multiple optical layers may be different so that the multiple layers may be used to control more optical properties of the light modulator. For example, particles in different optical layers may absorb or reflect at different wavelengths, e.g., may have a different color. This can be used to create different colors and/or different color intensities on the panel by controller 46. For example, a four-substrate panel may have three optical layers with different color particles, e.g., cyan, yellow, and magenta, respectively. By controlling the transparency or reflectivity for the different colors a wide color spectrum may be created.

The surfaces of the substrates that face another substrate may be supplied with two or more patterns, e.g., as in an embodiment. For example, the outer substrates 41 and 43 may receive electrodes only on an inner side, while the inner substrate, e.g., substrate 42, may have electrodes on both sides.

Substrates 41 and 42 may together be regarded as an embodiment of a light modulator. Likewise, substrates 42 and 43 may together be regarded as an embodiment of a light modulator.

Figure 7C:
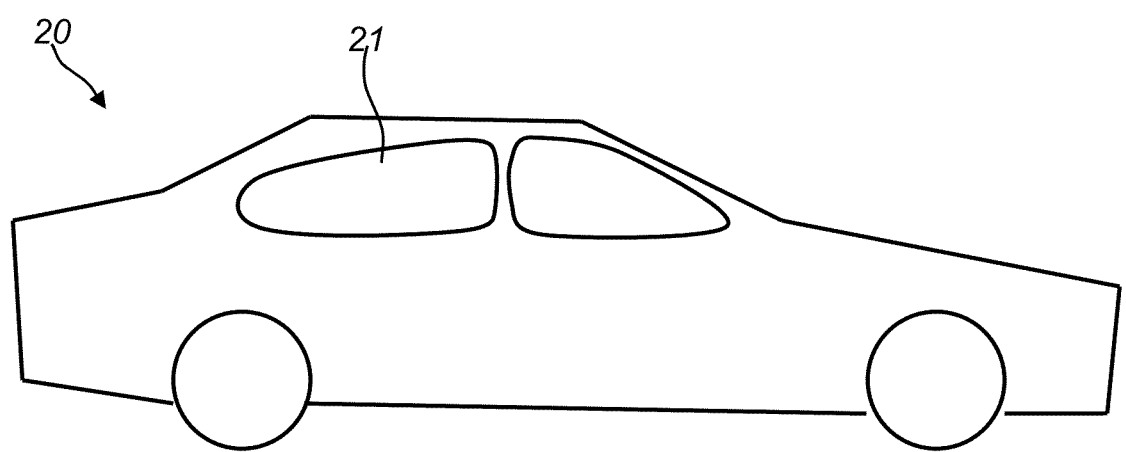

FIG. 7c schematically shows an example of an embodiment of a car 20 having smart glazing for windows 21. This is a particularly advantageous embodiment, since while driving the level of incident lighting can change often and rapidly. Using smart glazing in a car has the advantage that light levels can be maintained as a constant level by adjusting the transparency of the car windows. Moreover, the reduced diffraction effect improves safety as it reduces driver distraction. Car 20 may comprise a controller configured for controlling the transparency or reflectivity of windows 21.

The smart glazing can also be used in other glazing applications, especially, where the amount of incident light is variable, e.g., buildings, offices, houses, green houses, skylights. Skylights are windows arranged in the ceiling to allow sunlight to enter the room.

The light modulator may have two optical states, e.g., a transparent state and a non-transparent state, or a reflective state and a non-reflective state. The light modulator, e.g., light modulator 10 or light modulator 40 may be configured to
  switch to the second optical state, e.g., the non-transparent state or to the non-reflective state by creating an alternating voltage on at least one of the first and second substrates, applying an alternating current between at least a first electrode and a second electrode on the first substrate and/or between a first electrode and a second electrode on the second substrate, and
  switch to the first optical state, e.g., the transparent state or to the reflective state by creating an alternating voltage between the first and second substrate, applying an alternating current between a first electrode on the first substrate and a first electrode on the second substrate, and/or between a second electrode on the first substrate and a second electrode on the second substrate.

The electrode pattern on the first substrate is arranged at least in part in the same pattern as a second electrode on the second substrate. Typically, the electrodes oppose each other, but the pattern of the first electrode and second electrode may also be shifted with respect to each other.

A protective coating may be provided on at least a part of the inner surface area of at least one of the first substrate and the second substrate is provided.

A driving signal applied to driving electrodes typically has a varying voltage. For example, a power provider may be operated at an AC frequency for switching to a transparent state or to a non-transparent state. Such a signal may have a frequency between, say, 1-1000 Hz. A balanced electrolysis current may be obtained by continuously switching the polarity of oppositely charged electrodes on the first and on the second substrates and/or between the first and the second substrates.

Figure 8A:
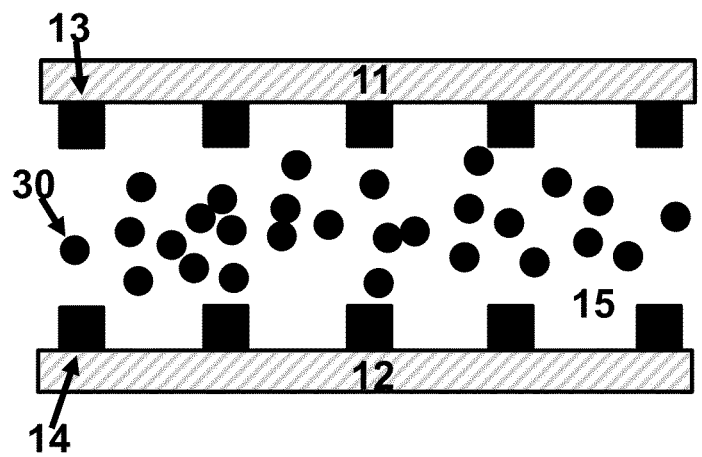
Figure 8B:
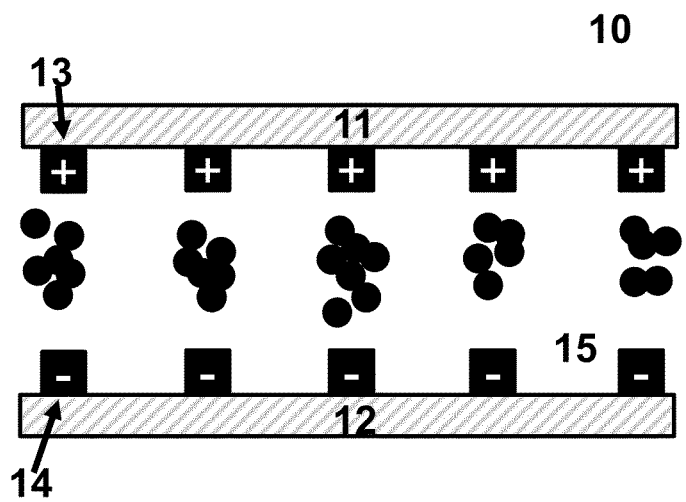

FIGS. 8a-8b schematically show a side view of an embodiment of a light modulator in use. Applying an electric field to the electrodes on the substrates causes an electrical force on the particles. Using this effect, the particles can be moved around and so different transparency or reflectivity states can be caused in the light modulator. A controller may control the electric field, e.g., its amplitude, frequency, and phase. In an embodiment, the controller is connected to at least four electrodes: two for each substrate. But more electrodes may be used and connected to the controller; for example, more than 2 electrodes may be used for a substrate to better fine-tune grey scaling, and driving to non-transparent or non-reflective state. Multiple electrodes may also be used to support multiple segments on the substrate.

FIG. 8a shows the light modulator without an electric field being applied. No electric force is yet applied on particles 30 suspended in fluid 15, in FIG. 8a.

In the configuration shown in FIG. 8a, a conducting electrode pattern, arranged on the top substrate is completely or substantially aligned with a conducting electrode pattern on the bottom substrate. The conducting electrode pattern may be deposited on a transparent or (partially) reflective glass substrate or may be embedded in a plastics substrate, etc.

Alignment between the top-electrode pattern and the bottom electrode pattern contributes to a wider range of achievable levels of transparency or reflectivity. However, alignment is not needed, as similar effects can be obtained without alignment. Without alignment, a range of transparency or reflectivity is likewise obtained.

Note that in these examples, reference is made to the top substrate and the bottom substrate to refer to substrate that is higher or lower on the page. The same substrates could also be referred to, e.g., as the front substrate and back substrate, since in a glazing application, the substrates would be aligned vertically rather than horizontally.

FIG. 8b shows the light modulator wherein, say at an instance P1, a potential +V1 is applied to each microwire electrode on the top substrate, while a negative voltage, say −V1, is applied to each microwire electrode of the bottom substrate. Thus, in this case, the same positive potential is applied to all electrodes 13, and the same negative potential is applied to electrodes 14. The difference in potential causes negatively charged particles to flow to the vicinity of the electrodes of the top substrate, where the particles will substantially align with the top electrodes. As a result, if both the top and bottom substrate are transparent, the transparency of light modulator 10 will increase. Likewise, if, e.g., the top substrate is transparent and the bottom substrate is reflective, the reflectivity of light modulator 10 will increase If the solution contains positively charged particles they will flow to the vicinity of the electrodes of the bottom substrate, where those particles will substantially align with the bottom electrodes.

A similar transparency or reflectivity can be achieved, when in a second instance, P2, of the on-state, the voltages of the top electrodes and bottom electrodes are reversed in contrast to the instance of P1. In the instance P2, the voltage of each electrode on of the top substrate are now supplied with a negative potential −V1 while the voltages of the aligned electrodes of the bottom substrate are supplied with a positive potential. This state is similar to the state shown in FIG. 8b, but with top and bottom substrates reversed. Also in this configuration the transparency or reflectivity of light modulator 10 is high.

Interestingly, by switching between a positive potential at electrodes at the top substrate, e.g., as shown as electrodes 13 in FIG. 8b (and a negative potential on electrodes 14), and a positive potential at electrodes at the bottom substrate, e.g., as shown as electrodes 14 in FIG. 8b, the transparency or reflectivity can be maintained, while decreasing corrosion damage to the electrodes. This alternating electric field can be achieved by applying alternating electric potentials to the top and bottom electrodes.

Applying a waveform is optional, but it is a useful measure to increase the lifetime of the light modulator by reducing corrosion. Corrosion can form for example, when using copper electrodes, since, copper ions dissolve in an ionic fluid at one substrate and flow to electrode on the opposite substrate, where they deposit. By applying a waveform the direction of copper ion transport is frequently reversed, thus reducing corrosion damage. Between the two instances P1 and P2 the corrosion current between the two substrates is balanced or substantially, e.g., >95%, balanced, e.g., as corrosion rate of an electrode of the top plate occurs there is a balancing deposition of copper on the bottom electrode between each instance of time, P1 and vice versa in instance P2. Therefore, the particles are transitioning or migrating continuously between top and bottom electrode, and the light modulator or smart window is always in the on-state while the dynamic electrolysis current between the top and bottom electrode is constant thus there is no or a negligible net loss of electrode material on the top and bottom substrates.

Figure 8C:
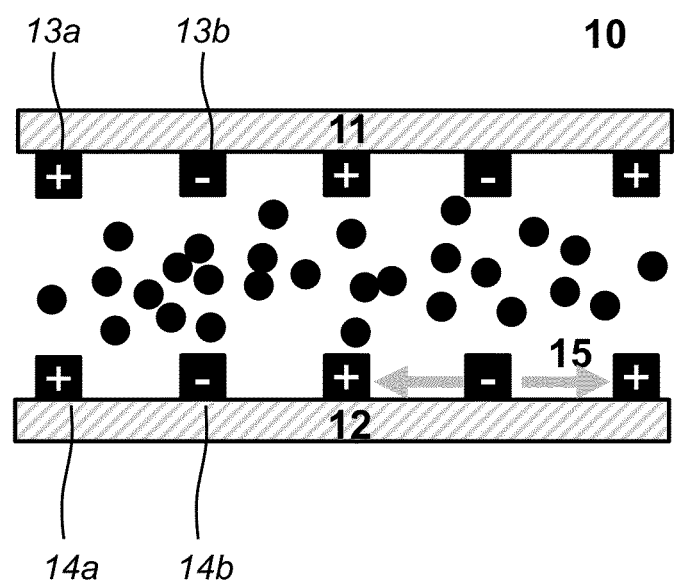

FIG. 8c shows how a state of decreased transparency or reflectivity can be obtained. An alternating voltage is applied on the same substrate. For example, in an embodiment a potential +V2 is applied a first electrode and the next immediate neighboring electrode has an opposite potential −V2 etc., as shown in FIG. 8c. This can be obtained by applying the potential +V2 to electrode 13a and the opposite potential −V2 to electrode 13b. On the opposite substrate the potential +V2 may be applied to electrode 14a and the opposite potential −V2 to electrode 14b. For example, the electrodes may be arranged so that the electrodes on the substrates are aligned; an electrode on the top substrate having an opposite electrode on the bottom substrate, and vice versa. For example, to decrease transparency or reflectivity, the opposite electrode may receive the same potential, while neighboring electrodes receive an opposite potential. An embodiment is shown in FIG. 8c, wherein four electrodes are indicated with the reference numbers 13a, 13b, 14a and 14b, and the rest of the electrodes continue to alternate.

By using this AC drive cycle between top and bottom substrates, diagonal and lateral electric fields are generated between the two substrates thereby causing haphazard diffusion of the particles thereby creating the closed state of the light modulator. As a result of this configuration, the particles migrate diagonally and laterally between the top and bottom substrate and diffusion of particles into the visible aperture of the light modulator contributes to the closed, opaque state of the light modulator.

As for the transparent state shown in FIG. 8b, a waveform may be applied to the electrodes, e.g., so that electrodes that are shown in FIG. 8b with a positive potential become negative and vice versa. As in FIG. 8b applying a waveform, e.g., between electrodes 13a and 13b and between 14a and 14b reduces corrosion damage to the electrodes.

The AC drive cycle may be implemented by using an interdigitated line configuration combining the top and bottom electrode configuration shown in plan view in FIGS. 5, 6a-6d, etc.

The extent with which transparency or reflectivity is increased or decreased in FIGS. 8b and 8c depends on the voltage and frequencies difference. By varying the voltage difference, the amount by which the transparency or reflectivity increases, respectively, decreases, is controlled. For example, a curve representing light transmission versus voltage may be determined, e.g., measured. To obtain a particular level of light transmission, e.g., a particular transparency, e.g., a particular grey-scale level, the corresponding voltage, e.g., AC voltage may be applied. By interpolating the signals for a transparent or for a non-transparent state, levels in between transparent and non-transparent may be obtained. Likewise, a curve representing light reflection versus voltage may be determined, e.g., measured. To obtain a particular level of reflectivity, the corresponding voltage, e.g., AC voltage may be applied. By interpolating the signals for a reflective or for a non-reflective state, levels in between reflective and non-reflective may be obtained.

Different electrode patterns may be used, for a light modulator. The electrode patterns may each provide a range of greyscales, e.g., levels of transparency or reflectivity, that the light modulator can attain. However, the particular range of greyscale for any particular electrode pattern may be different from another electrode pattern. In other words, although different patterns give an increased transparency or reflectivity or an increased opacity, the exact response to a drive signal depends on many factors, including the particular pattern that is used. The variations in the optical properties of a light modulator may have a fine resolution, e.g., below 1 mm. Note that no pixilation of the light modulator is needed to achieve different optical patterns, e.g., logos, visible in the light modulator.

This effect may be used to embed visible images in the light modulator by locally changing the electrode pattern on the substrates of a light modulator. For example, one may locally have greyscales that have a permanent off-set in greyscale relative to each other, because of a different electrode pattern. For example, by locally changing the electrode pattern or its pitch, the maximum transparency or reflectivity can be altered.

The result is an area on the light modulator which has a different intensity of greyscale, e.g., a different greyscale, or of coloring. The area may have the same color-point, though. In an embodiment, they may switch together with the rest of the window, although at a different rate. For example, even if the same voltage is applied to the electrodes in two different areas, they cause a different transparency state, e.g., different transmission level, due to different electrode patterns. For example, a curve representing transmission versus voltage may be shifted. For example, if voltage control is changed in the same way in both areas, then in both areas light transmission may change, but with a different amount. An area may also be made less response to a drive signal by reducing the density of electrodes; in particular, an area may be made not to switch at all, e.g., by not applying electrodes in the area.

For example, the electrode material may be copper, aluminum, gold, indium-tin oxide (ITO), etc. ITO is transparent while Cu/Al is reflective, thus using a different electrode material, a different appearance may be obtained, irrespective of the voltage driving. Likewise, different materials with a different resistance, will give rise to a different electric field. For example, ITO will have a smaller electric field, even though driven with the same voltage.

An embodiment of a method of modulating light, comprises applying an electric potential to multiple driving electrodes applied to two opposing substrates to obtain an electro-magnetic field between the multiple driving electrodes providing electrophoretic movement of the particles towards or from one of the multiple driving electrodes causing modulation of light shining through the substrates, wherein the two opposing substrates are as in an embodiment.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Driving the electrodes may use a signal with a selected maximum amplitude, which corresponds to one of multiple levels of transparency or reflectivity in the light modulator. The signal may be alternating current or alternating voltage.

Embodiments of the method may be executed using software, which comprises instructions for causing a processor system to perform the method. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 9A:
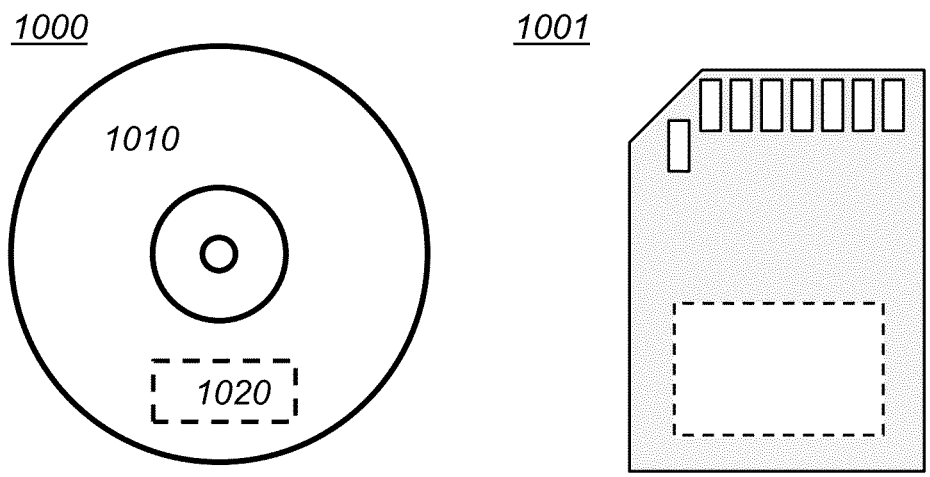

FIG. 9a shows a computer readable medium 1000 having a writable part 1010 comprising a computer program 1020, and a computer readable medium 1001 also having a writable part comprising a computer program. The computer program 1020 comprising instructions for causing a processor system to perform a light modulator method, according to an embodiment. For example, a processor system may be connected to a light modulator panel. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said light modulator method.

Figure 9B:
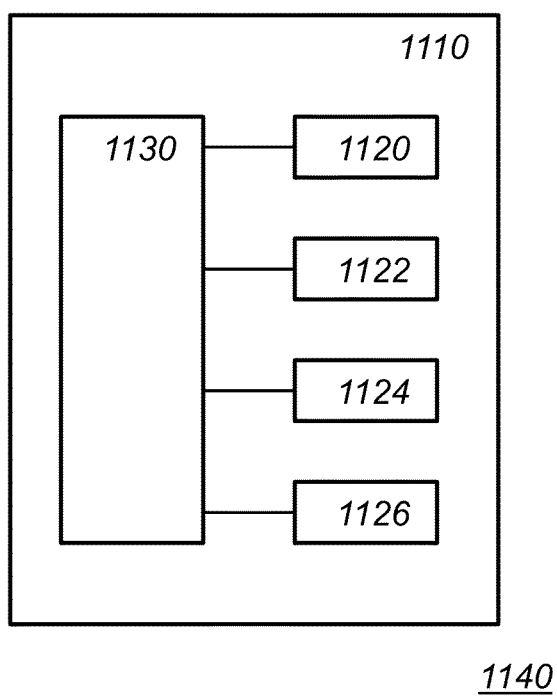

FIG. 9b shows in a schematic representation of a processor system 1140 according to an embodiment of a controller for a light modulator. The processor system comprises one or more integrated circuits 1110. The architecture of the one or more integrated circuits 1110 is schematically shown in FIG. 9b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be an ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

A controller for a light modulator, e.g., to control voltages applied to electrodes may comprise a processor circuit, but may also or instead comprise a state machine.

FIGS. 10a-d schematically show aspects of an embodiment of a light modulator. The modulator is exemplifying and non-limiting. FIGS. 10a-d correspond to the same embodiment of an optical modulator. The modulator may advantageously be combined with other features described herein. Parts of the modulator may be advantageous in isolation, with or without combination with other features described herein. In particular, FIGS. 10a-10d provide advantageous examples of a building block, driving electrodes, driving busses, bus-electrode connections, and so on, each of which may be considered in isolation.

Figure 10A:
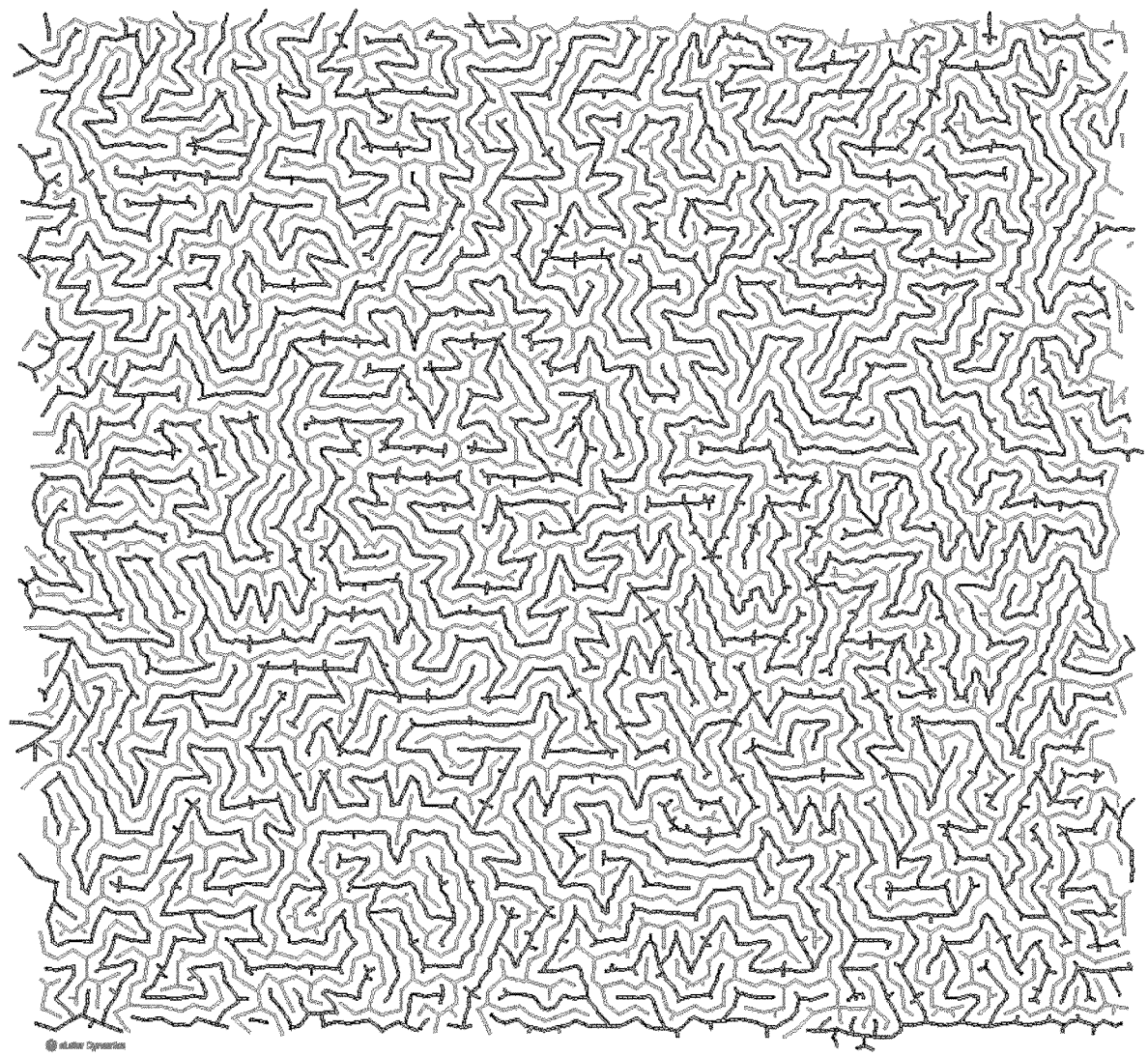

In an embodiment of a building block, of which building block 820 in FIG. 10a is an example, the building block comprises a pattern of multiple electrodes arranged in an interdigitated pattern. When the building block is repeated across a substrate the electrodes terminating on the left and right side of the building block, and the driving electrodes terminating on the upper and lower side of the building block match up, to form multiple driving electrodes, in this case for an optical modulator. The driving electrodes are arranged in an interdigitated pattern. It may or may not be needed to connect electrodes at an end of the repeated building blocks to join them into the driving electrode. In building block 820, the number of driving electrodes is two, e.g., a first driving electrode and a second driving electrode. More than two driving electrodes are possible though.

Figure 10C:
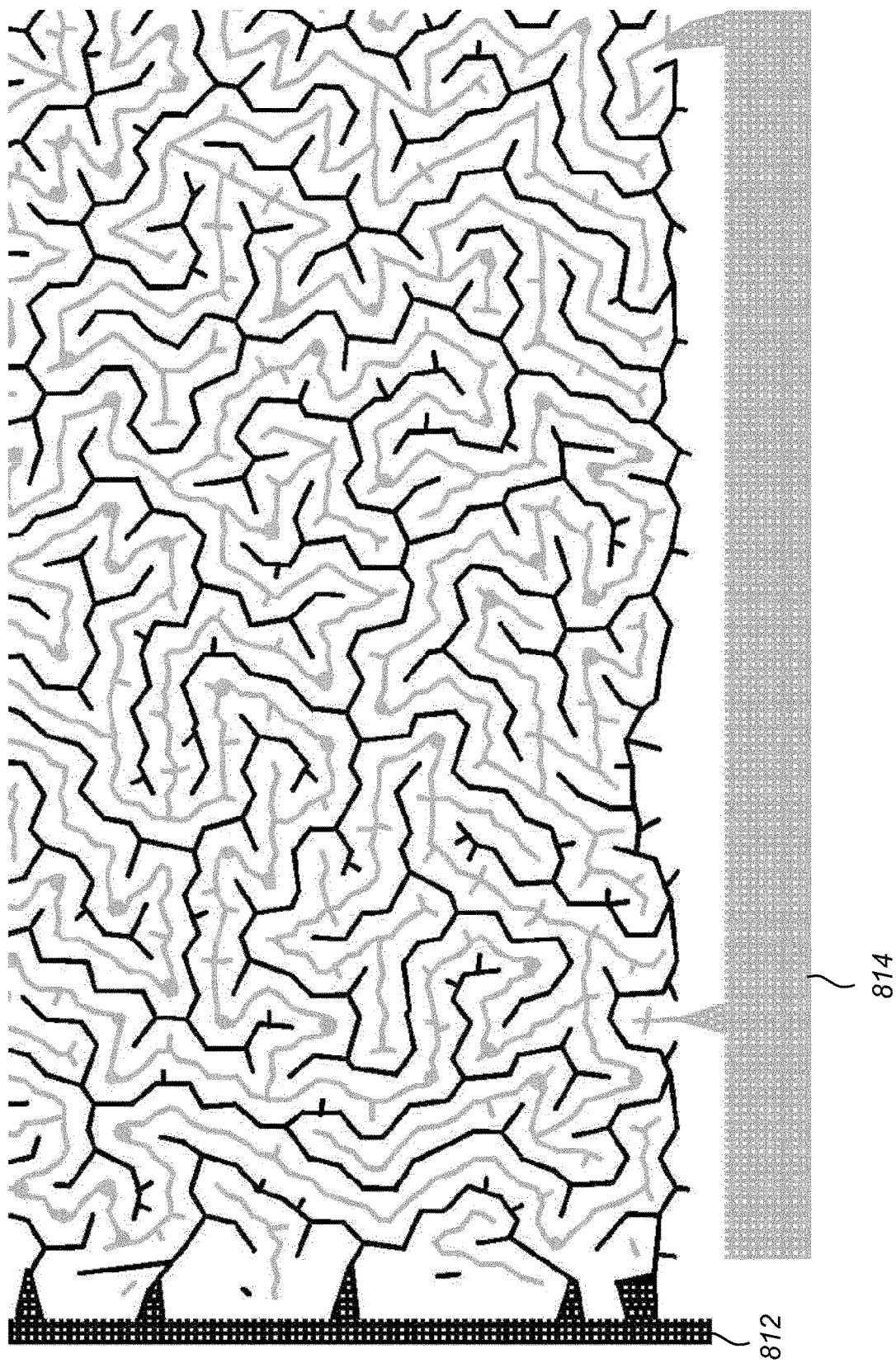
Figure 10D:
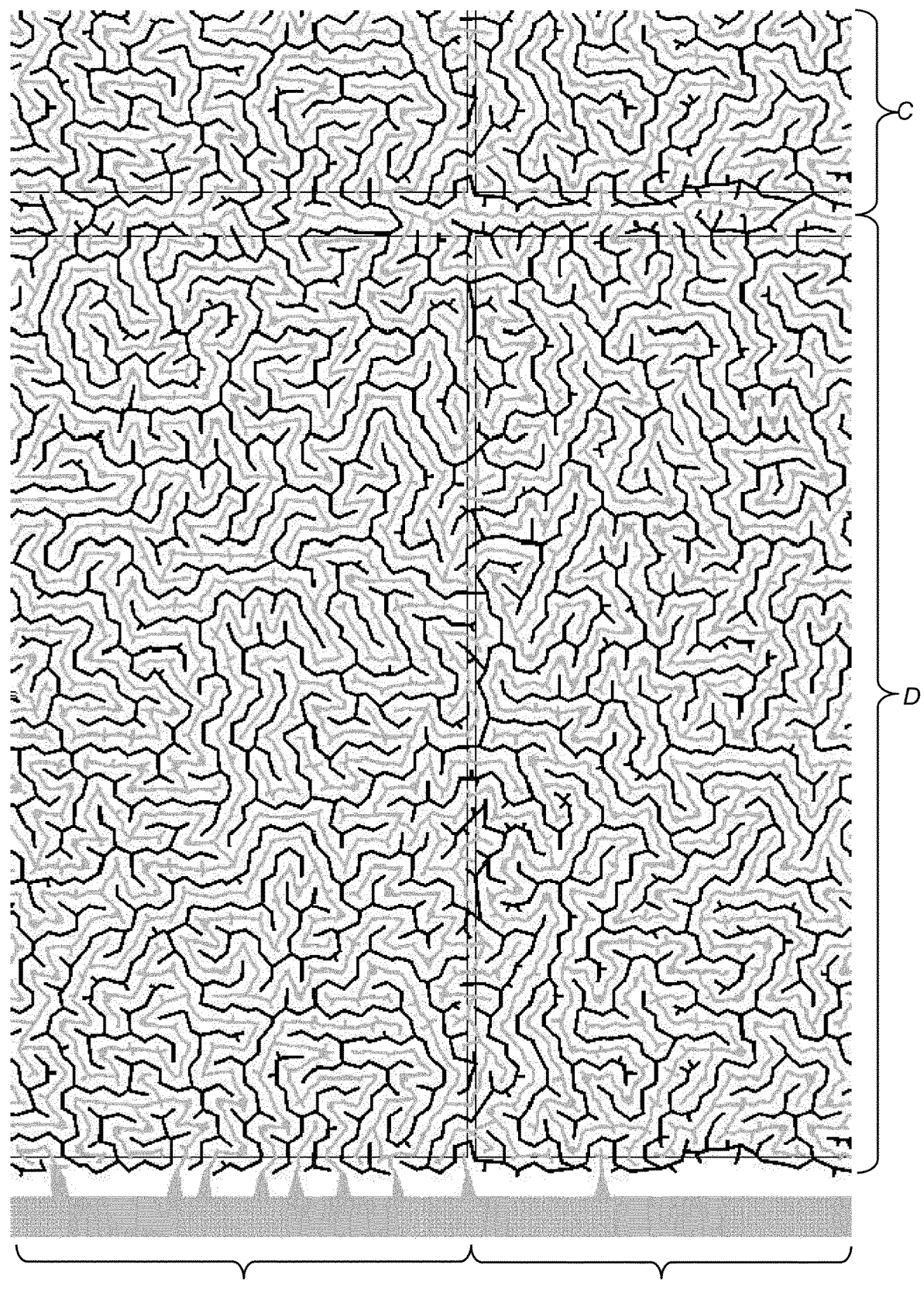

The shown building block 820 has several advantageous properties that help to reduce interference in an optical modulator in which the building block is comprised, e.g., as shown in FIGS. 10b-10d.

For example, a first property satisfied by building block 820 is that for at least one electrode in the multiple interdigitated electrodes in building block 820 a maximal length between any two points on said electrode measured along said electrode in building block 820 is at least 2 times the length of the diagonal of building block. In fact, in this example, this property holds for multiple electrodes of building block 820.

For example, a second property satisfied by the building block 820, is that it comprises electrodes that branch at nodes, forming trees. Building block 820 shows a highly branching tree, e.g., there are first-nodes in which an electrode branches, into at least three lines each, connected to at least three second-nodes that also branch into at least three. In fact, there may even be three second-nodes that are connected to third-nodes, where the electrode also branches.

For example, a third property satisfied by an electrode in the building block is that the angles at nodes of the electrodes are well distributed over the range from 0 to 360. For example, the building block shows at least some angles in the range 0-30, some in the range 30-60, up to the range 330-360. In fact, any range from x to x+30 is represented by an angle in FIG. 10a. In fact, this property holds for multiple electrodes in building block 820.

In building block 820 the electrode lines are constructed from connected straight line segments. The line segments could be curved as well, or instead. In this example, the electrode lines widths in building block 820 are constant along an electrode line; this is not necessary.

For example, a fourth property satisfied by the building block is that it has a low calculated Pixelated noise metric; in this case, below 4%.

Any one of the above properties may be used to address interference, they need not be combined as is done in building block 820. For example, one could only have property 1, or only property 2, or only property 3, or only property 4, or a combination, say, 1 and 2, or 2 and 3, 2 and 4, 3 and 4, 1 and 2 and 3 and 4, 2 and 4 and 4, or any other combination, possibly combined with other features described herein.

Building block 820 also satisfies that the distance between two neighboring lines is constrained, e.g., above a minimum, and below a maximum. Building block 820 is an example of a building block in which the electrodes lie in the same plane and do not cross. It is noted that if crossing electrodes are desired than such is no impediment. For example, two electrodes could cross by having an isolator between them at the cross. The isolator could be the substrate itself, e.g., one of the electrodes could be diverted via two vias to run over the back of the substrate.

FIG. 10b.1 schematically shows a substrate 810 and driving busses. Shown are driving bus 812 and driving bus 814. To create a substrate for an optical modulator the building block 820 is repeated within the area bordered by the driving busses. The driving busses are arranged for driving the driving electrodes. In this example, a first driving electrode 812 is arranged at two neighboring sides of the substrate, while a second driving electrode 814 is arranged at the opposite two neighboring sides of the substrate. Electrodes 812 and 814 do not make contact. In use, varying voltages are placed on electrodes 812 and 814 to create voltage distribution between substrate 810 and an opposite substrate (not shown in FIG. 10b.1) causing optical effects.

In particular, driving bus 812, or side electrode, extends along the left side and the top side. At one point, a connecting point is provided for connecting bus 812 to a controller, here shown at the top left. In particular, driving bus 814, or side electrode, extends along the right side and the bottom side. At one point, a connecting point is provided for connecting bus 814 to the controller. Bus 814 extends along the top side, outside of the bus 812. An advantage of extending one electrode along three sides, such as bus 814, is that both electrodes can be connected to from the same side. That is the whole optical modulator could be powered from a single side of the substrate. Bus 814, here extends for a limited part, say less than quarter of the side. Bus 814 could also extend further to nearly the connecting part of bus 812.

The substrate that is thus formed, e.g., may be combined with a mirror image of the substrate, e.g., flipping the design over a horizontal axis, or flipping the design over a vertical axis.

FIG. 10b.2 schematically shows a variant of substrate 810 and driving busses. Shown are driving bus 812 and driving bus 814. Like in FIG. 10b.1, the building block 820 is repeated within the area bordered by the driving busses 812 and 814.

In addition to driving busses along the edges of substrate 810, additional driving busses are shown that extend in the interior of substrate 810 and across it.

FIG. 10b.2 show further driving busses 815-819 that run across the substrate. Some of the further driving busses, in this example, busses 815 and 816, are connected to driving bus 814. Some of the further driving busses, in this example, busses 817 and 819, are connected to driving bus 812. Extending from the further driving busses are optional projection for running along a side of a copy of the building block. In this manner, every building block may have a driving bus running along each of its edges, e.g., a first driving bus for the two sides connected at a vertex of the building block, and a second driving bus for other two sides connected at a diagonally opposite vertex. The substrate of FIG. 10b.2 may be also combined with a mirror image.

An advantage of the arrangement shown in FIG. 10b.2 is that power is more equally distributed over the device. As a result transitions are more uniform and complete faster.

Although the building blocks shown in FIGS. 10b.1 and 10b.2 have a square building block, generally speaking the building block could have any shape. In particular, any shape or shapes that tile the plane may be used, e.g., a repeatable shape. In particular, it could have a rectangular, e.g., non-square shape. For example, one side could be at least 1.5 times as long as the other side. A shape of the building block may be the same as the shape of the optical modulator, e.g., have the same relative dimensions.

The building blocks may be patterned using one of more building block stepper masks. A further stepper may be used for the driving buses. A stepper may also be used if connections are made by overlapping metal deposition. For example, when a stepper is doing the metal of the 812 driving bus, there may be an overlap with where the location of the 820 was. Connections to the electrodes from the outside, e.g., to 812 may use conventional foil bolding, or clips.

Note also, that 1 type of building block may be repeated, but one may also use multiple types of building blocks. For example, the shape may be triangular. The shape of the building block may impact the shape of the overall device. This is advantageous, e.g., to adapt the form factor of the optical modulator. One could even combine different shaped building blocks in a single substrate. For example, one may have square or rectangular shapes in the center of the substrate and triangular shapes at the edges.

Using different shapes and/or dimensions is useful for substrates that do not have straight edges, as further discussed herein. Using different shapes and/or dimensions is also useful for curved substrates, e.g., non-flat substrates. Although, not strictly necessary, using different shapes for the building blocks allows the building block to better follow the shape of the substrate. A curved substrate may be combined with another curved substrate to form a curved optical modulator. For example, in an embodiment, the driving busses are arranged along a triangulation of the curved substrate, the driving busses following the triangulation and the building block shapes being arranged therebetween. For example, in an embodiment, building blocks surrounding the center of the substrate are square or rectangular, but building blocks at the edge are triangular. The latter configuration can be done using two shapes or more than two shapes. Note that a curved substrate could be supported by a single shaped building block, but using multiple shapes is advantageous. One could generally apply different shaped building blocks in a curved substrate without a long electrode as well. An example of such a substrate is: A substrate for use in a light modulator, the substrate comprising multiple interdigitated driving electrodes applied to the substrate, each of the multiple driving electrodes being arranged in a pattern across the substrate, the multiple interdigitated driving electrodes being arranged alternatingly with respect to each other on the substrate, the pattern of multiple driving electrodes across the substrate comprising multiple repeated building blocks, the building block comprising multiple interdigitated electrodes extending in at least 2 directions across the building block, the interdigitated electrodes in the building block forming the driving electrodes, wherein the substrate is curved, the multiple repeated building blocks comprising at least two different shapes.

FIG. 10c schematically shows a detail at a corner of FIG. 10d, discussed below. Shown in FIG. 10c is a corner of building block 820, and parts of driving bus 812 and driving bus 814. FIGS. 10d-10d schematically show building block 820 repeated across the substrate. FIG. 10d corresponds to the lower left corner of FIG. 8b. FIG. 10d to the lower right corner of FIG. 8b. Building block 820 repeats across the substrate in two directions by translation. The repetition could be a glide translation, e.g., a translation followed by a reflection.

FIG. 10c shows how the electrodes formed by the repetition of the building block may be connected with a driving bus. For example, an electrode line may extend from a driving bus to an electrode in the building block.

FIG. 10d schematically shows a detail of a repetition of building block 820 between busses 812 and 814. Shown in FIG. 10d are parts of four copies of the building block. The edges between the building blocks are indicated with capital letters A, B, C, and D. Note that electrodes on one side of the building block are connected with electrodes on the opposite sides of the electrode; in this case the electrodes in the design match up, so that aligning the building block is sufficient to create continuous electrodes.

In this example, FIG. 10a is drawn so that the blocks slightly overlap when repeated across the substrate, as can be seen in FIG. 10d. Having an overlap could be avoided, if desired, but it is convenient. The overlap in this example, is 3%. That is 3% in the x-direction dimension of the building block, overlaps with 3% in the x-direction of the next block. The amount of overlap is preferably small, say between 1% and 5%. A larger or smaller overlap is possible. No overlap at all is also possible, in that case the building blocks would align directly next to each other. The same holds for the y-direction, e.g., an overlap of 3%, between 1% and 5%, etc., are possible embodiments.

In this example, building block 820 repeats across the substrate in two orthogonal directions by translation. The repetition could be a glide translation, e.g., a translation followed by a reflection.

Figure 11:
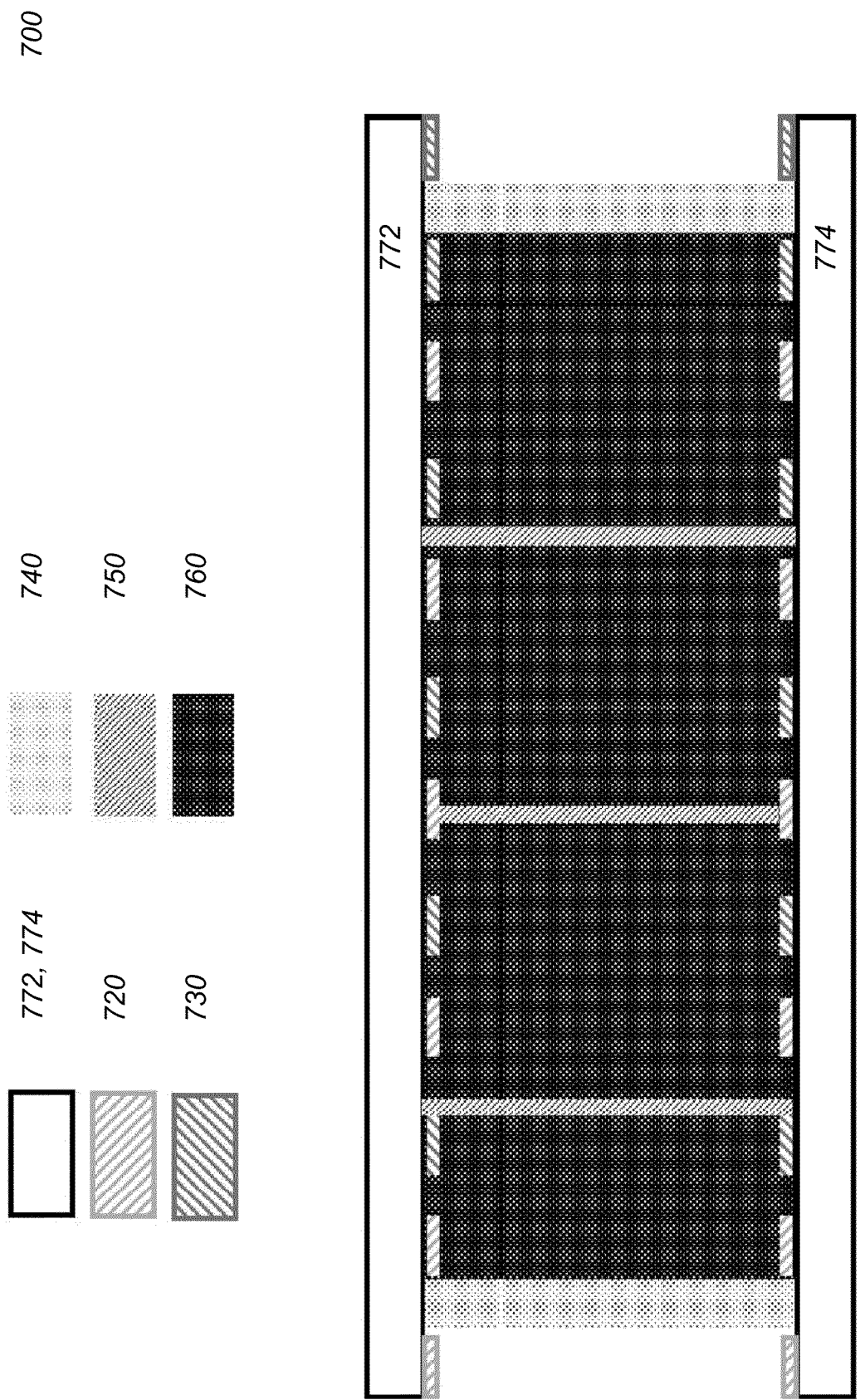

FIG. 11 schematically shows a cross-section of an embodiment of a light modulator 700. Shown in FIG. 11 are two substrates: substrate 772 and substrate 774. Interdigitated driving electrodes, and driving busses are applied on their surfaces, e.g., according to an embodiment. Between the substrate 772 and 774 spacers 750 are arranged to keep the substrates at a predetermined distance. The space between the two substrates is filled with a semiconductor ink 760, e.g., as described herein, while around the edges of the two substrates and edge seal is applied. By choosing different types of ink, the panel may be configured to modulate between, say, transparent to opaque, or reflective and not-reflective, etc.

Figure 12A:
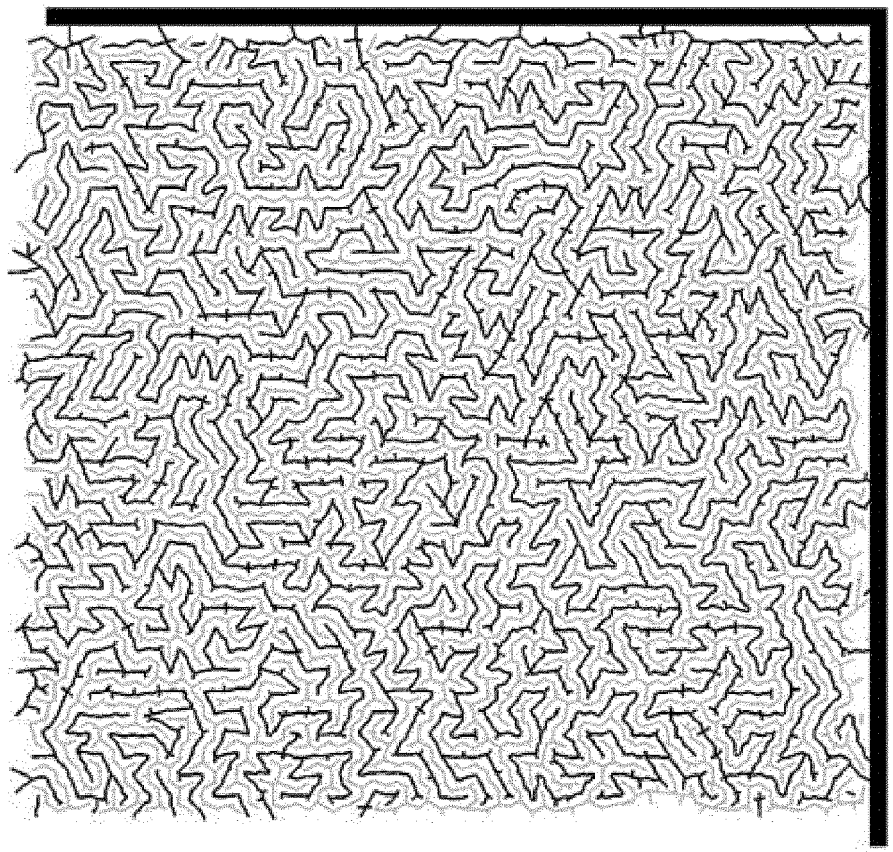
Figure 12B:
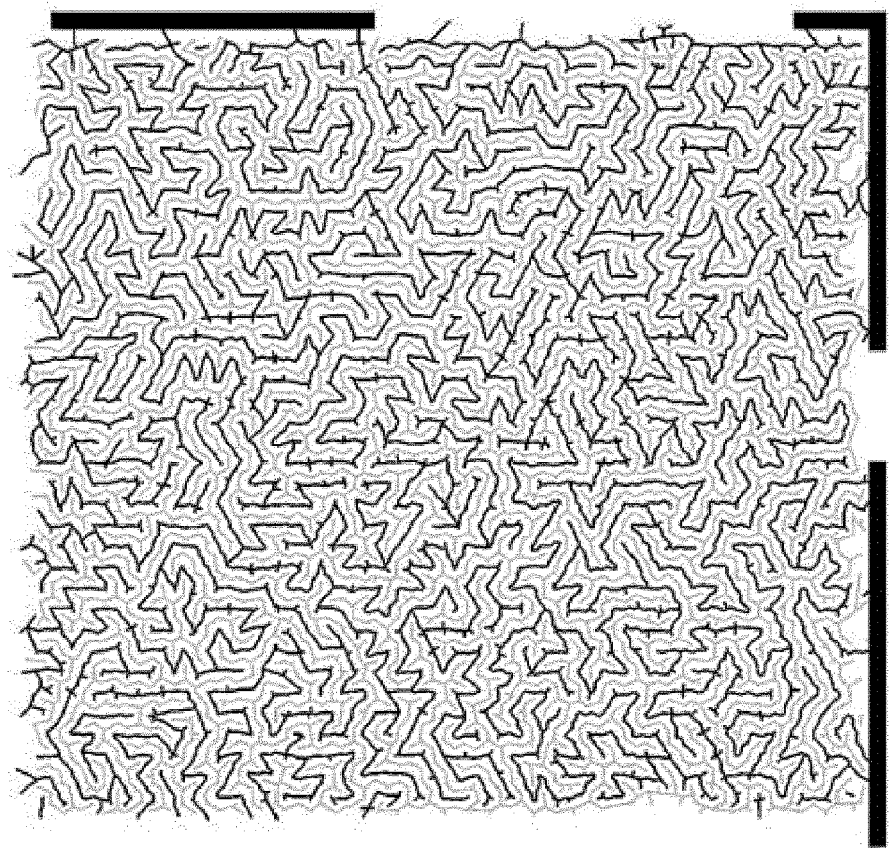
Figure 12C:
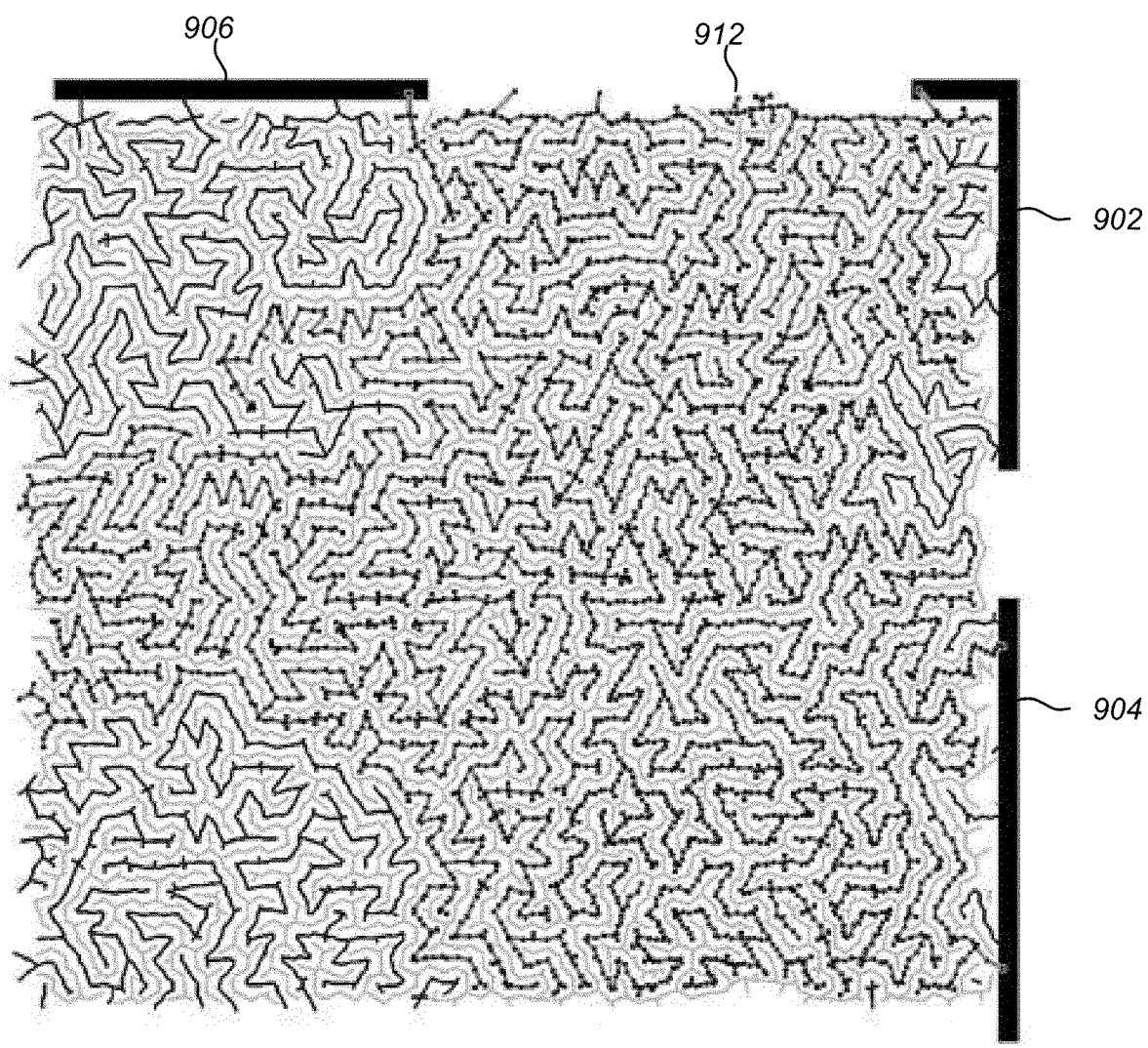

FIG. 12a schematically shows an embodiment of a light modulator. In FIG. 12a, a corner of a substrate according to an embodiment is shown. A driving bus, or edge connector, is arranged along the upper and right edge of the substrate. The driving electrode corresponding to the driving bus is connected to its driving bus at multiple points, say, at a first point and a second point. For some parts of the electrode the two connection may be needed to unify the electrode, e.g., to ensure that the entire electrode is connected. However, it may be arranged for the electrode to connect multiple times to the driving bus, even when that is not needed to connect up the first electrode. For example, the first point and the second point may be connected along the driving bus, but also through the electrode across the substrate. In that case, part of the driving bus between the first and second point can be removed. Removing this part of the driving bus does not disconnect the driving bus from the power source, since the driving bus remains connected through the electrode. FIG. 12b shows an example, in which part of the driving bus has been removed. FIG. 12c shows the same part of the substrate, but highlighting the electrode that connects parts 902, 904 and 906.

Breaking up long electrodes lines, especially straight lines, is beneficial to reduce diffraction. If edge connectors are only located at the edge of a device, e.g., as shown in the embodiment of FIGS. 10a-10d, this will make only a small difference. But for an embodiment with driving buses surround the building blocks the impact is appreciable. There the straight lines around the building blocks will appreciably increase diffraction and optical artefacts. Here those straight lines can be discontinued in places and therefore decrease the diffraction or optical artefacts. For example, driving buses such as shown in FIGS. 6a-6d benefit from removing part of the driving busses.

Figure 13A:
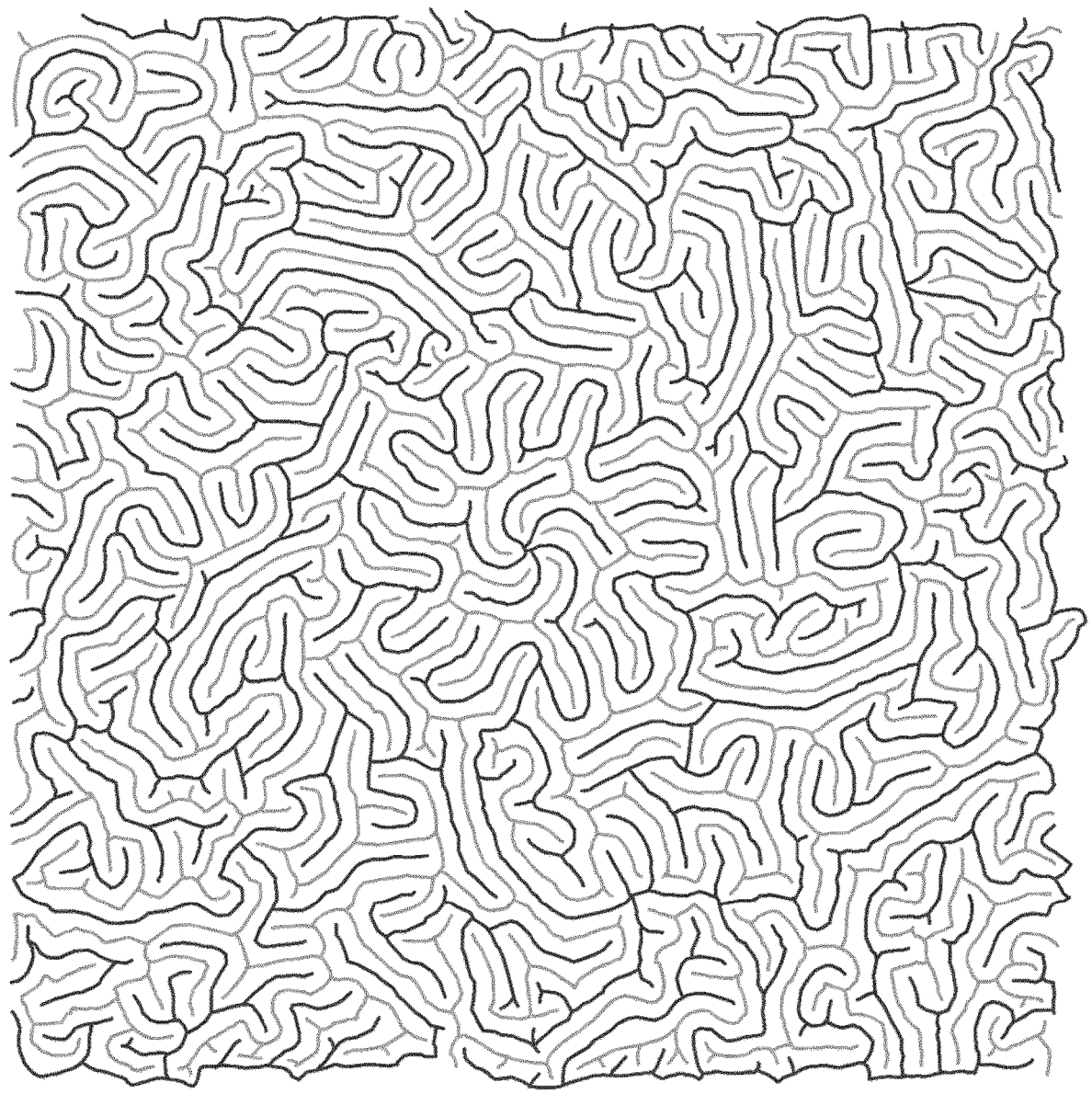
Figure 13B:
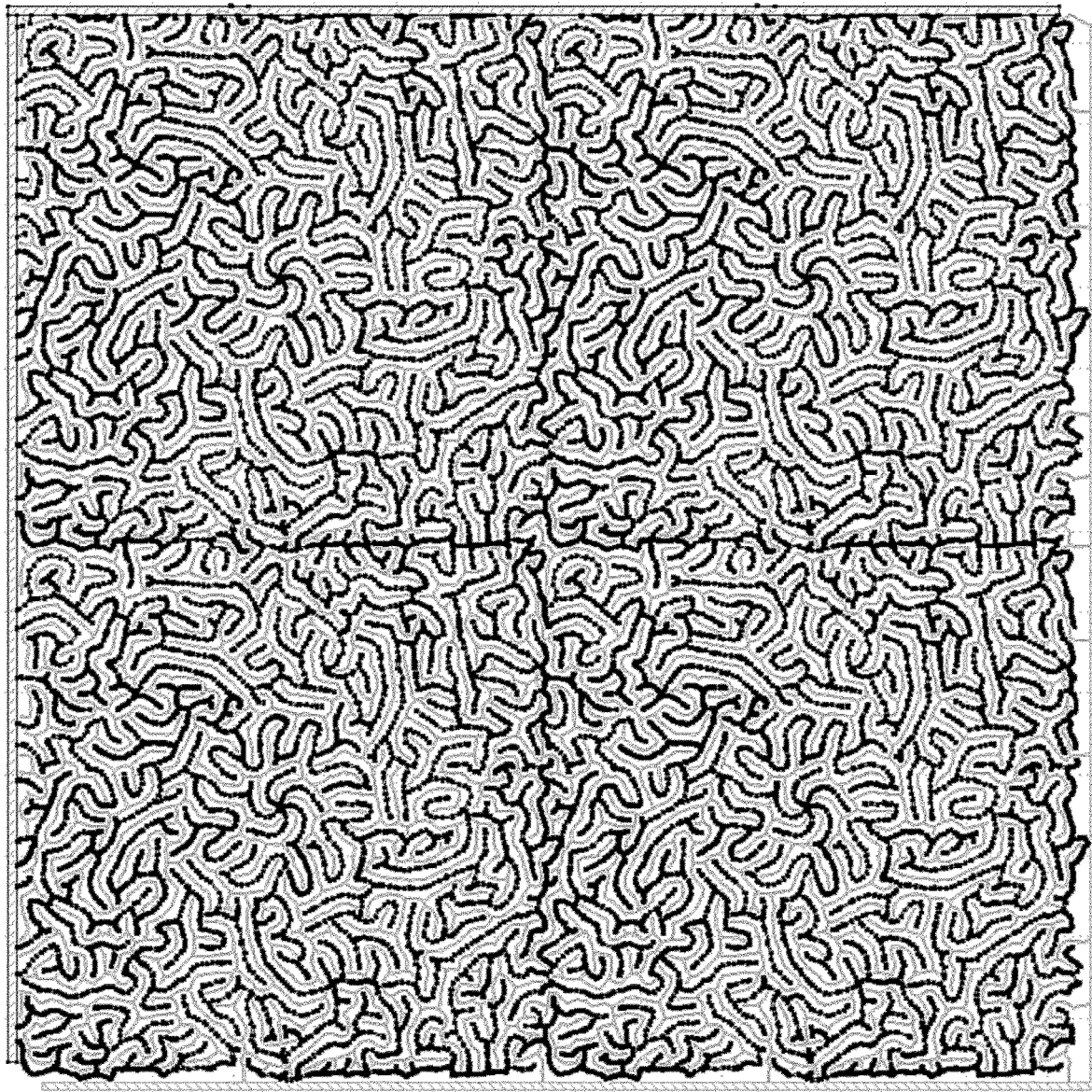

FIG. 13a schematically shows an example of an embodiment of a building block. FIG. 13b schematically shows an example of an embodiment of a substrate for use in a light modulator. The building block of FIG. 13a has been repeated across the substrate of FIG. 13b in two directions, in this case parallel to the edges of the substrate. The interdigitated electrodes in the building block of FIG. 13a connect in FIG. 13b to form two interdigitated driving electrodes extending in at least 2 directions across the building block.

Note that the electrodes shown in FIGS. 13 and 13b are highly convoluted. This can be seen, e.g., from their high degree of branching or from the high ratio between a maximal length between any two points on an electrode in the building block and the diagonal of the building block (said ratio being above 2).

The driving electrodes in the substrate of FIG. 13b lie in the same plane and do not cross. Note that this design has fully connected electrodes, without floating electrodes on the edges. Note that some electrodes on the edge of the building block are connected through an electrode in an adjacent building block.

The building block is based on a so-called Turing pattern. Turing patterns turn out to be advantageous as they produce fewer but longer branches. As a result, the likelihood of a design forming a floating electrode, that may have to be dealt with separately, is lower. Turing patterns are also known as reaction-diffusion systems—in this particular example, the Gray-Scott equations were used.

FIGS. 14a-14h schematically show embodiments of a substrate, in which a pattern of multiple driving electrodes across the substrate comprising multiple repeated building blocks. The repeated building blocks forms multiple interdigitated electrodes extending in at least 2 directions across the substrate. The electrodes in the building block may have various advantageous properties, e.g., having a high ratio between electrode length and diagonal; this is not necessary though. One type of building block may be used, or multiple types of building blocks. The blocks may be rotated, mirrored and/or translated to fill the substrate. To distributed power, driving buses may be arranged between the building blocks; instead or in addition building blocks may be connected to each other to distribute power. Building blocks may have the same shape, but still their electrode pattern may be or may not be the different.

FIG. 14a schematically shows an embodiment of a substrate in which building blocks are rectangular, in this case square.

Figure 14C:
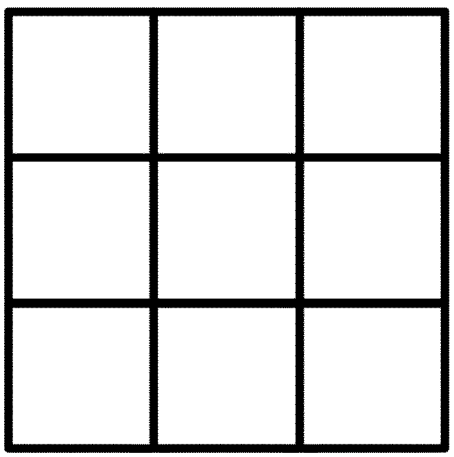
Figure 14C:
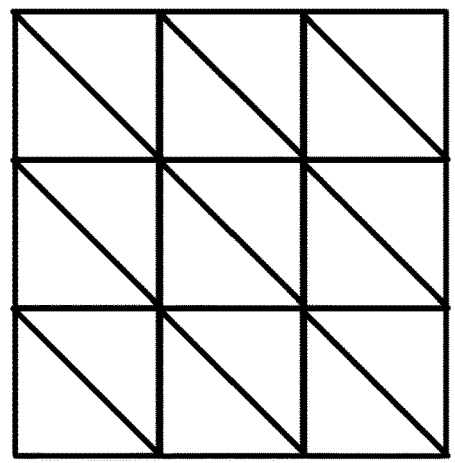
Figure 14C:
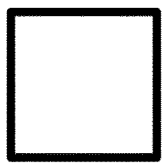
Figure 14C:
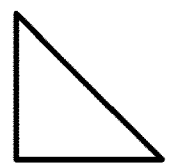
Figure 14C:
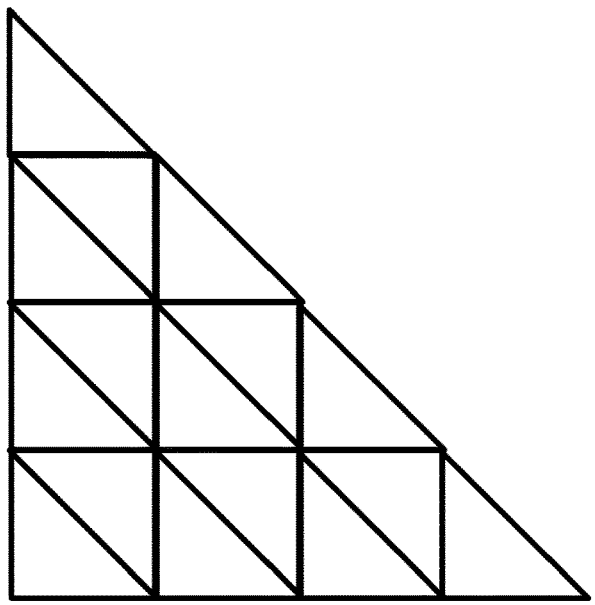
Figure 14C:
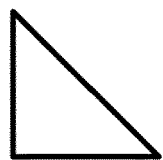

FIGS. 14b and 14c schematically show embodiments of a substrate in which building blocks are triangular, in this case rectangular triangles. Any other triangular shape is also possible.

An advantage of having a different shape building block, is that substrate of different shapes can be more easily supported. For example, a square shaped substrate may be supported by a square building block, or by a triangular building block, as shown in FIGS. 14 and 14b. However, with the triangular building block, a triangular substrate can be easily tiled, e.g., without having to support partial building blocks, or different type building blocks, at the edges.

FIG. 14d schematically shows an embodiment of a substrate in which building blocks are hexagons, in this case regular hexagons.

FIG. 14e schematically shows an embodiment of a substrate in which building blocks are trapeziums.

FIG. 14f schematically shows an embodiment of a substrate in which building blocks are polygons, in this case rectangular polygons, e.g., having right angles. Note that the polygons do not need to be convex, as shown in FIG. 14f. The polygon may be a polyomino; e.g., a polygon built up out of an integer number of squares. In the example shown, a tromino is used. Other examples of polyominos include, tetrominos and pentominos. The polygon may be an isothetic polygon, e.g., rectilinear polygons.

Figure 14G:
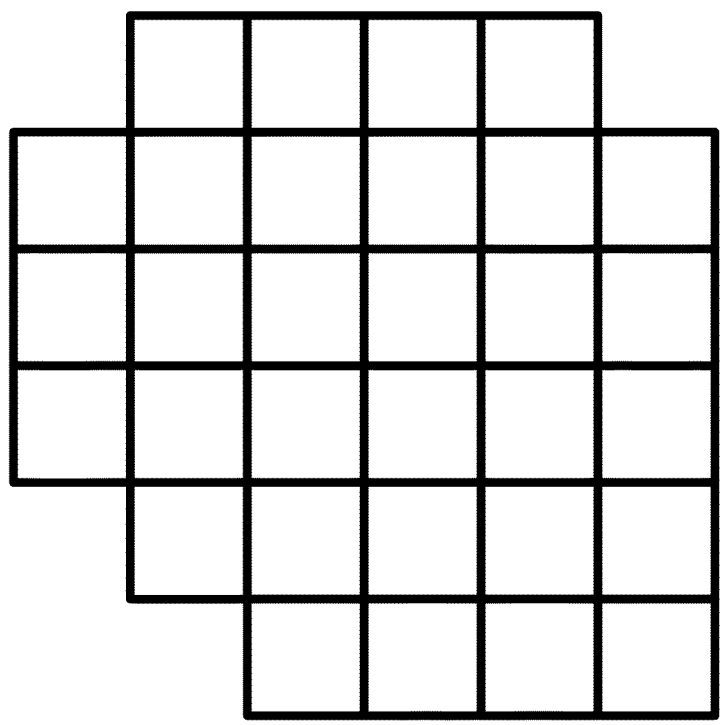
Figure 14H:
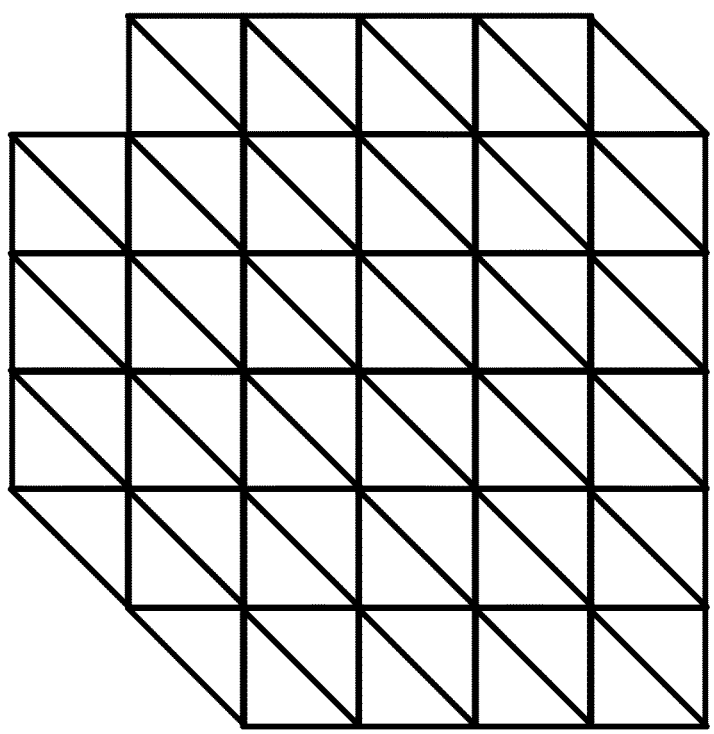

FIG. 14g schematically shows an embodiment of a substrate in which building blocks are square. FIG. 14h schematically shows an embodiment of a substrate in which building blocks are triangular. Note that the various shapes of the substrate can be supported by combining the building blocks. Note also that with the triangular building block different shapes are possible for the substrate.

The shape of the substrate in FIG. 14h could be supported by rectangular building blocks, as well, though a partial building block or an edge-type building block might be used to support the sloping edges of the substrate, etc.

Supporting different shapes of substrate is advantageous to support different applications. For example, in cars, windows are often not rectangular. Having different shaped building blocks makes it easier to support a desired shape.

Supporting different shapes of substrate is advantageous to support non-planar substrate, as well.

The numbered clauses below are contemplated embodiments.

Clause 1. A substrate for use in a light modulator, the substrate comprising
multiple interdigitated driving electrodes (111-114,121-124) applied to the substrate, each of the multiple driving electrodes being arranged in a pattern across the substrate, the multiple interdigitated driving electrodes being arranged alternatingly with respect to each other on the substrate, the pattern of multiple driving electrodes across the substrate comprising multiple repeated building blocks, the building block comprising
multiple interdigitated electrodes extending in at least 2 directions across the building block, the interdigitated electrodes in the building block forming the driving electrodes, for at least one electrode in the multiple interdigitated electrodes in the building block a maximal length between any two points on said electrode measured along said electrode in the building block is at least 2 times the length of the diagonal of the building block unit.

Clause 2. A substrate as in clause1, wherein the calculated pixelated noise metric of the driving electrode pattern of the substrate is below 6.05%, or below 5% or below 4%.

Clause 3. A substrate as in any one of the preceding clauses, wherein an electrode on the substrate comprises multiple nodes where the electrode branches, the nodes being electrically connected through electrode lines, the multiple nodes and connecting electrode lines forming a tree, the electrode comprising at least a first node (201) where the electrode branches into at least three electrode lines, the first node (201) being directly connected through an electrode line to a second node (202) and to a third node (203), the electrode branching into at least three electrode lines at the second node and at the third node.

Clause 4. A substrate as in Clause 3, wherein
angles between two directly connected electrodes lines have been randomly selected, and/or
directly connected electrodes lines in the building block forming multiple angles, wherein the angles cover the interval of 0 to 360 degrees, in particular, for each particular interval of at least 30 consecutive angles there is at least one angle in the multiple angles that falls in the particular interval, and/or
the multiple nodes have been randomly selected to cover an area of a building block, and/or
the electrode lines are straight, or curved, and/or
the electrode lines widths are not constant along an electrode line.

Clause 5. A substrate as in any one of the preceding clauses, wherein
from any point in the substrate, a nearest distance to the first and to the second driving electrode should both be below a threshold, and/or
from any point in the substrate, the sum of the nearest distance to the first and to the second driving electrode is below a first threshold, and/or above a second threshold, and/or
a distance from a point on a first driving electrode to a point on a second driving electrode is at least a second threshold, and/or
a horizontal and/or vertical size of the building block is at least 10 times the sum of an electrode line width and an electrode distance.

Clause 6. A substrate as in any one of the preceding clauses, wherein
the driving electrodes lie in the same plane and do not cross, or
the driving electrodes cross in the substrate, a dielectric separating the crossing driving electrodes, at least at a crossing point.

Clause 7. A substrate as in any one of the preceding clauses, wherein
a building block repeats across the substrate in at least two directions, and/or
multiple different building blocks repeat across the substrate in one or two direction, and/or
two different building blocks repeat in a checkerboard pattern across the substrate, and/or
the substrate comprises non-repeating electrode lines connected to a driving electrode.

Clause 8. A substrate as in any one of the preceding clauses, wherein
two electrodes in a building block that are not connected in the building block are connected in the substrate through a connection in a neighboring building block, and/or
an electrode in the building block is connected to at least two sides of the building block.

Clause 9. A substrate as in any one of the preceding clauses, wherein
building blocks are translated with and without mirroring and/or point reflection, and/or
a row or column of building blocks are mirrored over its longitudinal direction to form a next row or columns of building blocks.

Clause 10. A substrate as in any one of the preceding clauses, wherein at least one driving bus is arranged on the substrate for each driving electrode to drive the driving electrode, wherein
at least one driving bus is arranged at a side of the substrate for each driving electrode to drive the driving electrode, and/or
the driving busses are only arranged at the side of the substrate, and/or
the driving busses are arranged between the building blocks covering the substrate.

Clause 11. A substrate as in any one of the preceding clauses, wherein at least one driving bus is arranged on the substrate for each driving electrode to drive the driving electrode, the at least one driving bus is arranged at a side of the substrate and/or a side of the building block, said driving bus comprising discontinuous parts, said discontinuous parts being connected through the driving electrode driven by the driving bus.

Clause 12. A substrate as in any one of the preceding clauses, wherein at least one of the first and second driving electrode is a spanning tree of a tessellation.

Clause 13. A substrate as in any one of the preceding clauses, wherein the driving electrodes have mirror symmetry.

Clause 14. A substrate as in any one of the preceding clauses, wherein the substrate is non-rectangular.

Clause 15. A light modulator comprising:
a first substrate and a second substrate at least one of which is as in any one of Clauses 1-14, the first and second substrates being arranged with inner sides opposite to each other, the multiple driving electrodes (111-114, 121-124) being applied to the inner side of at least one of the first and second substrates,
an optical layer between the first and second substrates, the optical layer comprising:
a fluid comprising particles, wherein the particles are electrically charged or chargeable;
a controller configured to apply an electric potential to the multiple driving electrodes to obtain an electromagnetic field between the multiple driving electrodes providing electrophoretic movement of the particles towards or from one of the multiple driving electrodes causing modulation of the optical properties of the light modulator.

Clause 16. A light modulator as in clause 15, wherein the electrode pattern on the first substrate, the electrode pattern on the second substrate and/or the superimposition of electrode patterns of the first and second substrate have a calculated Pixelated noise metric below 6.05%, or 5%, or 4%.

Clause 17. A method of modulating light, comprising
applying an electric potential to multiple driving electrodes applied to two opposing substrates to obtain an electro-magnetic field between the multiple driving electrodes providing electrophoretic movement of the particles towards or from one of the multiple driving electrodes causing modulation of light shining through the substrates, wherein the two opposing substrates are as in any one of Clauses 1-16.

Clause 18. A computer implemented method of computing pixelated noise metric for an electrode pattern for a light modulator, the method comprising
preparing a black and white design picture to specific dimensions where electrodes lines are black and substrate background is white,
calculate the magnitude and angle for the chirp z-transform (CZT) without scaling using the Bluestein method, determining a main peak value as the maximum intensity within the magnitude spectrum of the chirp z-transform (CZT) of the design picture, determining a higher peak value as the second maximum intensity within the magnitude spectrum chirp z-transform (CZT) excluding the main peak, and calculating the pixelated noise metric as the ratio between the higher peak value and the main peak value.

Clause 19. A method of computing pixelated noise metric as in Clause 18, wherein the design picture is an 8-bit picture, with black being set to 0, and white to 255.

The invention claimed is:

1. A substrate for use in a light modulator, the substrate comprising
   at least one driving electrode applied to the substrate, the driving electrode being arranged in a pattern across the substrate, the pattern of the driving electrode across the substrate comprising multiple repeated building blocks, the building block comprising
   one or more electrodes extending in at least 2 different directions across the building block, the electrodes in the building blocks forming the at least one driving electrode, wherein an electrode in a building block comprises multiple nodes where the electrode branches, the nodes being electrically connected through electrode lines, the multiple nodes and connecting electrode lines forming a tree, the electrode comprising at least a first node where the electrode branches into at least three electrode lines, the first node being directly connected through an electrode line to a second node and to a third node, the electrode branching into at least three electrode lines at the second node and at the third node.

2. A substrate as in claim 1, wherein the at least 2 different directions are orthogonal or skewed with respect to each other.

3. A substrate as in claim 1, for at least one electrode in the electrodes in the building block a maximal length between any two points on said electrode measured along said electrode in the building block is at least 2 times the length of the diameter of the building block unit, wherein the diameter is defined as the largest distance between two points of the building block.

4. A substrate as in claim 3, wherein the building block is rectangular and the diameter is a diagonal.

5. A substrate as in claim 1, wherein the calculated pixelated noise metric of the driving electrode pattern of the substrate is below 6.05%, or below 5% or below 4%, wherein the pixelated noise metric is defined as the ratio of the maximum intensity among all the non-zero order peaks and the maximum intensity of the zero-order peak from the magnitude spectrum.

6. A substrate as in claim 1, wherein
   angles between two directly connected electrodes lines have been randomly selected, and/or
   directly connected electrodes lines in the building block forming multiple angles, wherein the angles cover the interval of 0 to 360 degrees, in particular, for each particular interval of at least 30 consecutive angles there is at least one angle in the multiple angles that falls in the particular interval, and/or
   the multiple nodes have been randomly selected to cover an area of a building block, and/or
   the electrode lines are straight, or curved, and/or
   the electrode lines widths are not constant along an electrode line.

7. A substrate as in claim 1, wherein
   a building block repeats across the substrate in at least two different directions, and/or
   multiple different building blocks repeat across the substrate in one or two direction, and/or
   two different building blocks repeat in a checkerboard pattern across the substrate, and/or
   the substrate comprises non-repeating electrode lines connected to a driving electrode.

8. A substrate as in claim 1, wherein
   two electrodes in a building block that are not connected in the building block are connected in the substrate through a connection in a neighboring building block, and/or
   an electrode in the building block is connected to at least two sides of the building block.

9. A substrate as in claim 1, wherein
   building blocks are translated with and without mirroring and/or point reflection, and/or
   a row or column of building blocks are mirrored over its longitudinal direction to form a next row or columns of building blocks.

10. A substrate as in claim 1, wherein at least one driving bus is arranged on the substrate for each driving electrode of the at least one driving electrode to drive the driving electrode, wherein
    at least one driving bus is arranged at a side of the substrate for each driving electrode to drive the driving electrode, and/or
    the driving busses are only arranged at the side of the substrate, and/or
    the driving busses are arranged between the building blocks covering the substrate.

11. A substrate as in claim 1, wherein at least one driving electrode is isolated from the edges of the substrate, a via being connected to the isolated driving electrode from a surface of the substrate opposite the driving electrode for powering the isolated driving electrode and/or connecting the isolated driving electrode to another part of the driving electrode on the substrate.

12. A substrate as in claim 1, wherein at least one driving bus is arranged on the substrate for each driving electrode to drive the driving electrode, the at least one driving bus is arranged at a side of the substrate and/or a side of the building block, said driving bus comprising discontinuous parts, said discontinuous parts being connected through the driving electrode driven by the driving bus.

13. A substrate as in claim 1, wherein the driving electrodes have mirror symmetry.

14. A substrate as in claim 1, wherein the substrate is non-rectangular.

15. A substrate as in claim 1, wherein the at least one driving electrode are multiple driving electrodes,
    the multiple driving electrodes being interdigitated, each of the multiple driving electrodes being arranged in a pattern across the substrate, the multiple interdigitated driving electrodes being arranged alternatingly with respect to each other on the substrate, the pattern of multiple driving electrodes across the substrate comprising multiple repeated building blocks, the building block comprising
    multiple interdigitated electrodes extending in at least 2 different directions across the building block, the interdigitated electrodes in the building block forming the driving electrodes.

16. A substrate as in claim 15, wherein the multiple driving electrodes comprises a first driving electrode and a second driving electrode, wherein
- from any point in the substrate, a nearest distance to a first and to a second driving electrode is below a threshold, and/or
- from any point in the substrate, the sum of the nearest distance to the first and to the second driving electrode is below a first threshold, and/or above a second threshold, and/or
- a distance from a point on a first driving electrode to a point on a second driving electrode is at least a second threshold, and/or
- a horizontal and/or vertical size of the building block is at least 10 times the sum of an electrode line width and an electrode distance.

17. A substrate as in claim 15, wherein
- the driving electrodes lie in the same plane and do not cross, or
- the driving electrodes cross in the substrate, a dielectric separating the crossing driving electrodes, at least at a crossing point.

18. A light modulator comprising:
- a first substrate as in claim 1, and a second substrate, the first and second substrates being arranged with inner sides opposite to each other, the at least one driving electrode being applied to the inner side of at least one of the first and second substrates,
- an optical layer between the first and second substrates, and
- a controller configured to apply an electric potential to the driving electrodes causing modulation of the optical properties of the light modulator.

19. A light modulator as in claim 18, wherein the optical layer comprises particles, wherein the particles are electrically charged or chargeable, and the controller is configured to apply an electric potential to the driving electrode to obtain an electro-magnetic field providing electrophoretic movement of the particles towards or the driving electrode causing modulation of the optical properties of the light modulator.

20. A light modulator comprising:
- a first substrate as in claim 15 and a second substrate as in claim 15, the first and second substrates being arranged with inner sides opposite to each other, the at least one driving electrode being applied to the inner side of at least one of the first and second substrates,
- an optical layer between the first and second substrates, and
- a controller configured to apply an electric potential to the driving electrodes causing modulation of the optical properties of the light modulator, the controller being configured to apply an electric potential to the multiple driving electrodes to obtain an electro-magnetic field between the multiple driving electrodes providing electrophoretic movement of the particles towards or from one of the multiple driving electrodes causing modulation of the optical properties of the light modulator.

21. A light modulator as in claim 18, wherein
the electrode pattern on the first substrate, the electrode pattern on the second substrate and/or the superimposition of electrode patterns of the first and second substrate have a calculated Pixelated noise metric below 6.05%, or 5%, or 4%, wherein the pixelated noise metric is defined as the ratio of the maximum intensity among all the non-zero order peaks and the maximum intensity of the zero-order peak from the magnitude spectrum.

22. A method of modulating light, comprising
applying an electric potential to driving electrodes applied to two opposing substrates to obtain an electro-magnetic field between the driving electrodes providing electrophoretic movement of the particles towards or from one of the multiple driving electrodes causing modulation of light shining through the substrates, wherein the at least one or both of the two opposing substrates are as in claim 1.

23. A computer implemented method of computing pixelated noise metric for an electrode pattern for a light modulator, the method comprising
- preparing a black and white design picture to specific dimensions where electrodes lines are black and substrate background is white,
- calculate the magnitude and angle for the chirp z-transform without scaling using the Bluestein method,
- determining a main peak value as the maximum intensity within the magnitude spectrum of the chirp z-transform of the design picture,
- determining a higher peak value as the second maximum intensity within the magnitude spectrum chirp z-transform excluding the main peak, and
- calculating the pixelated noise metric as the ratio between the higher peak value and the main peak value.

24. A method of computing pixelated noise metric as in claim 23, wherein the design picture is an 8-bit picture, with black being set to 0, and white to 255.

* * * * *